(12) United States Patent
Hendricks et al.

(10) Patent No.: US 7,401,286 B1
(45) Date of Patent: Jul. 15, 2008

(54) ELECTRONIC BOOK ELECTRONIC LINKS

(75) Inventors: John S. Hendricks, Potomac, MD (US); Michael L. Asmussen, Herndon, VA (US)

(73) Assignee: Discovery Communications, Inc., Bethesda, MD (US)

(*) Notice: Subject to any disclaimer, the term of this patent is extended or adjusted under 35 U.S.C. 154(b) by 0 days.

(21) Appl. No.: 09/237,828

(22) Filed: Jan. 27, 1999

Related U.S. Application Data

(63) Continuation-in-part of application No. 08/336,247, filed on Nov. 7, 1994, now Pat. No. 5,986,690, and a continuation-in-part of application No. 08/160,194, filed on Dec. 2, 1993, now Pat. No. 5,990,927, and a continuation-in-part of application No. 08/906,469, filed on Aug. 5, 1997, now Pat. No. 6,408,437, which is a continuation of application No. 08/160,281, filed on Dec. 2, 1993, now Pat. No. 5,798,785.

(51) Int. Cl.
*G06F 17/00* (2006.01)

(52) U.S. Cl. ............ 715/203; 715/206; 715/207; 715/234; 715/264; 715/273

(58) Field of Classification Search ........... 715/501.1, 715/515, 513, 530
See application file for complete search history.

(56) References Cited

U.S. PATENT DOCUMENTS

| | | | |
|---|---|---|---|
| 3,860,873 A | 1/1975 | Ringstad | |
| 3,891,792 A | 6/1975 | Kimura | |
| 3,978,470 A | 8/1976 | McGuire | |
| 4,023,408 A | 5/1977 | Ryan et al. | |
| 4,071,697 A | 1/1978 | Bushnell et al. | |
| 4,197,590 A | 4/1980 | Sukonick et al. | |

(Continued)

FOREIGN PATENT DOCUMENTS

CA 2044574 12/1992

(Continued)

OTHER PUBLICATIONS

Rauch, et al.; Enabling the Book Metaphor for the World Wide Web: Disseminating on-line information as dynamic web documents; Jun. 1997; pp. 111-128.

(Continued)

*Primary Examiner*—Doug Hutton
*Assistant Examiner*—Quoc A Tran
(74) *Attorney, Agent, or Firm*—Arent Fox LLP

(57) ABSTRACT

An electronic book selection and delivery system distributes text to subscribers. The system includes the ability to use electronic links as well as a system for creating electronic links between specific electronic books and other electronic files. The links may be used or accessed by a menu system or by operation of a cursor and a select button. The other electronic files could be portions of a specific electronic book, such as a Table of Contents. The other electronic files could also exist external to a specific electronic book. For example, definitions provided in an electronic English-language dictionary could be linked to terms contained in an electronic book. The electronic links may be created by the book publisher or may be subscriber-defined. The links may use standard programming language such as hypertext markup language (HTML). The links may be established through use of a relational database.

42 Claims, 34 Drawing Sheets

U.S. PATENT DOCUMENTS

| | | | |
|---|---|---|---|
| 4,272,819 A | 6/1981 | Katsumata et al. | |
| 4,298,793 A | 11/1981 | Melis et al. | |
| 4,361,848 A | 11/1982 | Poigner et al. | |
| 4,381,522 A | 4/1983 | Lambert | |
| 4,398,216 A | 8/1983 | Field et al. | |
| 4,405,829 A | 9/1983 | Rivest et al. | |
| 4,429,385 A | 1/1984 | Cichelli et al. | |
| 4,455,570 A | 6/1984 | Saeki et al. | |
| 4,484,217 A | 11/1984 | Block et al. | |
| 4,488,179 A | 12/1984 | Kruger et al. | |
| 4,513,390 A | 4/1985 | Walter et al. | |
| 4,517,598 A | 5/1985 | Van Valkenburg et al. | |
| 4,528,589 A | 7/1985 | Block et al. | |
| 4,528,643 A | 7/1985 | Freeny, Jr. | |
| 4,532,540 A | 7/1985 | Wine | |
| 4,533,948 A | 8/1985 | McNamara et al. | |
| 4,546,382 A | 10/1985 | McKenna et al. | |
| 4,567,512 A | 1/1986 | Abraham | |
| 4,578,531 A | 3/1986 | Everhart et al. | |
| 4,587,520 A | 5/1986 | Astle | |
| 4,602,279 A | 7/1986 | Freeman et al. | |
| 4,605,964 A | 8/1986 | Chard | |
| 4,616,263 A | 10/1986 | Eichelberger | |
| 4,621,282 A | 11/1986 | Ahern | |
| 4,625,076 A | 11/1986 | Okamoto et al. | |
| 4,625,235 A | 11/1986 | Watson | |
| 4,633,462 A | 12/1986 | Stifle et al. | |
| 4,639,225 A | 1/1987 | Washizuka | |
| 4,644,470 A | 2/1987 | Feigenbaum et al. | |
| 4,653,100 A | 3/1987 | Barnett et al. | |
| 4,668,218 A | 5/1987 | Virtanen | |
| 4,673,976 A | 6/1987 | Wreford-Howard | |
| 4,688,218 A | 8/1987 | Blineau et al. | |
| 4,688,246 A | 8/1987 | Eilers et al. | |
| 4,694,483 A | 9/1987 | Cheung | |
| 4,694,490 A | 9/1987 | Harvey et al. | |
| 4,697,209 A | 9/1987 | Kiewit et al. | |
| 4,706,121 A | 11/1987 | Young | |
| 4,712,105 A | 12/1987 | Kohler | |
| 4,712,130 A | 12/1987 | Casey | |
| 4,724,491 A | 2/1988 | Lambert | |
| 4,739,510 A | 4/1988 | Jeffers et al. | |
| 4,751,578 A | 6/1988 | Reiter et al. | |
| 4,768,087 A | 8/1988 | Taub et al. | |
| 4,774,655 A | 9/1988 | Kollin et al. | |
| 4,792,972 A | 12/1988 | Cook, Jr. | |
| 4,796,220 A | 1/1989 | Wolfe | |
| 4,805,014 A | 2/1989 | Sahara et al. | |
| 4,816,901 A | 3/1989 | Music et al. | |
| 4,816,904 A | 3/1989 | McKenna et al. | |
| 4,820,167 A | 4/1989 | Nobles et al. | |
| D301,037 S | 5/1989 | Matsuda | |
| 4,829,372 A | 5/1989 | McCalley et al. | |
| 4,829,558 A | 5/1989 | Welsh | |
| 4,829,569 A | 5/1989 | Seth-Smith et al. | |
| 4,835,607 A | 5/1989 | Keith | |
| 4,855,725 A | 8/1989 | Fernandez | 345/175 |
| 4,860,379 A | 8/1989 | Schoenberger et al. | |
| 4,876,736 A | 10/1989 | Kiewit | |
| 4,885,803 A | 12/1989 | Hermann et al. | |
| 4,890,319 A | 12/1989 | Seth-Smith et al. | |
| 4,891,838 A | 1/1990 | Faber | |
| 4,920,432 A | 4/1990 | Eggers et al. | |
| 4,924,513 A | 5/1990 | Herbison et al. | |
| 4,928,168 A | 5/1990 | Iwashita | |
| 4,928,177 A | 5/1990 | Martinez | |
| 4,930,160 A | 5/1990 | Vogel | |
| 4,941,089 A | 7/1990 | Fisher | |
| 4,941,125 A | 7/1990 | Boyne | |
| 4,947,429 A | 8/1990 | Bestler et al. | |
| 4,949,187 A | 8/1990 | Cohen | |
| 4,959,810 A | 9/1990 | Darbee et al. | |
| 4,961,109 A | 10/1990 | Tanaka | |
| 4,965,819 A | 10/1990 | Kannes | |
| 4,965,825 A | 10/1990 | Harvey et al. | |
| 4,975,951 A | 12/1990 | Bennett | |
| 4,977,455 A | 12/1990 | Young | |
| 4,982,344 A * | 1/1991 | Jordan | 345/804 |
| 4,985,697 A | 1/1991 | Boulton | 707/500.1 |
| D314,383 S | 2/1991 | Hafner | |
| 4,995,078 A | 2/1991 | Monslow et al. | |
| 4,996,597 A | 2/1991 | Duffield | |
| 5,001,554 A | 3/1991 | Johnson et al. | |
| 5,003,384 A | 3/1991 | Durden et al. | |
| 5,003,591 A | 3/1991 | Kauffman et al. | |
| 5,010,499 A | 4/1991 | Yee | |
| 5,014,125 A | 5/1991 | Pocach et al. | |
| 5,015,829 A | 5/1991 | Eilert et al. | |
| 5,020,129 A | 5/1991 | Martin et al. | |
| 5,027,400 A | 6/1991 | Baji et al. | |
| 5,036,394 A | 7/1991 | Morii | |
| 5,036,537 A | 7/1991 | Jeffers et al. | |
| 5,038,402 A | 8/1991 | Robbins | |
| 5,046,093 A | 9/1991 | Wachob | |
| 5,047,867 A | 9/1991 | Strubbe et al. | |
| 5,049,990 A | 9/1991 | Kondo et al. | |
| 5,054,984 A | 10/1991 | Chan et al. | |
| 5,056,138 A | 10/1991 | Tyson, Sr. | |
| 5,057,917 A | 10/1991 | Shalkauser et al. | |
| 5,073,930 A | 12/1991 | Green et al. | |
| 5,075,771 A | 12/1991 | Hashimoto | |
| 5,077,607 A | 12/1991 | Johnson et al. | |
| 5,078,019 A | 1/1992 | Aoki | |
| 5,089,956 A | 2/1992 | MacPhail | |
| 5,091,782 A | 2/1992 | Krause et al. | |
| 5,093,718 A | 3/1992 | Hoarty et al. | |
| 5,099,319 A | 3/1992 | Esch et al. | |
| 5,099,331 A | 3/1992 | Truong | |
| D325,581 S | 4/1992 | Schwartz | |
| 5,103,314 A | 4/1992 | Keenan | |
| 5,105,268 A | 4/1992 | Yamanouchi et al. | |
| D326,446 S | 5/1992 | Wong | |
| 5,115,426 A | 5/1992 | Spanke | |
| 5,121,476 A | 6/1992 | Yee | |
| 5,124,980 A | 6/1992 | Maki | |
| 5,130,792 A | 7/1992 | Tindell et al. | |
| 5,130,924 A * | 7/1992 | Barker et al. | 715/509 |
| 5,132,789 A | 7/1992 | Ammon et al. | |
| 5,132,992 A | 7/1992 | Yurt et al. | |
| 5,133,079 A | 7/1992 | Ballantyne et al. | |
| 5,140,419 A | 8/1992 | Galumbeck et al. | |
| D329,238 S | 9/1992 | Grasso et al. | |
| 5,144,663 A | 9/1992 | Kudelski et al. | |
| 5,144,665 A | 9/1992 | Takaragi et al. | |
| 5,146,552 A | 9/1992 | Cassorla et al. | |
| 5,146,600 A | 9/1992 | Sugiura | |
| 5,150,118 A | 9/1992 | Finkle | |
| 5,151,782 A | 9/1992 | Ferraro | |
| 5,151,789 A | 9/1992 | Young | |
| 5,152,011 A | 9/1992 | Schwob | |
| 5,155,591 A | 10/1992 | Wachob | |
| 5,159,452 A | 10/1992 | Kinoshita et al. | |
| 5,159,669 A | 10/1992 | Trigg et al. | |
| 5,166,886 A | 11/1992 | Molnar et al. | |
| D331,760 S | 12/1992 | Renk, Jr. | |
| 5,172,413 A | 12/1992 | Bradley et al. | |
| 5,182,639 A | 1/1993 | Jutamulia et al. | |
| 5,185,667 A | 2/1993 | Zimmerman et al. | |
| 5,199,104 A | 3/1993 | Hirayama | |
| 5,202,817 A | 4/1993 | Koenck et al. | |
| 5,204,947 A * | 4/1993 | Bernstein et al. | 345/854 |
| 5,206,722 A | 4/1993 | Kwan | |
| 5,206,929 A | 4/1993 | Langford et al. | |
| 5,206,954 A | 4/1993 | Inoue et al. | |

| Patent | Type | Date | Inventor |
|---|---|---|---|
| 5,208,665 | A | 5/1993 | McCalley et al. |
| 5,208,745 | A | 5/1993 | Quentin et al. |
| 5,210,611 | A | 5/1993 | Yee et al. |
| 5,212,553 | A | 5/1993 | Maruoka |
| 5,216,515 | A | 6/1993 | Steele et al. |
| 5,220,438 | A | 6/1993 | Yamamoto |
| 5,220,649 | A | 6/1993 | Mitchell |
| 5,221,962 | A | 6/1993 | Backus et al. |
| 5,222,136 | A | 6/1993 | Rasmussen et al. |
| 5,223,924 | A | 6/1993 | Strubbe |
| 5,233,333 | A | 8/1993 | Borsuk |
| 5,235,419 | A | 8/1993 | Krause et al. |
| 5,235,619 | A | 8/1993 | Beyers et al. |
| 5,235,680 | A | 8/1993 | Bijnagte |
| 5,237,311 | A | 8/1993 | Mailey et al. |
| 5,237,610 | A | 8/1993 | Gammie et al. |
| 5,237,614 | A | 8/1993 | Weiss |
| 5,239,665 | A | 8/1993 | Tsuchiya |
| 5,241,671 | A * | 8/1993 | Reed et al. ............... 707/104.1 |
| 5,247,347 | A | 9/1993 | Litteral et al. |
| 5,247,575 | A | 9/1993 | Sprague et al. |
| 5,251,324 | A | 10/1993 | McMullan |
| 5,253,066 | A | 10/1993 | Vogel |
| 5,253,275 | A | 10/1993 | Yurt et al. |
| 5,253,341 | A | 10/1993 | Rozmanith et al. |
| 5,257,185 | A | 10/1993 | Farley et al. |
| 5,260,778 | A | 11/1993 | Kauffman et al. |
| 5,260,788 | A | 11/1993 | Takano et al. |
| 5,262,875 | A | 11/1993 | Mincer et al. |
| 5,282,028 | A | 1/1994 | Johnson et al. |
| 5,283,639 | A | 2/1994 | Esch et al. |
| 5,285,272 | A | 2/1994 | Bradley et al. |
| 5,289,271 | A | 2/1994 | Watson |
| 5,289,288 | A | 2/1994 | Silverman et al. |
| 5,291,554 | A | 3/1994 | Morales |
| 5,293,540 | A | 3/1994 | Trani et al. |
| 5,293,633 | A | 3/1994 | Robbins |
| D346,620 | S | 5/1994 | McSorley |
| 5,315,711 | A | 5/1994 | Barone et al. |
| 5,318,450 | A | 6/1994 | Carver |
| 5,319,454 | A | 6/1994 | Schutte |
| 5,319,455 | A | 6/1994 | Hoarty et al. |
| 5,319,542 | A | 6/1994 | King et al. |
| 5,319,649 | A | 6/1994 | Raghaven et al. |
| 5,319,707 | A | 6/1994 | Wasilewski et al. |
| 5,321,846 | A | 6/1994 | Yokota et al. |
| 5,323,240 | A | 6/1994 | Amano et al. |
| 5,327,554 | A | 7/1994 | Palazzi, III et al. |
| 5,329,590 | A | 7/1994 | Pond |
| D349,923 | S | 8/1994 | Billings et al. |
| 5,339,091 | A | 8/1994 | Yamazaki et al. |
| 5,339,239 | A | 8/1994 | Manabe et al. |
| 5,339,315 | A | 8/1994 | Maeda et al. |
| 5,341,166 | A | 8/1994 | Garr et al. |
| 5,341,425 | A | 8/1994 | Wasilweski et al. |
| 5,341,426 | A | 8/1994 | Barney et al. |
| 5,341,474 | A | 8/1994 | Gelman et al. |
| 5,343,239 | A | 8/1994 | Lappington |
| 5,343,516 | A | 8/1994 | Callele et al. |
| 5,345,580 | A | 9/1994 | Tamaru et al. |
| 5,345,594 | A | 9/1994 | Tsuda |
| 5,349,638 | A | 9/1994 | Pitroda et al. |
| 5,351,075 | A | 9/1994 | Herz et al. |
| 5,353,121 | A | 10/1994 | Young et al. |
| 5,355,162 | A | 10/1994 | Yazolino et al. |
| 5,357,276 | A | 10/1994 | Banker et al. |
| 5,365,265 | A | 11/1994 | Shibata et al. |
| 5,365,434 | A | 11/1994 | Figliuzzi |
| 5,367,330 | A | 11/1994 | Haave et al. |
| 5,367,571 | A | 11/1994 | Bowen et al. |
| 5,367,621 | A * | 11/1994 | Cohen et al. ............. 715/501.1 |
| 5,367,643 | A | 11/1994 | Chang et al. |
| 5,371,532 | A | 12/1994 | Gelman et al. |
| 5,373,324 | A | 12/1994 | Kuroda et al. |
| 5,375,068 | A | 12/1994 | Palmer et al. |
| 5,375,160 | A | 12/1994 | Guidon et al. |
| 5,379,057 | A | 1/1995 | Clough et al. |
| 5,384,588 | A | 1/1995 | Martin et al. |
| 5,388,101 | A | 2/1995 | Dinkins |
| 5,388,196 | A | 2/1995 | Pajak et al. |
| 5,390,348 | A | 2/1995 | Magin et al. |
| 5,396,546 | A | 3/1995 | Remillard |
| 5,400,401 | A | 3/1995 | Wasilewski et al. |
| 5,404,393 | A | 4/1995 | Remillard |
| 5,404,505 | A | 4/1995 | Levinson |
| 5,408,258 | A | 4/1995 | Kolessar |
| 5,408,465 | A | 4/1995 | Guesella et al. |
| 5,410,326 | A | 4/1995 | Goldstein |
| 5,410,344 | A | 4/1995 | Graves et al. |
| 5,412,416 | A | 5/1995 | Nemirofsky |
| 5,414,426 | A | 5/1995 | O'Donnell et al. |
| 5,416,508 | A | 5/1995 | Sakuma et al. |
| 5,417,575 | A | 5/1995 | McTaggart |
| 5,418,559 | A | 5/1995 | Blahut |
| 5,418,957 | A | 5/1995 | Narayan |
| 5,420,474 | A | 5/1995 | Morris et al. |
| 5,424,770 | A | 6/1995 | Schmelzer et al. |
| 5,426,594 | A | 6/1995 | Wright et al. |
| 5,428,529 | A | 6/1995 | Hartrick et al. |
| 5,432,542 | A | 7/1995 | Thibadeau et al. |
| 5,432,561 | A | 7/1995 | Strubbe |
| 5,437,552 | A | 8/1995 | Baer et al. |
| 5,438,372 | A | 8/1995 | Tsumori et al. |
| 5,440,632 | A | 8/1995 | Bacon et al. |
| 5,442,626 | A | 8/1995 | Wei |
| 5,444,853 | A | 8/1995 | Lentz |
| 5,446,488 | A | 8/1995 | Vogel |
| 5,446,490 | A | 8/1995 | Blahut et al. |
| 5,446,919 | A | 8/1995 | Wilkins |
| D362,429 | S | 9/1995 | Lande et al. |
| 5,461,667 | A | 10/1995 | Remillard |
| 5,465,213 | A | 11/1995 | Ross |
| 5,465,401 | A | 11/1995 | Thompson |
| 5,466,158 | A | 11/1995 | Smith, III |
| 5,467,102 | A | 11/1995 | Kuno et al. |
| 5,469,206 | A | 11/1995 | Strubbe et al. |
| 5,473,362 | A | 12/1995 | Fitzgerald et al. |
| 5,475,398 | A | 12/1995 | Yamazaki et al. |
| 5,475,399 | A | 12/1995 | Borsuk |
| 5,475,585 | A | 12/1995 | Bush |
| 5,477,262 | A | 12/1995 | Bunker et al. |
| 5,477,263 | A | 12/1995 | O'Callaghan et al. |
| 5,479,268 | A | 12/1995 | Young |
| 5,479,508 | A | 12/1995 | Bestler et al. |
| 5,479,615 | A | 12/1995 | Ishii et al. |
| 5,481,294 | A | 1/1996 | Thomas et al. |
| 5,481,296 | A | 1/1996 | Cragin et al. |
| 5,481,542 | A | 1/1996 | Logston |
| 5,483,278 | A | 1/1996 | Strubbe et al. |
| 5,484,292 | A | 1/1996 | McTaggart |
| 5,485,221 | A | 1/1996 | Banker et al. |
| 5,486,686 | A | 1/1996 | Zdybel, Jr. et al. |
| 5,495,581 | A * | 2/1996 | Tsai ........................... 715/526 |
| 5,497,187 | A | 3/1996 | Banker et al. |
| 5,497,459 | A | 3/1996 | Tanihira et al. |
| 5,499,330 | A | 3/1996 | Lucas et al. |
| 5,500,794 | A | 3/1996 | Fujita et al. |
| 5,502,576 | A | 3/1996 | Ramsay et al. |
| 5,506,902 | A | 4/1996 | Kubota |
| 5,509,074 | A | 4/1996 | Choudhury et al. |
| 5,512,934 | A | 4/1996 | Kochanski |
| 5,515,098 | A | 5/1996 | Carles |
| 5,517,254 | A | 5/1996 | Monta et al. |
| 5,521,631 | A | 5/1996 | Budow et al. |
| 5,524,193 | A * | 6/1996 | Covington et al. .......... 715/512 |
| 5,524,201 | A | 6/1996 | Shwarts et al. |

| | | | | | |
|---|---|---|---|---|---|
| 5,526,035 A | 6/1996 | Lappington et al. | 5,737,747 A | 4/1998 | Vishlitzky et al. |
| 5,526,469 A | 6/1996 | Brindle et al. | 5,739,814 A | 4/1998 | Ohara et al. |
| 5,528,281 A | 6/1996 | Grady et al. | 5,740,549 A | 4/1998 | Reily et al. |
| 5,528,490 A | 6/1996 | Hill | 5,742,680 A | 4/1998 | Wilson |
| 5,532,920 A | 7/1996 | Hartnick et al. | 5,748,441 A | 5/1998 | Loritz et al. |
| 5,534,888 A | 7/1996 | Lebby et al. | 5,754,172 A | 5/1998 | Kubota et al. |
| 5,544,320 A | 8/1996 | Konrad | 5,758,257 A | 5/1998 | Herz et al. |
| 5,544,342 A | 8/1996 | Dean | 5,761,468 A | 6/1998 | Emberson |
| 5,550,863 A | 8/1996 | Yurt et al. | 5,761,485 A * | 6/1998 | Munyan .................... 715/839 |
| 5,557,722 A * | 9/1996 | DeRose et al. .............. 715/513 | 5,761,606 A | 6/1998 | Wolzien |
| 5,557,744 A | 9/1996 | Kobayakawa et al. | 5,764,276 A | 6/1998 | Martin et al. |
| 5,561,708 A | 10/1996 | Remillard | 5,767,896 A | 6/1998 | Nemirofsky |
| 5,561,803 A | 10/1996 | Kilis | 5,768,521 A | 6/1998 | Dedrick |
| 5,565,908 A | 10/1996 | Ahmad | 5,771,354 A | 6/1998 | Crawford |
| 5,565,999 A | 10/1996 | Takahashi | 5,774,170 A | 6/1998 | Hite et al. |
| 5,570,126 A | 10/1996 | Blahut et al. | 5,787,171 A | 7/1998 | Kubota et al. |
| 5,572,625 A | 11/1996 | Raman et al. | 5,788,504 A | 8/1998 | Rice et al. |
| 5,579,055 A | 11/1996 | Hamilton et al. | 5,790,176 A | 8/1998 | Craig |
| 5,579,057 A | 11/1996 | Banker et al. | 5,790,935 A | 8/1998 | Payton |
| 5,581,560 A | 12/1996 | Shimada et al. | 5,793,414 A | 8/1998 | Shaffer |
| 5,581,686 A | 12/1996 | Koppolu et al. | 5,798,785 A | 8/1998 | Hendricks et al. |
| 5,585,858 A | 12/1996 | Harper et al. | 5,799,071 A | 8/1998 | Azar et al. |
| 5,586,235 A | 12/1996 | Kauffman et al. | 5,799,157 A | 8/1998 | Escallon ...................... 705/27 |
| 5,587,724 A | 12/1996 | Matsuda | 5,802,465 A | 9/1998 | Hamalainen et al. |
| 5,598,209 A | 1/1997 | Cortjens et al. | 5,802,526 A | 9/1998 | Fawcett et al. |
| 5,598,351 A | 1/1997 | Chater et al. | 5,805,204 A | 9/1998 | Thompson et al. |
| 5,598,523 A | 1/1997 | Fujita | 5,815,671 A | 9/1998 | Morrison |
| 5,600,368 A | 2/1997 | Matthews, III | 5,819,301 A | 10/1998 | Rowe et al. |
| 5,600,573 A | 2/1997 | Hendricks et al. | 5,835,732 A | 11/1998 | Kikinis et al. |
| 5,602,596 A | 2/1997 | Claussen et al. | 5,844,600 A | 12/1998 | Kerr |
| 5,604,824 A | 2/1997 | Chui et al. | 5,844,890 A | 12/1998 | Delp et al. |
| 5,608,449 A | 3/1997 | Swafford et al. | 5,850,218 A | 12/1998 | LaJoie et al. |
| 5,613,109 A | 3/1997 | Yamauchi et al. | 5,850,629 A | 12/1998 | Holm et al. |
| 5,621,456 A | 4/1997 | Florin et al. | 5,859,594 A | 1/1999 | King et al. |
| 5,621,658 A | 4/1997 | Jackson et al. | 5,862,325 A | 1/1999 | Reed et al. |
| 5,624,265 A | 4/1997 | Redford et al. | 5,862,329 A | 1/1999 | Aras et al. |
| 5,625,833 A | 4/1997 | Levine et al. | 5,864,823 A | 1/1999 | Levitan |
| 5,630,103 A | 5/1997 | Smith et al. | 5,870,717 A | 2/1999 | Wiecha |
| 5,630,125 A | 5/1997 | Zellweger | 5,877,755 A | 3/1999 | Helhake |
| 5,631,693 A | 5/1997 | Wunderlich et al. | 5,881,269 A | 3/1999 | Dobbelstein |
| 5,632,022 A | 5/1997 | Warren et al. | 5,887,801 A | 3/1999 | Martin et al. |
| 5,634,064 A | 5/1997 | Warnock et al. | 5,890,122 A | 3/1999 | Van Kleeck et al. |
| 5,635,918 A | 6/1997 | Tett | 5,892,900 A | 4/1999 | Ginter et al. |
| 5,636,036 A | 6/1997 | Ashbey | 5,892,915 A | 4/1999 | Duso et al. |
| 5,640,193 A | 6/1997 | Wellner | 5,893,109 A | 4/1999 | DeRose et al. |
| 5,640,196 A | 6/1997 | Behrens et al. | 5,893,132 A | 4/1999 | Huffman et al. |
| 5,644,354 A | 7/1997 | Thompson et al. | 5,898,852 A | 4/1999 | Petolino et al. |
| 5,646,675 A | 7/1997 | Copriviza et al. | RE36,207 E | 5/1999 | Zimmermann et al. |
| 5,649,230 A | 7/1997 | Lentz | 5,903,319 A | 5/1999 | Busko et al. |
| 5,657,414 A | 8/1997 | Lett et al. | 5,903,652 A | 5/1999 | Mital |
| 5,661,516 A | 8/1997 | Carles | 5,903,901 A | 5/1999 | Kawakura et al. |
| 5,663,757 A | 9/1997 | Morales | 5,914,706 A | 6/1999 | Kono |
| 5,666,493 A | 9/1997 | Wojoik et al. | 5,917,543 A | 6/1999 | Uehara |
| 5,682,206 A | 10/1997 | Wehmeyer et al. | 5,917,915 A | 6/1999 | Hirose |
| 5,689,641 A | 11/1997 | Ludwig et al. | 5,918,213 A | 6/1999 | Bernard et al. |
| 5,689,648 A | 11/1997 | Diaz et al. | 5,929,848 A | 7/1999 | Albukerk et al. |
| 5,689,663 A | 11/1997 | Williams | 5,930,768 A | 7/1999 | Hooban |
| 5,691,777 A | 11/1997 | Kassaatly | 5,933,498 A | 8/1999 | Schneck et al. |
| 5,696,906 A | 12/1997 | Peters et al. | 5,940,073 A | 8/1999 | Klosterman et al. |
| 5,696,982 A | 12/1997 | Tanigawa et al. | 5,956,034 A | 9/1999 | Sachs et al. |
| 5,697,793 A | 12/1997 | Huffman et al. | 5,957,695 A | 9/1999 | Redford et al. |
| 5,710,887 A | 1/1998 | Chelliah et al. | 5,963,246 A | 10/1999 | Kato |
| 5,715,314 A | 2/1998 | Payne et al. | 5,986,677 A | 11/1999 | Jones et al. |
| 5,721,832 A | 2/1998 | Westrope et al. | 5,986,690 A | 11/1999 | Hendricks ...................... 725/60 |
| 5,721,908 A | 2/1998 | Lebarde et al. | 5,990,927 A | 11/1999 | Hendricks et al. |
| 5,721,956 A | 2/1998 | Martin et al. | 5,999,214 A | 12/1999 | Inagaki |
| 5,722,418 A | 3/1998 | Bro | 6,012,890 A | 1/2000 | Celorio |
| 5,724,091 A | 3/1998 | Freeman et al. | 6,014,184 A | 1/2000 | Knee et al. |
| 5,724,521 A | 3/1998 | Dedrick | 6,016,484 A | 1/2000 | Williams et al. |
| 5,726,909 A | 3/1998 | Krikorian | 6,025,837 A | 2/2000 | Matthews, III et al. |
| 5,727,065 A | 3/1998 | Dillon | 6,025,871 A | 2/2000 | Kantor et al. |
| 5,734,891 A * | 3/1998 | Saigh .......................... 707/10 | 6,029,045 A | 2/2000 | Picco et al. |
| 5,737,725 A | 4/1998 | Case | 6,034,680 A | 3/2000 | Kessenich ................... 345/733 |

| | | | | | |
|---|---|---|---|---|---|
| 6,052,717 A * | 4/2000 | Reynolds et al. ............ 709/218 | EP | 0314572 | 5/1989 |
| 6,091,823 A | 7/2000 | Hosomi et al. | EP | 0328440 | 8/1989 |
| 6,091,930 A | 7/2000 | Mortimer et al. | EP | 0340643 | 11/1989 |
| 6,101,485 A | 8/2000 | Fortenberry et al. | EP | 0355 697 | 2/1990 |
| 6,112,049 A | 8/2000 | Sonnenfeld | EP | 0377334 | 7/1990 |
| 6,115,040 A | 9/2000 | Bladow et al. | EP | 0384986 | 9/1990 |
| 6,163,796 A | 12/2000 | Yokomizo | EP | 0396186 | 11/1990 |
| 6,195,667 B1 | 2/2001 | Duga et al. | EP | 0399200 | 11/1990 |
| 6,204,885 B1 | 3/2001 | Kwoh | EP | 0402 809 | 12/1990 |
| 6,229,694 B1 | 5/2001 | Kono | EP | 0420 123 | 4/1991 |
| 6,243,071 B1 | 6/2001 | Shwarts et al. | EP | 0424 648 | 5/1991 |
| 6,249,785 B1 | 6/2001 | Paepke | EP | 0425 834 | 5/1991 |
| 6,252,879 B1 | 6/2001 | Zhang | EP | 0450841 | 10/1991 |
| 6,260,024 B1 | 7/2001 | Shkedy | EP | 0472070 | 2/1992 |
| 6,269,483 B1 | 7/2001 | Broussard | EP | 0472070 A2 | 2/1992 |
| 6,279,017 B1 | 8/2001 | Walker | EP | 0506 435 | 9/1992 |
| 6,281,986 B1 | 8/2001 | Form | EP | 0513 763 | 11/1992 |
| 6,295,542 B1 | 9/2001 | Corbin | EP | 0516533 | 12/1992 |
| 6,298,441 B1 | 10/2001 | Handelman et al. | EP | 0539106 | 4/1993 |
| 6,320,591 B1 | 11/2001 | Griencewic | EP | 093/22877 | 11/1993 |
| 6,331,865 B1 | 12/2001 | Sachs et al. | EP | 0567800 | 11/1993 |
| 6,331,867 B1 * | 12/2001 | Eberhard et al. ............ 715/864 | EP | 0570785 | 11/1993 |
| 6,334,109 B1 | 12/2001 | Kanevsky et al. | EP | 0586954 | 3/1994 |
| 6,335,678 B1 | 1/2002 | Heutschi | EP | 0620689 | 10/1994 |
| 6,351,750 B1 | 2/2002 | Duga et al. | EP | 0646856 | 4/1995 |
| 6,363,418 B1 | 3/2002 | Conboy et al. | EP | 0702491 | 3/1996 |
| 6,385,614 B1 | 5/2002 | Vellandi | EP | 0810534 A | 12/1997 |
| 6,411,973 B1 | 6/2002 | Yianilos | EP | 0810534 A2 | 12/1997 |
| 6,415,316 B1 | 7/2002 | Van Der Meer | EP | 0838798 | 4/1998 |
| 6,438,233 B1 | 8/2002 | Yoshimune et al. | EP | 0892388 | 1/1999 |
| 6,452,614 B1 | 9/2002 | King et al. | EP | 0924629 A | 6/1999 |
| 6,460,036 B1 * | 10/2002 | Herz ............................ 707/10 | EP | 0924687 | 6/1999 |
| 6,462,729 B2 | 10/2002 | Morita | GB | 1204190 | 12/1967 |
| 6,493,734 B1 | 12/2002 | Sachs et al. | GB | 2168227 | 6/1986 |
| 6,507,342 B1 | 1/2003 | Hirayama | GB | 2 177 873 A | 1/1987 |
| 6,535,505 B1 | 3/2003 | Hwang et al. | GB | 2269302 A | 2/1994 |
| 6,546,016 B1 | 4/2003 | Gerszberg et al. | GB | 2344009 | 5/2000 |
| 6,556,561 B1 | 4/2003 | Himbeault et al. | JP | 060-143086 | 7/1985 |
| 6,557,173 B1 | 4/2003 | Hendricks | JP | 061060150 | 8/1986 |
| 6,606,603 B1 | 8/2003 | Joseph | JP | 062-24777 | 2/1987 |
| 6,611,531 B1 | 8/2003 | Chen et al. | JP | 062-140134 | 6/1987 |
| 6,634,028 B2 | 10/2003 | Handelman | JP | 062-245167 | 10/1987 |
| 6,654,754 B1 | 11/2003 | Knauft et al. | JP | 01-020454 | 1/1989 |
| 6,675,384 B1 | 1/2004 | Block et al. | JP | 0186778 | 3/1989 |
| 6,714,238 B2 | 3/2004 | Urisaka et al. | JP | 01130683 | 5/1989 |
| 6,725,203 B1 | 4/2004 | Seet et al. | JP | 01-142918 | 6/1989 |
| 6,813,249 B1 | 11/2004 | Lauffenburger et al. | JP | 064-007786 | 11/1989 |
| 6,886,000 B1 | 4/2005 | Aggarwal et al. | JP | 02-284571 | 11/1990 |
| 2002/0120635 A1 | 8/2002 | Joao | JP | 03-114375 | 5/1991 |
| 2003/0018543 A1 | 1/2003 | Alger et al. | JP | 03-198119 | 8/1991 |
| 2003/0093336 A1 | 5/2003 | Ukita et al. | JP | 03225445 | 10/1991 |
| 2003/0093382 A1 | 5/2003 | Himeno et al. | JP | 04-170183 | 6/1992 |
| 2003/0198932 A1 | 10/2003 | Stuppy | JP | 05-046045 | 5/1993 |
| 2005/0144133 A1 | 6/2005 | Hoffman | JP | 05-236437 | 9/1993 |
| | | | JP | 05233547 | 9/1993 |
| | | | JP | 05250106 | 9/1993 |
| | FOREIGN PATENT DOCUMENTS | | JP | 05334167 A | 12/1993 |
| CA | 2458564 | 6/1995 | JP | 0405334167 A | 12/1993 |
| DE | 3423846 | 1/1986 | JP | 06068339 A | 3/1994 |
| DE | 3935294 | 4/1991 | JP | 0406068339 A | 3/1994 |
| DE | 42 12 184 | 10/1993 | JP | 06134489 | 5/1994 |
| EP | 0103438 | 3/1984 | JP | 07230466 A | 8/1995 |
| EP | 140302 | 5/1985 | JP | 07 235909 | 9/1995 |
| EP | 0145063 | 6/1985 | JP | 08008850 A | 1/1996 |
| EP | 0149536 | 7/1985 | JP | 408051614 A | 2/1996 |
| EP | 0158548 | 10/1985 | JP | 040 8228328 | 9/1996 |
| EP | 0158767 | 10/1985 | JP | 09227193 | 8/1997 |
| EP | 0167237 | 1/1986 | JP | 09 284571 | 10/1997 |
| EP | 0187961 | 7/1986 | JP | 410285568 A | 10/1998 |
| EP | 0243312 | 10/1987 | JP | 11068770 | 3/1999 |
| EP | 0277014 | 8/1988 | TW | 234223 | 6/2005 |
| EP | 0281293 | 9/1988 | TW | 235358 | 7/2005 |
| EP | 0299830 | 1/1989 | TW | 235359 | 7/2005 |

| | | |
|---|---|---|
| TW | 236065 | 7/2005 |
| TW | 236744 | 7/2005 |
| TW | 238461 | 8/2005 |
| WO | WO 80/00209 | 2/1980 |
| WO | WO 86/01962 | 3/1986 |
| WO | WO 87/01481 | 3/1987 |
| WO | WO 88/01463 | 2/1988 |
| WO | WO 89/09528 | 10/1989 |
| WO | WO 8909528 | 10/1989 |
| WO | WO 89/12370 | 12/1989 |
| WO | WO 90/10988 | 9/1990 |
| WO | WO 9100670 | 1/1991 |
| WO | WO 91/03112 | 3/1991 |
| WO | WO 91/11769 | 8/1991 |
| WO | WO 92/10040 | 6/1992 |
| WO | WO 92/11713 | 7/1992 |
| WO | WO 92/12599 | 7/1992 |
| WO | WO 92/17027 | 10/1992 |
| WO | WO 92/21206 | 11/1992 |
| WO | WO93/15466 | 8/1993 |
| WO | WO 93/22877 | 11/1993 |
| WO | WO 94/01964 | 1/1994 |
| WO | WO 94/07327 A1 | 3/1994 |
| WO | WO 94/13107 | 6/1994 |
| WO | WO 94/14282 | 6/1994 |
| WO | WO 94/16527 | 7/1994 |
| WO | WO 94/023537 | 10/1994 |
| WO | WO 95/15649 | 6/1995 |
| WO | WO 9515649 A | 6/1995 |
| WO | WO 96/08109 | 3/1996 |
| WO | WO 96/17306 | 6/1996 |
| WO | WO 96/25006 | 8/1996 |
| WO | WO 96/41473 | 12/1996 |
| WO | WO 97/13368 | 4/1997 |
| WO | WO 97/18665 | 5/1997 |
| WO | WO 97/12105 | 6/1997 |
| WO | WO 97/20224 | 6/1997 |
| WO | WO 97/20274 | 6/1997 |
| WO | WO 97/22049 | 6/1997 |
| WO | WO 97/22062 | 6/1997 |
| WO | WO 97/22063 | 6/1997 |
| WO | WO 97/22064 | 6/1997 |
| WO | WO 97/22065 | 6/1997 |
| WO | WO 97/22067 | 6/1997 |
| WO | WO 97/22079 | 6/1997 |
| WO | WO 97/22080 | 6/1997 |
| WO | WO 97/22097 | 6/1997 |
| WO | WO 97/22099 | 6/1997 |
| WO | WO 97/22100 | 6/1997 |
| WO | WO 97/22101 | 6/1997 |
| WO | WO 97/22102 | 6/1997 |
| WO | WO 97/22103 | 6/1997 |
| WO | WO 97/22104 | 6/1997 |
| WO | WO 97/22105 | 6/1997 |
| WO | WO 97/22106 | 6/1997 |
| WO | WO 97/22107 | 6/1997 |
| WO | WO 97/22108 | 6/1997 |
| WO | WO 97/22109 | 6/1997 |
| WO | WO 97/22110 | 6/1997 |
| WO | WO 97/22111 | 6/1997 |
| WO | WO 97/22112 | 6/1997 |
| WO | WO 97/12819 | 7/1997 |
| WO | WO 97/23819 | 7/1997 |
| WO | WO 97/41688 A1 | 11/1997 |
| WO | WO 97/45798 | 12/1997 |
| WO | WO 98/02836 | 1/1998 |
| WO | WO 98/08344 | 2/1998 |
| WO | WO 9808344 A | 2/1998 |
| WO | WO 98/18086 | 4/1998 |
| WO | WO 9818086 | 4/1998 |
| WO | WO 98/48566 | 10/1998 |
| WO | WO 98/53581 | 11/1998 |
| WO | WO 99/26415 | 11/1998 |
| WO | WO 99/12349 | 3/1999 |
| WO | WO 99/18701 A1 | 4/1999 |
| WO | WO 99/44144 | 9/1999 |
| WO | WO 9944144 A | 9/1999 |
| WO | WO 99/45491 | 10/1999 |
| WO | WO 99/52285 | 10/1999 |
| WO | WO 99/66719 | 12/1999 |
| WO | WO 00/62228 A3 | 10/2000 |
| WO | WO 01/18665 A1 | 3/2001 |
| WO | WO 01/18665 A1 | 3/2001 |

OTHER PUBLICATIONS

Waite Group Press; An Interactive Lession in the Interactive Course Series; 3 pages.

Pasquier-Boltuck, et al. Protoyping an Interactive Electronic Book System Using an Object-Oriented Approach; Aug. 1988; p. 177-190.

Boyle, et al.; A Survey and Classification of Hypertext Documentation Systems; 1992; pp. 90-111.

Bogdan Czejdo; Using an ER Query and Update Interface for Rapid Prototyping of Hypertext Systems; Feb. 1990; pp. 227-236.

Terri L., Herron; Teaching with the Internet; 1998; pp. 217-222.

Bieber, et al.; Fourth Generation Hypermedia: some missing links for the world wide web; Jul. 1997; pp. 31-65.

Yankelovich, et al.; Reading and Writing the Electronic Book; Oct. 1985; pp. 15-30.

Antelman et al. "Collection Development in the Electronic Library," Proceedings of the 21rst annual ACM SIGUCCS Conference on User Services, San Diego, CA, p. 50-56, 1993.

Herron T.L., "Teaching with the Internet" Internet and Higher Education, US, JAI Press, Stamford, CT, vol. 1, No. 3, 1998, pp. 271-222, XP002118719, ISSN: 1096-7516.

Azuma J., "Creating Educational Web Sites", IEEE Communications Magazine, US, IEEE Service Center, Piscataway, N.J., vol. 37, No. 3, Mar. 1999, pp. 109-113, XP000823980, ISSN: 0163-6804.

Goldberg, M.W. et al., "World Wide Web-Course tool: An environment for building WWW-based courses", Computer Networks and ISDN Systems, NL, North Holland Publishing, Amsterdam, vol. 28, No. 11, May 1, 1996, pp. 1219-1231, XP004018222, ISSN: 0169-7552.

An Interactive Lesson in the Interactive Course Series, Waite Group Press, Macmillan Computer Publishing, 'Online! 1996, XP000829591, Retrieved from the Internet: URL:http://www.waite.com/> 'retrieved on 1996!.

Goorfin, L., "Electronic Dictionary Pronounces over 83,000 Words", Speech Technology, Man-Machine Voice Communications, US, Media Dimensions Inc., New York, vol. 4, No. 4, Apr. 1, 1989, pp. 78-79, XP000033505, ISSN: 0744-1355.

Hartley, S. et al., "Enhancing Teaching Using the Internet", SIGCSE/SIGCUE Conference on Integrating Technology into Computer Science Education, US, New York, ACM, vol. CONF. 1, Jun. 2, 1996, pp. 218-228, ISBN: 0-89791-844-4.

Seno, H. et al., "A Consideration of Data Transmission Method for Enhanced Teletext", NHK Science and Technical Research Laboratories, ITEJ Technical Report, vol. 16, No. 71, Oct. 1992, Japan, pp. 1-6.

Technology Update, Wordperfect Corporation Introduces Wordperfect 6.0 for DOS, http://www.nfbnet.org/files/word_processing/WP60.TXT, Mar. 24, 1993.

T.V. Raman, "An Audio View of (LA)Tex Documents," Proceedings of the 1191 Annual Meeting, pp. 1001-1008.

Microsoft Press Computer Dictionary Second Edition, Microsoft Press, 1994, p. 418.

"A Survey and Classification of Hypertext Documentation Systems," Boyle, C. et al; *IEEE Transactions on Professional Communication*; IEEE Inc.; New York; vol. 35, No. 2; Jun. 1, 1992.

"An Interactive Lesson in the Interactive Course Series" Waite Group Press, MacMillan Computer Publishing, Online! 1996, XP00082591, Retrieved from the Internet: <URL:http//www.waite.com/> retrieved on 1996!.

"An Interactive Lesson in the Interactive Course Series," Waite Group Press, Macmillian Computer Publishing, 'Online! 1996, XP000829591 Retrieved from the Internet: <URL:http://www.waite.com/22 'retrieved on 1996!.

"Electronic Dictionary Pronounces over 83,000 Words," *Speech Technology*; Man-Machine Voice Communications, U.S., Media Dimensions Inc.; New York, vol. 4, No. 4; Apr. 1, 1989, pp. 78-79.

"Enabling the book metaphor for the World-Wide-Web: disseminating on-line information as dynamic Web documents," Rauch, T. et al.; *IEEE Transactions on Professional Communications*, Jun. 1997; vol. 40, No. 2, pp. 111-128.

"Fourth generation hypermedia: some missing links for the World Wide Web," *International Journal of Human-Computer Studies*; U.S.; Academic Press: New York; vol. 47, No. 1; Jul. 1997; pp. 31-65.

"Multimedia Systems," *A Dynamic Policy of Segment Replication for Load-Balancing in Video-On-Demand Servers*; Dan, et al.; Jul. 1995.

"Prototyping an Interactive Electronic Book System Using and Object-oriented Approach," Pasquier-Boltuck, J. et al.; *ECOOP*; european Conference on Object-oriented Programming; Aug. 15, 1988; pp. 177-190.

"Reading and Writing the Electronic Book," *Computer*; U.S. IEEE Computer Society, Long Beach, Calif., U.S. vol. 18, No. 10, Oct. 1, 1985.

"Subscription Teletext for Value Added Services", Dr. G.T. Sharpless, IEEE Transactions on Consumer Electronics, Aug, 1985, No. 3, p. 283.

"The Internet bookstore opens for business", Medford: Jul./Aug. 1994. vol. 11, Iss. 4; p. 21 (1 page).

"Using an ER Query and Update Interface for Rapid Prototyping on Hypertext Systems," Czejdo, B.; Proceedings of the Annual Hawaii International Conference on System Sciences; Jan. 1, 1990.

A Store-and-Foward Architecture for Video-on-Demand Service.

A Survey and Classification of Hypertext Documentation Systems, IEEE Transaction on Professional Communication.

A.D. Gelman, et al.; A Store-And-Forward Architecture For Video-On-Demand Service; ICC 91 Conf.; Jun. 23-26, 1991;pp. 842-846.

Alcatel Teletra: Markets and Products Overview.

Alexander Felman, et al., "An Architecture For Interactive Applications", May 1993, pp. 848-852.

An Interactive Lesson. . ..

An Interactive lesson in the interactive course series, Aug. 1996.

An Interactive Videotex System for Two-Way CATV Networks.

*Applied Cryptography Protocols, Algorithms, and Source Code in C* (pp. 34-44); Schneier, Bruce; Pub. 1999 by John Wiley & Sons.

Azyma J.: "Creating Educational Web Sites", IEE Communications Magazine, U.S. IEEE Service Center, Piscataway, N.J., vol. 37, No. 3, Mar. 1999, pp. 109-113.

Barnes, 10 Minute Guide to Windows 3.1., Alpha Books, 1992, pp. 60-64.

Basch, Reva, "Books Online: Visions, Plans, and Perspectives for Electronic Text", Online. Medford; Jul. 1991. vol. 15, Iss. 4; 13 (11 pages).

Bestler, "Flexible Data Structure and Interface Rituals for Rapid Development of OSD Applications", pp. 223-236, Jun. 1993.

Biber, et al.; Fourth generation hypermedia: some missing links for the World Wide Web; Jul. 1997; pp. 31-65.

Bogdan Czejdo, "Using an ER Query and Update Interface for Rapid Prototyping of Hypertext Systems", Jan. 1990, pp. 227-236.

Boltuck et al.; Prototyping an Interactive Electronic Book System Using an Object-Oriented Approach; Aug. 1988; pp. 1770190.

*Books Online* . . . ; Basch; Jul. 1991.

Boom, "An Interactive Videotext System", pp. 397-401, Nov./Dec. 1986.

Boyle C. et al.: "A Survey and Classification of Hypertext Documentation Systems", IEE Transactions on Professional Communications, US, IEE Inc., New York, vol. 35, No. 2, Jun. 1, 1992, pp. 98-111.

Broering, "The Electronic Library and IAIMS at Georgetown University", Policy Issuees in Information and Communication Techniques in Medical Applications, 1988. Symposium Record Sep. 29-30, 1988 pp. 27-29.

Caejdo B.: "Using an ER Query and Update Interface for Rapid Prototyping of Hypertext Systems", Proceedings of the Annual Hawaii International Conference on System Sciences, Jan. 1, 1990, p. 231.

Caitlin Bestler, "Flexible Data Structures and Interface Rituals for Rapid Development of OSD Applications", Jun. 1993, pp. 223-236.

Chan, "Principles, Structure and Format", Immroth's Guide to the Library of Congress Classification, 4th Edition, 1990, Chapter 2, pp. 19-51.

Consumer Digest advertisement; Xpand Your TV's Channel Capability; Fall/Winter 1992; p. 215.

Craig Boyle, et al., "A Survey and Classification of Hypertext Documentation Systems", Jun. 1992, pp. 98-111.

Creating Educational Web Sites.

Czejdo B.: "Using an ER Query and Update Interface for Rapid Prototyping of Hypertext Systems" Proceedings of the Annual Hawaii International Conference on Systems Sciences, Jan. 1, 1990, p. 231.

Dan A. Et al.: "A Dynamic Policy of Segment Replication for Load-Balancing in Video-on-Demand Servers", Multimedia Systems, Springer Verlag, DE, vol. 3, No. 3, Jul. 1995, pp. 93-103.

Daniel M. Moloney, Digital Compression in Today's Addressable Environment; 1993 NCTA Technical Papers; Jun. 6, 1993; pp. 308-316.

DeBuse, SO That's a Book . . . Advancing Technology and the Library, Mar. 1988, Information Technology and Libraries, vol. 7, Issue 1, pp. 7-18.

Digital Compression in Today's Addressable Environment.

Dinaro et al., "Markets and Products Overview", 1991.

Dr. G. T. Sharpless, IEE Transactions on Consumer Electronics, vol. CE-31, No. 3, aug. 1985, pp. 283-289.

*Electronic Book as* . . . ; Valauskas; Auust 1993 Electronic Dictionary Pronoucnes . . . , Speech Technology.

Enabling the Book Metaphor, IEEE Transactions on Professional Communication.

Endo et al., "Electronic Book in 3.5 Floppy Disk", Consumer Electronics, 1994. Digest of Technical Papers, IEEE 1994 International Conference on Jun. 21-23, 1994 pp. 316-317.

Enhancing Teaching *Flexibl Data Structures and Interface Rituals for Rapid Development of OSD Applications*, Caitlin Bestler, 93 NCTA Tech. Papers, pp. 223-236; Jun. 6, 1993.

Fourth Generation Hypermedia . . . , Int'l Journal of Human-Computer Sciences Studies.

Fox, et al., Users, user interfaces, and objects: Envision, a Digital Library, Sep. 1993, Journal of the American Society for Information Sciences, vol. 44, issue 8, p. 480.

Für Geschlossene, Fur Geschlossene; Funkschau; Aug. 25, 1989.

Gelman, et al., "An Architecture For Interactive Applications", May 1993, pp. 848-852.

Goldberg M W et al.: "World Wide Web—course tool: An environment for building WWW-based courses" Computer Networks and ISDN Systems, NL, North Holland Publishing. Amsterdam, vol. 28, No. 11, May 1, 1996.

Goorfin L.: "Electronic Dictionary Pronounces over 83,000 Words" Sp[eech Technology, Man-Machine Voice Communications, U.S., Media, Dimensions, Inc. New York, vol. 4, No. 4, Apr. 1, 1989, pp. 78-79.

Great Presentations advertisement; Remote, Remote; 1987; p. 32H.

H. Van Den Boom, An Interactive Videotex System for Two-Way CATV Networks, Dec. 1986, pp. 397-401.

Hartley S et al.: "Enhancing Teaching Using the Internet" SIGCSE/SIGCUE Conference on Integrating Technology into Computer Science Education, US, New York, ACM, vol. CONF. 1, Jun. 2, 1996, pp. 218-228.

Henri van den Boom; An Interactive Videotex System for Two-Way CATV Networks; Nov. 1986; pp. 397-401.

Herron T L: "Teaching with the Internet" Internet and Higher Education US, Jai Press, Stamford, CT, vol. 1, No. 3, 1998, pp. 217-222.

Hong Consumer Products From SVI; Nov. 1988; p. 379 Kong Enterprise advertisement; Two Innovative New.

Hong Kong Enterprise; Advertisement Two Innovative New Consumer Products From SVI, Nov. 1988, p. 279.

HP-41 C Operating Manual, Hewlett Packard Co., Dec. 1982.

Human Factors in Telecommunications; Sorce et al.
Indian Patent Application 762-Cal-93.
Indian Patent Application 765-Cal-93.
Inter et al., "The Dewey Decimal Classification", Special Libraries: A Cataloging Guide, 1998, Chapter 11, pp. 211-239.
*Interactive Videotex*; van den Boom, Nov.-Dec. 1986.
John Riemer: Memories in My Pocket; BYTE; Feb. 1991; pp. 251-258.
Junichi Azuma; Creating Education Web Sites; Mar. 1999; pp. 109-113.
Kubota H. et al.: "Terrestrial Data Multiplex Broadcasting News Delivery System and Its Terminal", IEE Transactions on Consumer Electronics, U.S., IEEE Inc., New York, Vo.. 43, No. 3, Aug. 1, 1997, pp. 504-509.
Lewis et al.; ("Shared books: collaborative publication management for an office information system"); ACM SIGIOS Bulletin Conference sponsored by ACM SIGOIS and IEEECS TC-OA on Office information systems, vol. 9, Issue 2-3, Apr. 1988.
Mann et al.; ("A coherent distributed file cache with directory write-behind") ACM Transactions on Computer Systems (TCOS), vol. 12, Issue 2, May 1994.
Marco Dinaro, Alcatel Telettra; Markets and Products Overview; Revue HF Tijdschrift 15; 1991; pp. 135-148.
Markets and Products Overview: Dinaro et al.
Medley, et al.; Enhancing teaching using the Internet; Feb. 1996: pp. 218-228.
Memories in My Pocket; Reimer; Byte, pp. 251, 252, 254, 255, 256, 258, Feb. 1991.
Michael Bieber, et al.; Fourth Generation Hypermedia: some missing links for the World Wide Web; 1997; pp. 31-65.
Miyazawa, et al., An electronic book: APT Book, Aug. 1990, Human-Computer Interaction, INTERACT '90, Proceedings of the IFIP TC 13 Third International Conference, Cambridge, UK, pp. 513-519.
*Multimedia Systems, A Dynaic Policy of Segment Replicatoin for Load-Balancing in Video-On-Demand Servers (see 111)*; Dan et al.; Jul. 1995.
Nicole Yankelovich, et al., "Reading and the Electronic Book", Oct. 1985, pp. 16-30.
O'Gorman, "Image and document processing techniques for the RightPages electronic library system", Conference B: Pattern Recognition Methodology and Systems, Proceedings, 11th IAP International Conference on Aug. 30-Sep. 3, 1992 pp. 260-263.
Olshansky & Joyce: Subscriber Distribution Networks Using Compressed Digital Video; Journal of Lightwavw Tech; Nov. 1992; pp. 1760-1765.
Pasquier-Boltuck J et al: Prototyping an Interactive Electronic Book System Using an Object-Oriented Approach; ECOOP. European Conference on Object-Oriented Programming. Aug. 15, 1998, pp. 177-190.
Pobiak, "Adjustable access electronic books", Computing Applications to Assist Persons with Disabilities, 1992, Proceedings of the John Hopkins National Search for Feb. 1-5, 1992 pp. 90-94.
Prototyping an Interactive Electronic Book System Raman, T.V., Audio System for Technical Readings, May 1994, Cornell University, pp. 1-129.

Rauch T et al: "Enabling the Book Metaphor for the World-Wide-Web: Disseminating On-line Information as Dynamic Web Documents" IEEE Transactions on Professional Communications. Jun. 1997. IEEE, USA, vol. 40, No. 2, pp. 111-128.
Rawlins, "The New Publishing—Technology's impact on the publishing industry over the next decade", Nov. 12, 1991, pp. 1-65.
Reading and Wriring the Electronic Book, IEEE Computer Science.
Reimer; "Memories in My Pocket", Feb. 1991, pp. 251-258.
*Remote, Remote*, Great Presentations advertisement, p. 32H; Nov. 1988.
Schatz, "Building an electronic scientific community", System Sciences, 1991. Proceeding of the Twenty-Fourth Annual Hawaii International Conference on vol. iii, Jan. 8-11, 1991 pp. 739-748 vol. 3.
Schepers C.: "Fur Geschlossene Benutzergruppen" Funkschau, De, Franzis-Verlag K.G. Munchen, No. 18, Aug. 25, 1989, pp. S53-S54.
Sharpless, Dr. G. T., "Subscription teletext for value added services", IEEE Transactions On Consumer Electronics, vol. CE-31, No. 3, Aug. 1985.
Simpson, Alan, Mastering WORDPERFECT® 5.1 & 5.2 for Windows, 1993, Sybex, Inc., pp. 72-73.
Soloview; ("Prefetching in segmented disk cache for multi-disk systems") Proceedings of the fourth workshop on I/O in parallel and distributed systems: part of the federated computing research conference; May 1996.
Speech Technology, "Electronic Dictionary Pronounces Over 35,000 Words", pp. 78-79 (1989).
Stephen Hartley, et al.; Enhancing Teaching Using the Internet; Feb. 6, 1996; pp. 218-228.
Subscriber Distribution Networks Using Compressed Digital Video.
Subscription Teletex for Value Addes Services.
Teching with the Internet.
*Technology's Impact on . . .* ; Rawlins; Nov. 21, 1991.
Telman, et al.; A Store-and-Forward Architecture for Video-on-Demand Service; 1991; pp. 842-846.
Terrestrial Data . . . Terri Herron; Teaching with the Internet; 1998; pp. 217-222.
*The Internet Bookstore . . .* ; Jul./Aug. 1994.
Thyra Rauch, et al., "Enabling the book metaphor for the World Wide Web: Disseminating on-line information as dynami[c] Web documents", Jun. 1997, pp. 111-128.
Two Innovatice New Consumer Products from SVI.
Using an ER Query ad Upate Interface . . . , Proceedings of the Annual Hawaii.
Valauskas, Edward J, "Electronic books as databases", Database. Aug. 1993. vol. 16, Iss. 4; p. 84 (3 pages).
Van Den Boom, "An Interactive Videotex System for Two-Way CATV Networks", vol. 40, No. 6, pp. 397-401, Dec. 1986.
Waite Group Press; An Interactive Lesson in the Interactive Course Series, 1996.
*World Wide Web—Course Tool*, Goldberg, M.W., et al., May, 1996
Xpand your TV's Channel Capability.
Yankelovich N et al: "Reading and Writing the Electronic Book" Computer, US, IEEE Computer Society. Long Beach, CA, US, vol. 18, No. 10.

* cited by examiner

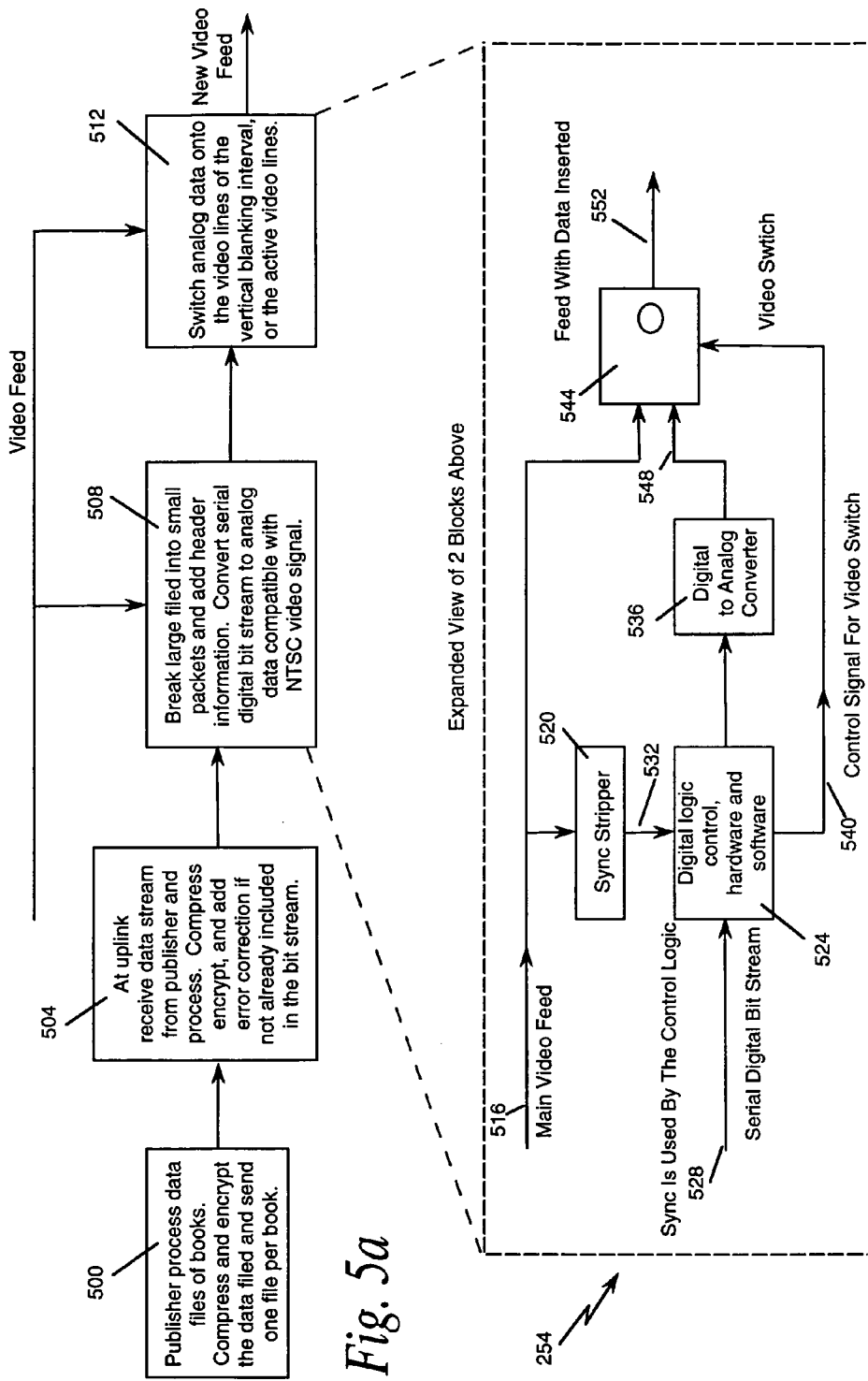

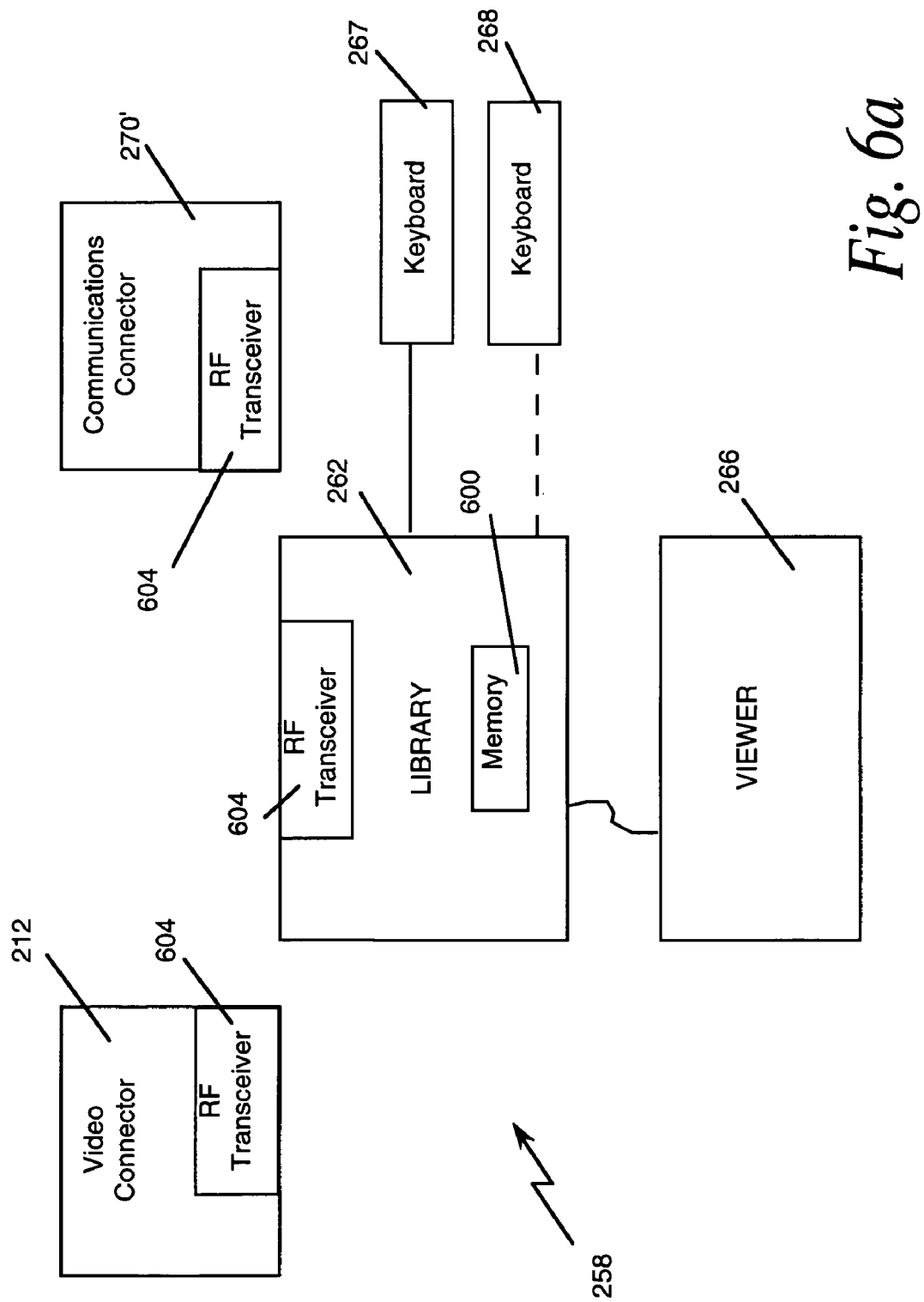

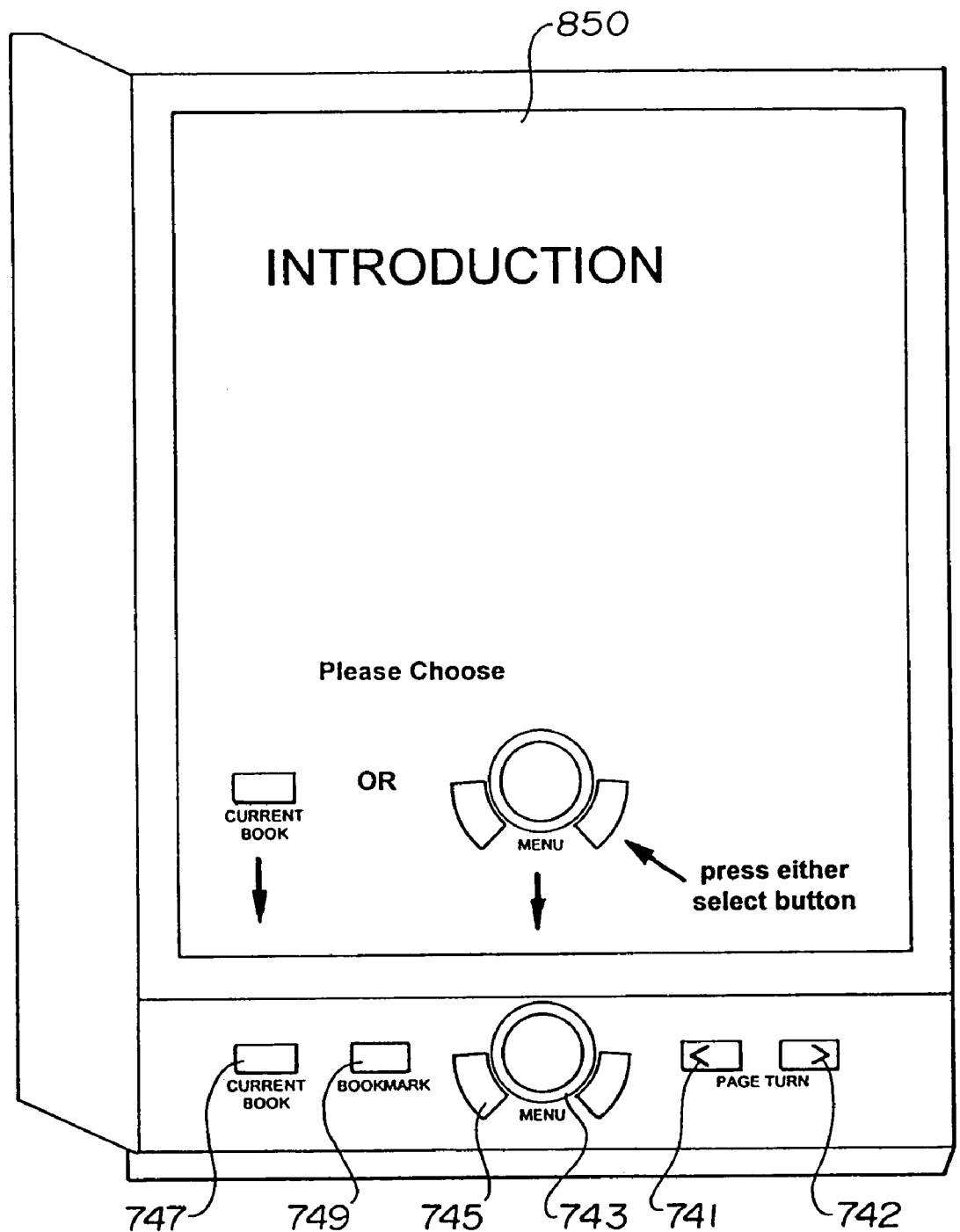

Show Links by:

Show all links visible
   Show links in selected range
   Show only 20 links at a time
   Show only links of type:

To Dictionary
      To Glossary
      To audio clips
      To video clips
      To links within existing book
      To links on viewer
      To links on Home System
      To external links

ELECTRONIC BOOK ELECTRONIC LINKS

RELATED APPLICATIONS

This application is a continuation-in-part of U.S. application Ser. No. 08/336,247 entitled ELECTRONIC BOOK SELECTION AND DELIVERY SYSTEM, filed Nov. 7, 1994, now U.S. Pat. No. 5,986,690, and U.S. application Ser. No. 08/160,194, entitled ADVANCED SET-TOP TERMINAL FOR CABLE TELEVISION DELIVERY SYSTEMS, filed Dec. 2, 1993, now U.S. Pat. No. 5,990,927, and U.S. application Ser. No. 08/906,469, entitled REPROGRAMMABLE TERMINAL FOR SUGGESTING PROGRAMS OFFERED ON A TELEVISION PROGRAM DELIVERY SYSTEM, filed Aug. 5, 1997 now U.S. Pat. No. 6,408,439, which is a continuation of U.S. application Ser. No. 08/160,281, entitled TERMINAL FOR SUGGESTING PROGRAMS OFFERED ON A TELEVISION PROGRAM DELIVERY SYSTEM, filed Dec. 2, 1993, which is now U.S. Pat. No. 5,798,785, dated Aug. 25, 1998, and U.S. application Ser. No. 09/237,827, filed on even date herewith, entitled ELECTRONIC BOOK HAVING LIBRARY CATALOG MENU AND SEARCHING FEATURES. These applications are incorporated by reference herein.

TECHNICAL FIELD

This invention is directed to an electronic book unit having one or more electronic books. More specifically, the invention is an electronic book with links to other electronic files.

BACKGROUND ART

Sparked by the concept of an information superhighway, a revolution will take place in the distribution of books. Not since the introduction of Gutenberg's movable typeset printing has the world stood on the brink of such a revolution in the distribution of text material. The definition of the word "book" will change drastically in the near future. Due to reasons such as security, convenience, cost, and other technical problems, book and magazine publishers are currently only able to distribute their products in paper form. This invention solves the problems encountered by publishers.

SUMMARY OF INVENTION

An electronic book selection and delivery system is a new way to distribute electronic books to bookstores, public libraries, schools and consumers. The technological breakthroughs of this invention provide a secure system for both delivering selected electronic books and receiving payments. The system has an unusual combination of features that provides the consumer with an electronic book unit that has a high tech aura while being very practical, portable, and easy to use.

The clear advantage of the system is that it eliminates the distribution of any physical object such as a paper book or computer memory device from any book or text distribution system. The purchase of an electronic book may become a PAY-PER-READ™ event avoiding the overhead, "middlemen," printing costs, and time delay associated with the current book distribution system. Published material and text such as the President's speech, a new law, a court decision on abortion, or O. J. Simpson's testimony can be made immediately available to the consumer at a nominal fee.

The system is a novel combination of new technology involving the television, cable, telephone, and computer industries. It uses high bandwidth data transmissions, strong security measures, sophisticated digital switching, high resolution visual displays, novel controls, and user friendly interface software.

The primary components of the text delivery system are the subsystem for placing the text onto a signal path and the subsystem for receiving and selecting text that was placed on the signal path. The preferred embodiment of the system includes additional components and optional features that enhance the system. The system may be configured for use by bookstores, public libraries, schools and consumers.

The system for consumer use is made up of four subsystems, namely: (1) an operations center, (2) a distribution system, (3) a home subsystem including reception, selection, viewing, transacting and transmission capabilities, and (4) a billing and collection system.

The operations center performs several primary functions: manipulating text data (including receiving, formatting and storing of text data), security encoding of text, cataloging of books, providing a messaging center capability, and performing uplink functions. The system delivers the text from the operations center to consumer homes by inserting text data into an appropriate signal path. The insertion of text is generally performed with an encoder at an uplink site that is within or near the operations center. If the signal path is a video signal path, the system can use several lines of the Vertical Blanking Interval (VBI), all the lines of the analog video signal, a digital video signal or unused portions of bandwidth to transmit text data. Using the VBI delivery method, the top ten or twenty book titles may be transmitted with video during normal programming utilizing existing cable, satellite, wireless or broadcast transmission capability without disruption to the subscriber's video reception. Using the entire video signal, thousands of books may be transmitted within just one hour of air time. Nearly any analog or digital video distribution system may be used to deliver the video signal with included text.

The text data may also be transmitted over other low and high speed signal paths including a telephone network (e.g., a public switched telephone network) having a high speed connection such as an asynchronous digital subscriber line (ADSL) connection.

The home subsystem performs four primary functions: connecting to the video distribution system, selecting text, storing text, and transacting through a phone or cable communicating mechanism. The components of the home subsystem may be configured in a variety of hardware configurations. Each function may be performed by a separate component, the components may be integrated, or the capability of existing cable set top converter boxes and televisions may be utilized. Preferably, a connector, library unit and an electronic book unit, or viewer unit, are used. The connector portion of the home subsystem receives the analog video signal and strips or extracts the text from the video. The home library stores the text signal, provides a user friendly software interface to the system and processes the transactions at the consumer home. The viewer provides a screen for viewing text or menus and novel user friendly controls. The viewer may also incorporate all the functionality of the home subsystem.

The viewing device is preferably a portable book shaped viewer which stores one or more electronic books for viewing and provides a screen for interacting with the home library unit. A high resolution LCD display is used to both read the books and to interact with the home library software. An optional phone connector or return-path cable connection initiates the telephone calls and, with the aid of the library, transmits the necessary data to complete the ordering and billing portion of the consumer transaction. The user friendly controls include a bookmark, current book and page turn button. The billing and collection system performs transaction management, authorizations, collections and publisher payments automatically utilizing the telephone system.

The electronic link system provides links to other electronics files. The other electronic files may be associated with a specific electronic book. Examples include book reviews and Internet databases. The other electronic files may be included as part of a specific electronic book. Examples include links between a Table of Contents or an Index, and the text of the specific electronic book. The other electronic files may be stored in the viewer or home library unit. Examples include a dictionary and a foreign-language translation dictionary.

The electronic links may be provided by the content supplier. That is, the operations center, or the book's publisher, may provide additional electronic files, such as the electronic dictionary, and may establish electronic links between the electronic dictionary and the text data of a specific electronic book, for example.

The electronic links may be subscriber-defined. That is, the subscriber may select a portion of the text of a specific electronic book, and generate a link between the portion and another electronic file. For example, the subscriber may generate a link between a Latin phrase in a specific book and its English translation in an electronic English dictionary or an electronic Latin-English translation dictionary.

The electronic link may be created using a standard programming language. For example, the links may be generated using Hypertext Markup Language (HTML).

A menu system may be provided to assist the subscriber to navigate through different link options.

The electronic links may also link a viewer with an external device or data base. For example, the electronic link may be used to access an Internet web site.

BRIEF DESCRIPTION OF DRAWINGS

FIG. 5a is a flow diagram of the processing at the operations center and uplink.

FIG. 5b is a block diagram of the hardware configuration for an uplink site.

FIG. 6a is a block diagram of the hardware configuration for a four component home subsystem.

FIG. 14a is a schematic of an introductory menu.

FIG. 21 is a schematic of a show links submenu.

DISCLOSURE OF INVENTION

Figure 1:
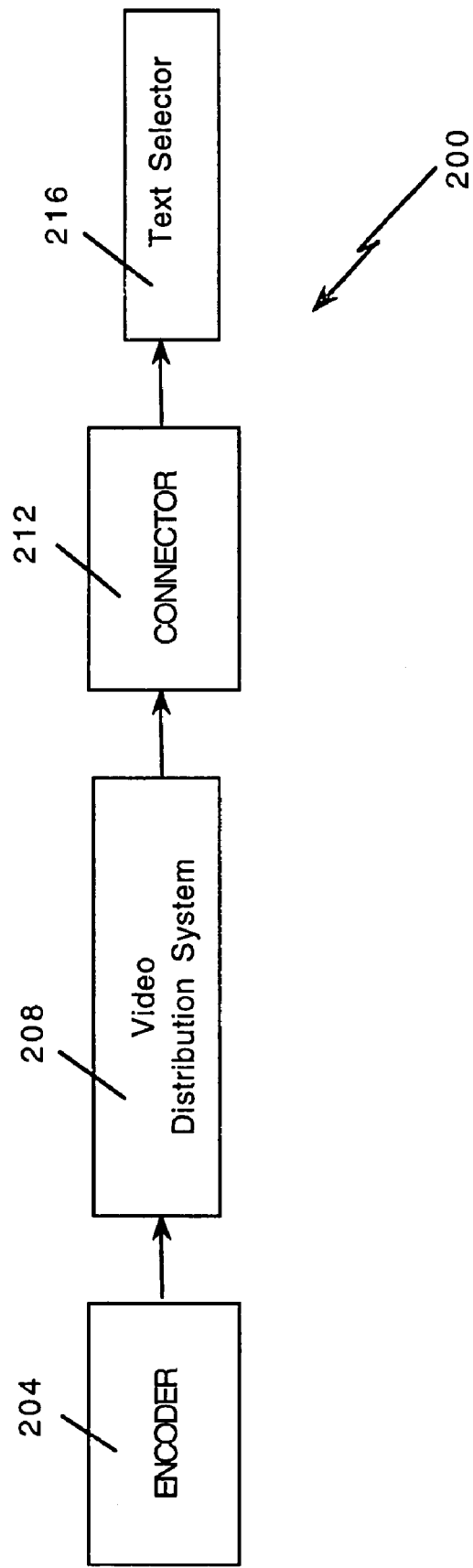
FIG. 1 is a block diagram of the primary components of the electronic book selection and delivery system.

The primary components of the electronic book selection and delivery system 200 are an encoder 204, a video distribution system 208, a connector 212, and a text selector 216 as shown in FIG. 1. The encoder 204 places textual data on a video signal to form a composite video signal. Although the composite signal may contain only textual data, it usually carries both video and textual data. A variety of equipment and methods may be used to encode text data onto a video signal. The video distribution system 208 distributes the composite video signal from the single point of the encoder 204 to multiple locations which have connectors 212. The connector 212 receives the digital or analog video signal from the video distribution system 208 and separates, strips or extracts the text data from the composite video signal. If necessary, the extracted text data is converted into a digital bit stream. Text selector 216 works in connection with the connector 212 to select text.

Using a connector 212 and text selector 216 combination, various methods of selecting and retrieving desired text from a composite or video signal are possible. Text may be preselected, selected as received or selected after being received and stored. The preferred method is for the connector 212 to strip or extract all the text from the video signal and have the text selector 216 screen all the text as received from the connector 212. The text selector 216 only stores text in long term or permanent memory if the text passes a screening process described below.

Figure 2:
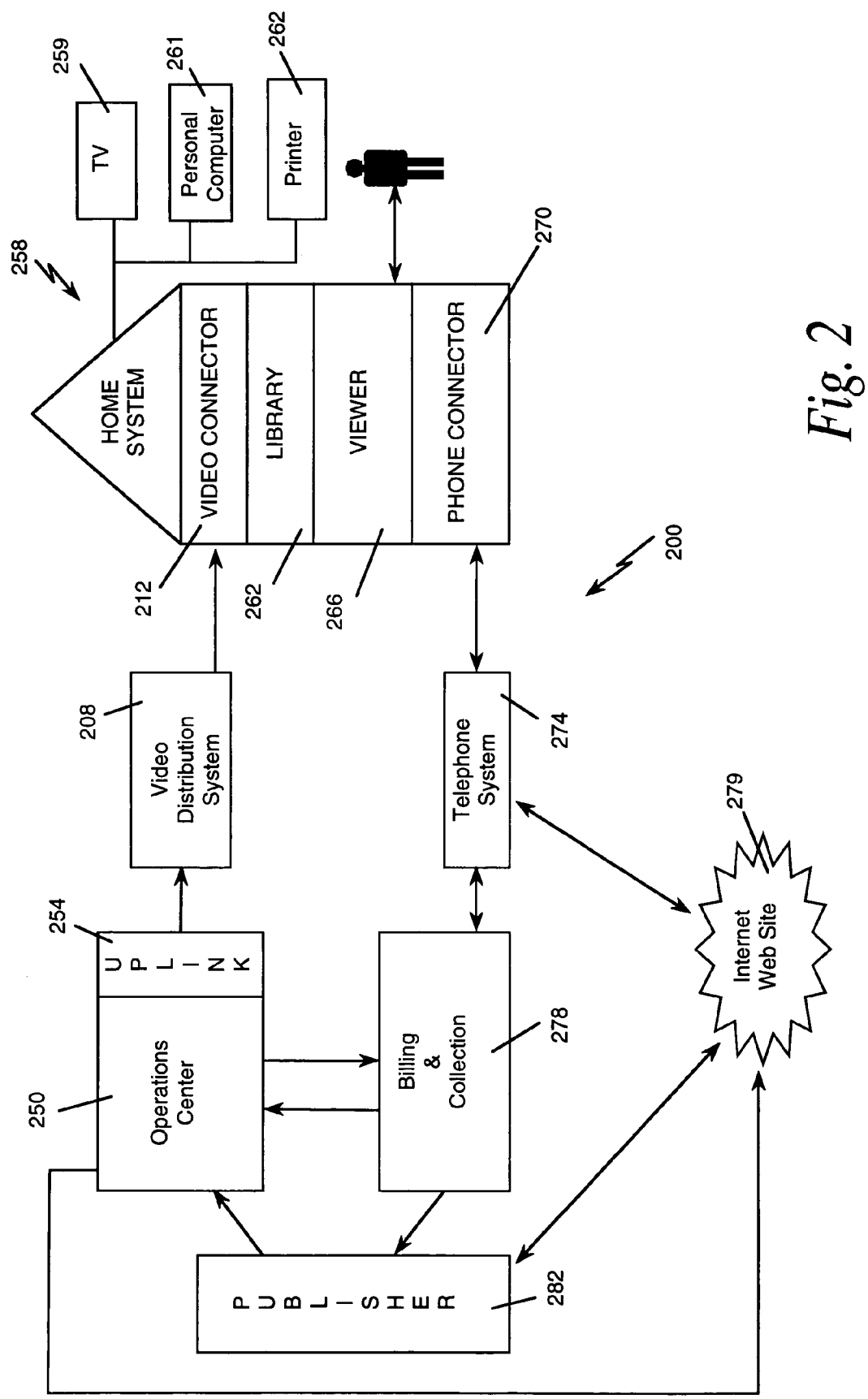
FIG. 2 is a schematic showing an overview of the electronic book selection and delivery system.

An overview of the electronic book selection and delivery system 200 is shown in FIG. 2. The delivery system 200 includes: an operations center 250 including an uplink site 254, a video distribution system 208, a home system 258 including a video connector 212, a library 262, a viewer 266, and a phone connector 270, telephone system 274, an internet web site 279 and a billing and collection system 278. Also as shown in FIG. 2, the home system 258 may include connections to a television 259 and a personal computer 261. The television 259 and the personal computer 261 may be used to display menu screens, electronic books, electronic files, or any other information associated with the delivery system 200. In addition, the television 259 and the personal computer 261 may provide control function that replicate and supplement those of the viewer 266.

The operations center 250 receives textual material from outside sources 282 such as publishers, newspapers, and on-line services. Alternately, the outside sources may maintain electronic books at the Internet web site 279. The outside sources 282 may convert textual and graphical material to digital format, or may contract with another vendor to provide this service. The operations center 250 may receive the textual and graphical material in various digital formats and may convert the textual material to a standard compressed format for storage. In so doing, the operations center 250 may create a pool of textual material that is available to be delivered to the home system 258. The textual material may be grouped by books or titles for easy access.

As used herein, "book" means textual or graphical information such as contained in any novels, encyclopedias, articles, magazines or manuals. The term "title" may represent the actual title assigned by an author to a book, or any other designation indicating a particular group, portion, or category of textual information. The title may refer to a series of related textual information, a grouping of textual information, or a portion of textual data. For example, "Latest Harlequin Romance", "Four Child Reading Books (Ages 10-12)", "Encyclopedia 'BRITANNICA'™", "President's Speech", "Instruction Manual", "Schedule of 4th of July Events", "Pet Handbooks", "Roe v. Wade", and "The Joy of Cooking" are suitable titles. Also, the title may be a graphical symbol or icon. Thus, a picture of a wrench may be a title for a repair book, a picture of a computer a title for a computer book, a graphical symbol of a telephone a title for a telephone book, a drawing of a dagger a title for a mystery book, a picture of a bat and ball a title for a sports book and a picture of ticker-tape a title for a business book. The term "electronic book" refers to the electronic counterpart to a "book."

The operations center 250 includes an uplink site 254 for placing the text onto a video signal and sending the composite video signal into a video distribution system. The uplink site 254 would generally include an encoder 204 (not shown in FIG. 2) to encode the text onto a video signal.

Many analog and digital distribution systems 208, or other telecommunications systems, can be used with the delivery system 200, such as a cable television distribution system, a broadcast television distribution system, video distributed over telephone systems, distribution from the Internet, direct satellite broadcast distribution systems, and other wired and wireless distribution systems.

The home system 258 performs five primary functions: (1) connecting with a video distribution system, (2) selecting data, (3) storing data, (4) displaying data, and (5) handling transactions. An important optional function of the home sub-system 258 is communicating using a telephone communication system 274. The home system 258 is made up of primarily four parts: a video connector 212 or similar type of connector for connecting with the video distribution system 208, a library unit 262 for storing and processing, an electronic book, or viewer unit, 266 for viewing menus and text and a telephone connector 270 for connecting with a telephone communications system 274. In an alternate arrangement, the viewer 266 may include all the functionality of the home system 258.

The billing and collection system 278 may be co-located with the operations center 250 or located remote from the operations center 250. The billing and collection system 278 is in communication with the home system 258 via telephone-type communication systems (for example 274). Any of a number of telephone type communication systems, such as, a cellular system, will operate with the billing and collection system 278. The billing and collection system 278 records the electronic books or portions of text that are selected or ordered by the subscriber. The collection system will charge a subscriber's credit account or bill the subscriber. In addition, the billing and collection system 278 will monitor that amount due to publishers or other outside sources 282 who have provided textual data or other services such as air time to enable the text delivery system 200 to operate.

When electronic books are provided via the Internet web site 279, the billing and collecting functions may be incorporated into the Internet web site 279. For example, a subscriber may pay for an electronic book selection by entering a credit card number into a data field of a page of the Internet web site 279. In this configuration, a separate billing and collection system may not be required.

Figure 3A:
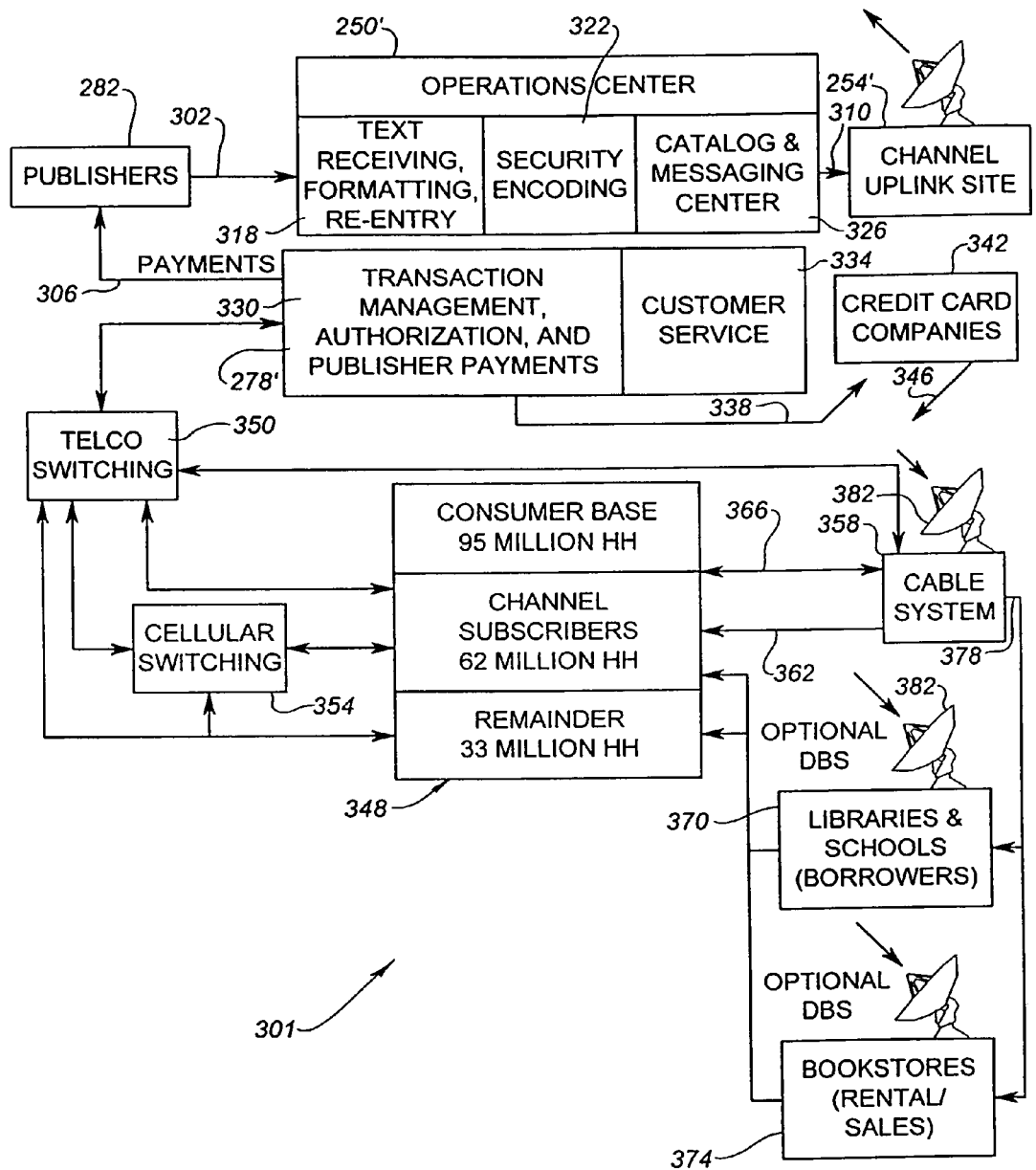
FIG. 3a is a schematic of the delivery plan for the electronic book selection and delivery system.

FIG. 3a is an expanded overview of a delivery plan 301 for the delivery system 200. The delivery plan 301 supports various types of subscribers and various billing systems. FIG. 3a shows that publishers 282 will provide text transfer 302 to the operations center 250' and receive payments 306 from the billing and collection system 278'. A separate channel uplink site 254' is shown in this configuration receiving data 310 from the operations center 250'. The operations center 250' has three separate sections (318, 322, 326) one for text receiving, formatting and re-entry 318, a second for security encoding 322 and a third section for catalog and messaging center functions 326.

The billing and collection system 278' shown has two sections (330, 334) one for transaction management, authorizations and publisher payments 330, and the other for customer service 334. The customer service section 334 provides for data entry and access to customer account information. Transaction accounting information 338 is supplied to credit card companies 342 by the transaction management section 330 of the billing and collection system 278'. The credit card companies 342 provide billing 346 to customers either electronically or by mail.

Three methods for communicating between the subscriber base 348 and the billing and collection system 278' are shown: by telephone switching 350 alone, cellular switching 354 and telephone switching 350 combined, and by use of the cable system 358 and the telephone switching 350. The system shown supports both one-way 362 and two-way cable communication 366 with subscribers. Public libraries and schools 370 as well as bookstores 374 may use the delivery system 301.

Public libraries and schools 370 would have a modified system to allow the viewer 266 to be checked-out or borrowed while bookstores 374 would rent or sell the viewer 266 and sell the electronic books. The bookstores 374 as well as the public libraries and schools 370 may be serviced by cable 378. Optional direct broadcast systems (DBS) 382 can also be used with the delivery system 200. The DBS 382 may provide the electronic books using digital satellite technology, with the electronic books being received via a backyard satellite antenna, for example.

Figure 3B:
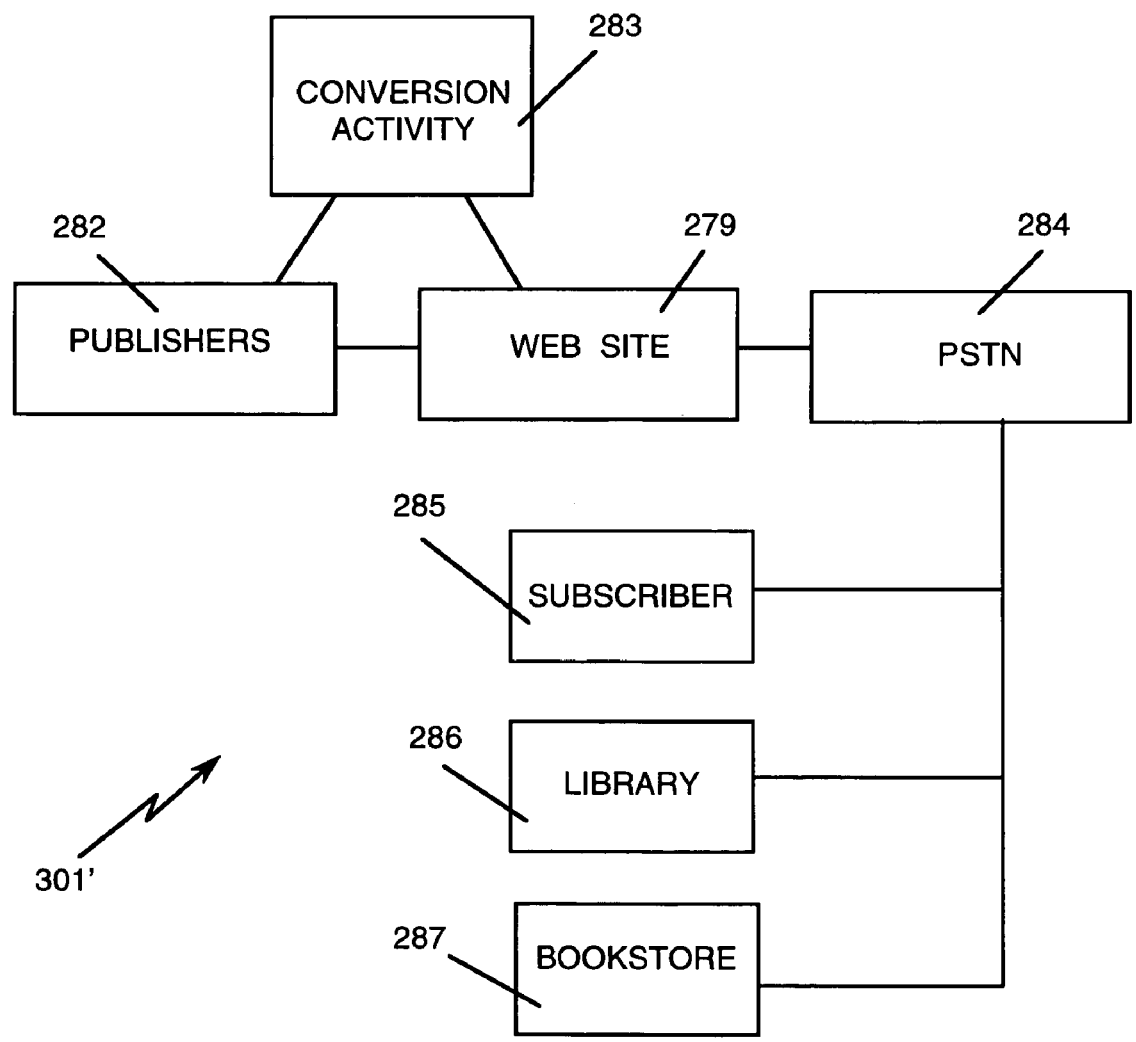
FIG. 3b is a schematic of an alternate delivery plan.

FIG. 3b is an alternate delivery plan 301' that provides for electronic book selection and delivery using the Internet. In FIG. 3b, the publishers 282 provide the electronic books to be posted at the Internet web site 279. The publishers may convert the text and graphical data to digital format, compress the digital data, and upload the compressed digital data to the Internet web site 279. Alternately, the publishers 282 may arrange for an outside conversion activity 283 to convert the text and graphical data to digital format. The conversion activity 283 may then provide the digital data to the Internet web site 279. For example, a large on-line bookstore could gather publications in electronic form from a variety of publishers, or could convert hard-copy books to electronic form, and post the electronic books on the Internet such as at the Internet web site 279.

The electronic books may then be transferred via a public switched telephone network (PSTN), for example, direct to a subscriber 285, a library 286 and a bookstore 287. The library 286 and the bookstore 287 may also provide electronic books to the subscriber 285.

I. The Operations Center

Figure 4:
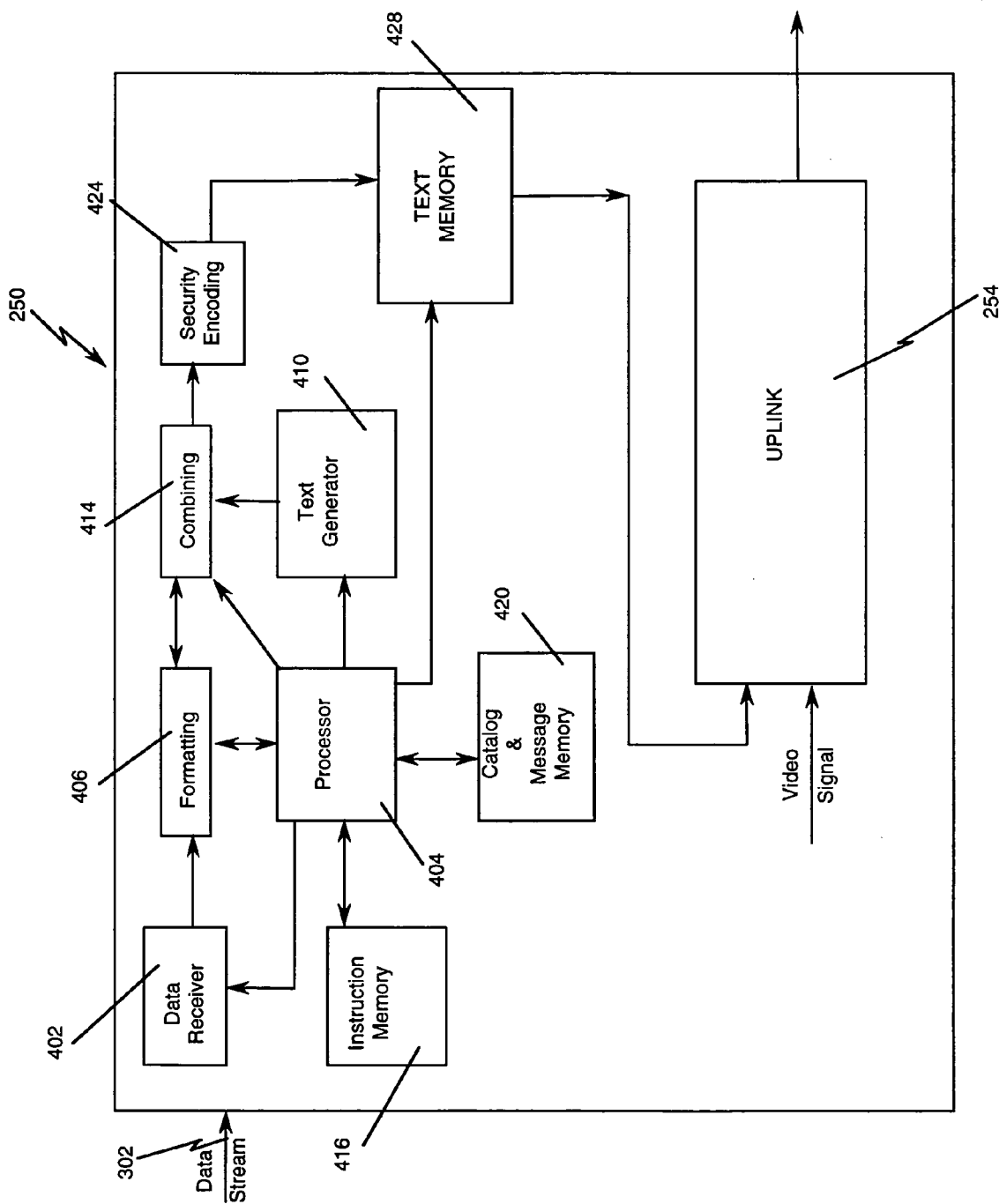
FIG. 4 is a block diagram of an operations center.

FIG. 4 is a schematic of an operations center 250 which includes an uplink 254. The operations center 250 gathers text or books by receiving, formatting, storing, and encoding. A data stream 302 containing text is received at the operations center 250 by a data receiver 402. The data receiver 402 is under the control of a processor 404. After reception, the data stream is formatted using digital logic for formatting 406 which is also under the control of the processor 404. If any additional text is being generated at the operation center 250 locally for insertion into the distributed signal, the text generation is handled through text generator hardware 410 which may include a data receiver and a keyboard (not shown). Following processing by the text generator 410, the additional text can be added to the text received by the combining hardware 414 that includes digital logic circuitry (not shown).

The processing at the operations center 250 is controlled by a processor 404 which uses an instruction memory 416. The processor 404 and instruction memory 416 may be supplied by a personal computer or mini-computer. To perform the catalog and messaging functions, the operations center 250 uses a catalog and message memory 420 and the text generator 410 if necessary.

The data stream of text, catalog and messages is preferably encoded by security module encoding 424 prior to being sent to the uplink module 254. Various encoding techniques may be used by the security encoding module 424 such as the commercial derivative of NSA's encryption algorithm (Data Encryption System (DES)) and General Instrument's DigiCipher II. Following encoding, the encoded text may be stored in text memory 428 prior to being sent to the uplink 254. A first-in-first-out text memory arrangement may be used under the control of the processor 404. Various types of memory may be used for the text memory 428 including RAM. The operations center 250 may use file server technology for the text memory 428 to catalog and spool electronic books for transmission as is described below.

To transmit textual data (i.e., electronic books), the delivery system 208 uses high bandwidth transmission techniques such as those defined by the North American Broadcast Teletext Standard (NABTS) and the World System Teletext (WST) standard. Using the WST format (where each line of the Vertical Blanking Interval contains 266 data bits), a four hundred page book, for example, may be transmitted during programming using four lines of the Vertical Blanking Interval at a rate of approximately one book every 1.6 minutes (63,840 bits per second). Alternatively, electronic books may be transmitted over a dedicated channel, which interrupts programming so that 246 lines of video can be used to transmit approximately 2,250 books every hour (3.9 Mbits per second). A teletext type format is the simplest but possibly the slowest text format to use with the delivery system 200. In either event, an encoder 204 is utilized at an uplink site 254 to insert textual data into the analog video signal. In many other respects, the delivery of the textual information is completed using existing cable television plant and equipment.

FIG. 5*a* is a flowchart of the steps involved in processing text from the publisher or provider 282 that occurs at the operations center 250. As shown in block 500, the publisher 282 processes data files of text for books, compresses, encrypts and sends the data files to the operations center 250 or uplink 254. Text files for books are preferably sent one book at a time. As shown in block 504, the uplink 254 or operations center 250 receives and processes the data stream from the publisher 282. Generally, part of this processing includes encryption and error correction.

As shown in block 508, files are broken into smaller packets of information. Header information is added to the packets. The bit stream is converted from a serial digital bit stream to an analog bit stream that is compatible with an NTSC video signal. Block 512 shows the switching of analog data into the video lines of a video signal. The analog data is generally placed either in the VBI or the active video lines. In some instances, it may be preferable to utilize unused portions of bandwidth (such as 5-40 MHZ, 70-75 MHZ, 100-109 MHZ or other guard bands) instead of the video lines.

FIG. 5*b* is an example of a hardware configuration to perform some of the functions for blocks 508 and 512. A video feed 516 is received and processed through a sync stripper 520. The stripped sync signal 532 is used by the digital logic control 524. The digital logic control 524 receives the sync signal 532 and a serial digital bit stream 528 for processing. The digital logic control 524 passes the serial digital bit stream to the Digital to Analog converter 536 and outputs a control signal 540 for the video switch 544. The video switch 544 integrates the video feed 516 and analog data stream 548 into a video feed with analog data signal inserted 552.

As an alternative to cable, satellite, broadcast, or other television delivery methods, the public telephone system may be used to transmit books to the subscribers. An average electronic book would take about 7 minutes to transmit over the public telephone system. Using the telephone system, it is not necessary to combine video and text into a composite signal. In most other respects, the operation center would remain similar whether text delivery was by telephone or cable. File server technology (such as that described in U.S. Pat. No. 5,262,875, entitled AUDIO/VIDEO FILE SERVER INCLUDING DECOMPRESSION/PLAYBACK MEANS, issued to Mincer, et al., and, U.S. Pat. No. 5,218,695, entitled FILE SERVER SYSTEM HAVING HIGH-SPEED WRITE EXECUTION, issued to Noveck, et al., incorporated herein by reference) may be used at the operation center with a telephone system text delivery method.

As another alternative to cable, television, and telephone system delivery, the public telephone system may be used to provide access to the Internet, where the Internet web site 279 may be accessed. Electronic books may be ordered, paid for, and delivered directly from the Internet web site 279 over the telephone system.

In any delivery system using the telephone system, individual subscribers may increase the electronic book deliver rate by incorporating high speed modems or other communication devices such as an Integrated Services Digital Network (ISDN) connector, or by use of an Asymmetric Digital Subscriber Line (ADSL)

II. The Home System

Figure 6B:
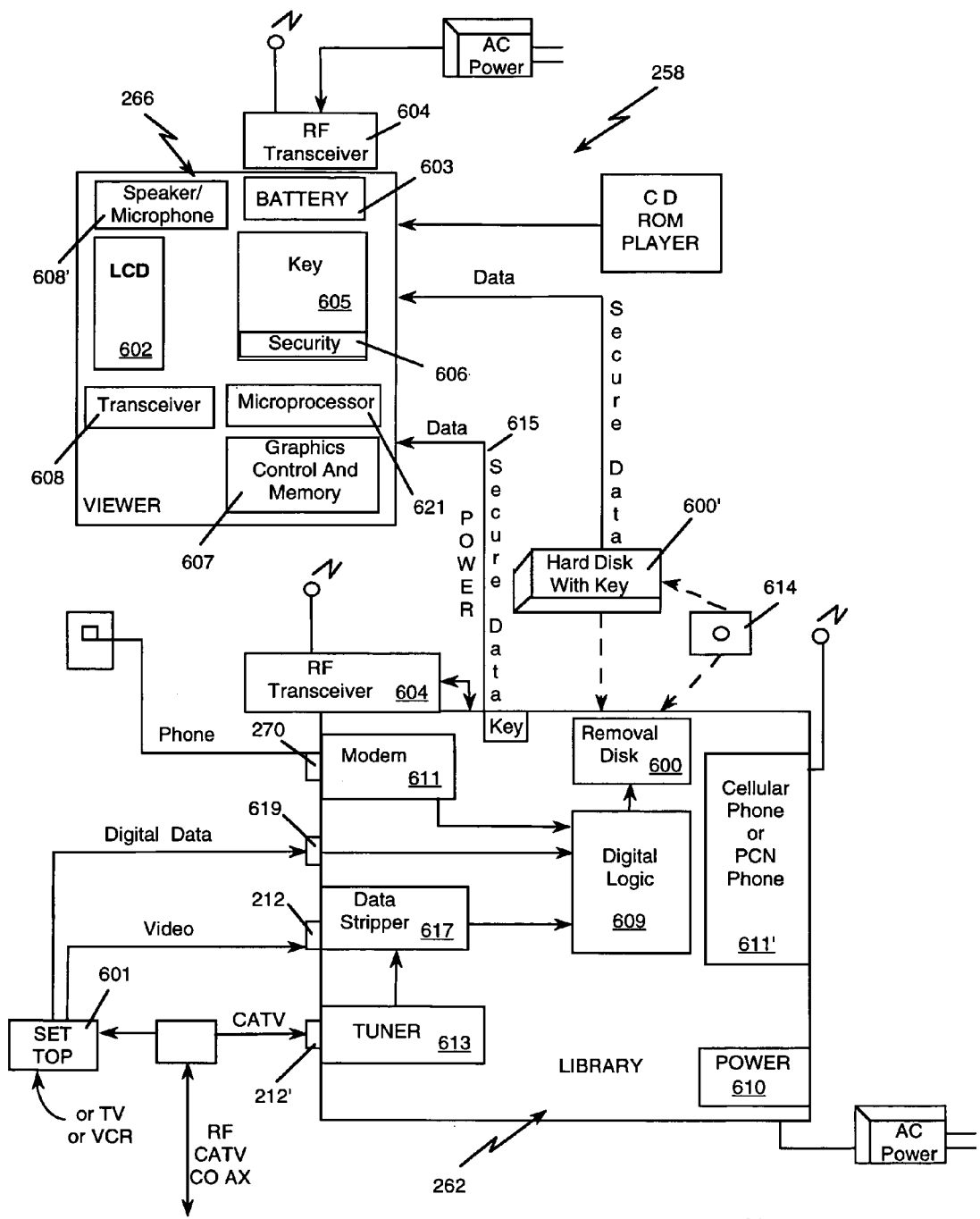
FIG. 6b is a schematic of a two unit home subsystem.

The hardware configuration for a four component home system 258 is shown in FIG. 6*a*. FIG. 6*b* shows a hardware configuration for a two component home system. The hardware components may also be incorporated into a single unit that communicates with a terminal in a television delivery system or with a telephone system by use of a modem, for example. The home system 258 performs several functions, such as receiving data and video transmissions, stripping (or extracting) the data from the video signal, screening and storing the data, providing user friendly interface controls and software, displaying menus and text, processing transactions, initiating telephone calls and transmitting billing data. Various hardware configurations may be utilized to achieve the desired functions of the home system 258. For example, as shown in FIG. 6*b*, the home system 258 can be configured to utilize the reception and channel tuning capability of the current installed subscriber base of cable converter boxes and televisions 601. The home system 258 can also be designed as an advanced set top terminal converter box with menu generation capability, electronic memory and a telephone modem as described in section V below.

The electronic components which make up the home system 258 can be arranged in a variety of ways. In the four unit system of FIG. 6*a* the viewer 266 and library unit 262 are wired together while the remaining components communicate through RF transceivers 604. In a simple version of the home system 258 there are only two units, the library unit 262 and a viewer 266. FIG. 6*b* shows a two unit home system 258 with certain optional features. Finally, all the functionality of the home system 258 may be incorporated into one electronic book unit, or viewer.

The viewer 266 is generally equipped with a high resolution viewing area 602, digital logic (including a key 605, security 606, and a microprocessor 621), video graphics control and memory 607, power supply circuitry 602 (not shown), an optional battery 603 and an optional RF transceiver 604. In a two unit arrangement, the library unit 262 contains the connector function to the video distribution system 208, connector function to a public telephone communications system, and memory 600 (which may be removable and portable 600'). More specifically, the library unit 262 would include data stripping functions 617, digital logic 609, memory storage 600, power circuitry 610, optional telephone connections 611 (including cellular or PCN 611'), optional battery (not shown), optional tuner module 613 and an optional RF transceiver 604. The video connector 212 and the public telephone system connection 270, as well as the removable portable memory unit 600 of the library unit 262 may be broken out into separate components. (FIG. 6*b* shows a removable portable hard disk memory 600' with removable cartridges 614.) Finally, the home system 258 may include an attached keyboard 267 or a wireless keyboard 268. Both the attached keyboard 267 and the wireless keyboard 268 may be used to communicate with the viewer 266 (not shown) or the library unit 262.

The wireless keyboard 268 may communicate via radio frequency (RF) signaling, for example. Therefore, the home system 258 may have as many as six separate components which communicate with each other. The two, three, four, five or six separate components which make up the home system 258 can communicate with each other in a variety of ways, including hardwired connection 615, RF transceiver 604, and other wireless methods.

RF communications are preferred in the home because they allow separate components to be located throughout the home without restriction. The data communicated between the units is preferably secure data. In addition, the library unit 262 may provide power to the viewer 266 through the hardwired connection 615.

Alternatively, a single unit may perform all of the home system 258 functions. The single unit should use light-weight materials, including a light-weight battery. A single unit eliminates the need to communicate (externally) between units. The single unit is less expensive and eliminates duplicative processing, memory storage and power circuitry.

To receive and strip the data from the video signal at the consumer's home, either a cable interface device or cable connector 212 is used. The cable connector device includes a tuner 613, while the cable interface device makes use of existing tuning equipment in the home. In either configuration, data is stripped from the video signal and stored at the subscriber's location in the library unit 262. The phone connector 270, and modem 611 initiate telephone calls and transmit ordering and billing information to the operations center 250 or billing and collection system 278. Alternatively, the phone connector 270 and the modem 611 may be used to provide access to the Internet to order and receive electronic books from an Internet web site. A digital connector 619 is provided to communicate digital information with the set top 601. The library unit 262 is the intelligent component of the home system, incorporating the hardware and software necessary to store the text data, generate menus and effect the purchase transactions. In addition to an RF transceiver 604, the library unit 262 also includes the necessary jacks and connections to allow the delivery system 200 to be connected to the viewer 266. As shown in FIG. 6*b*, the library 262 communicates the text data (electronic book) to the viewer 266 in a secure format which requires a key 605 for decryption. The text is generally only decrypted page by page just before viewing.

a. The Video Connector

Figure 7:
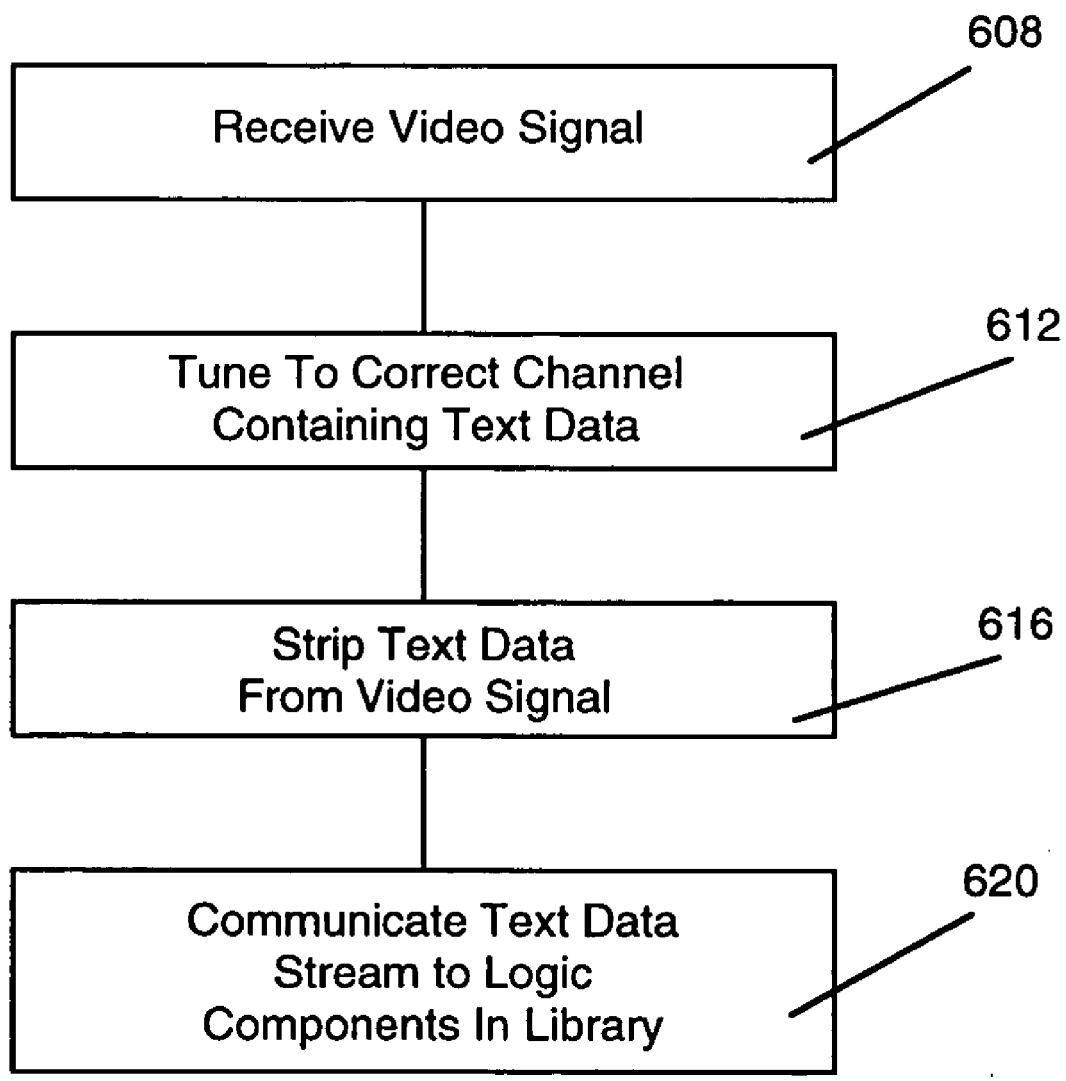
FIG. 7 is a flow diagram of the processes performed by the video connector.

FIG. 7 shows the flow of the processes performed by the video connector 212. The video connector receives the video signal 608, tunes to the channel containing the text data 612, strips the text data from the video signal 616, and communicates the text data stream to logic components in the library 620.

The connection to the video distribution system is preferably a cable connector to a cable television delivery system, as shown in FIG. 6*b*. The cable connector includes a data stripper circuit 617, which accepts video input from either a set top converter, TV or VCR 601, or an optional tuner block 613 that receives the CATV signal through the cable connector 212'. The data stripper circuit 617 strips data out of the video, and outputs a digital bit stream to the digital logic portion 609 of the library unit 262. The data is embedded in the video signal either in the vertical blanking interval or the active video portion in an encrypted and compressed format. The data stripper circuit 617 can be placed inside the set top converter box 601, TV, or in the library unit. The data stripper circuit 617 outputs the digital bit stream to be used by the library digital logic 609.

The video connector 212 may also contain a channel tuner module 613 that can tune to the video channel and provide access to the video that contains the data to be stripped. Using the optional tuner module 613, a set top converter, VCR, or TV tuner is not needed in the home system. The optional tuner module 613 would instead receive the CATV signal directly through the cable connector 212.

b. Library

Figure 8:
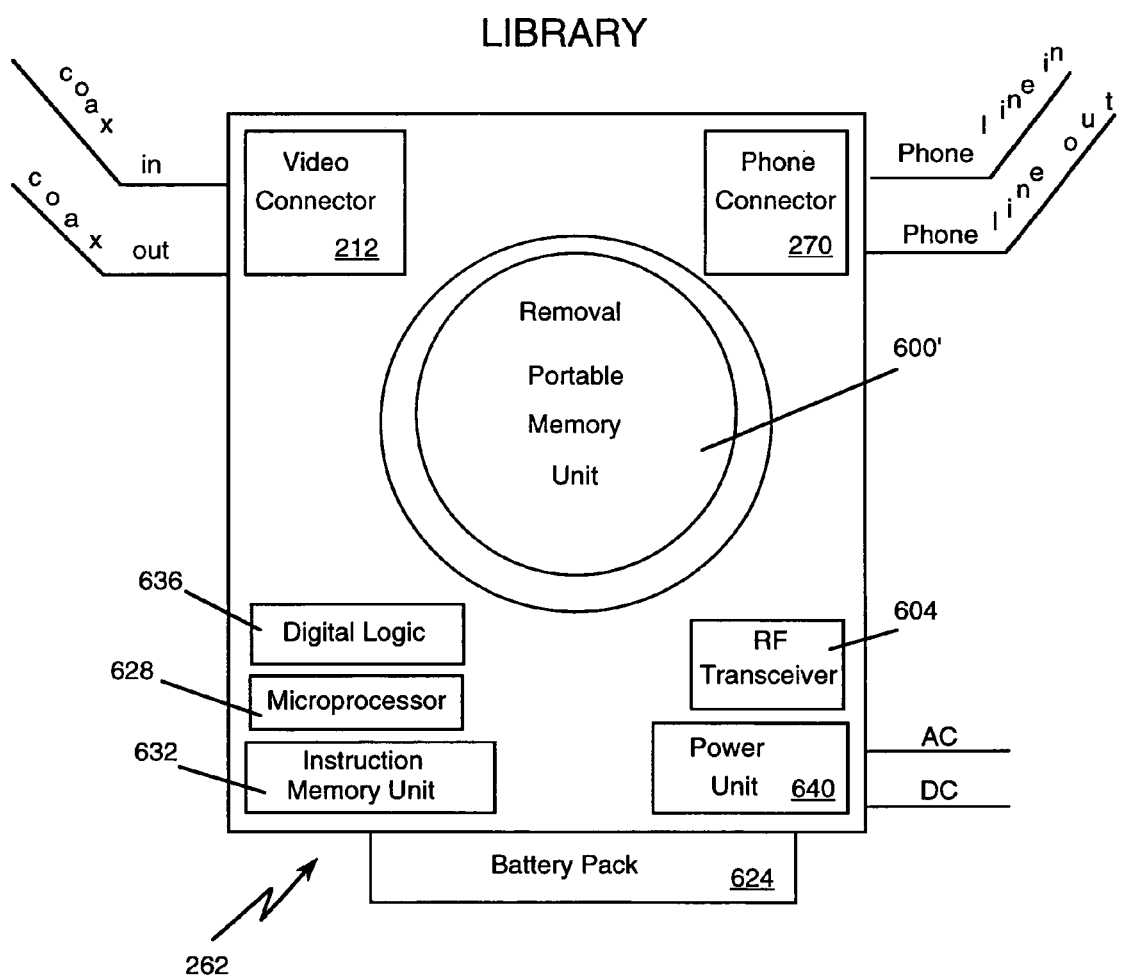
FIG. 8 is a block diagram for an example of a library unit.

An embodiment of the library unit 262 for a two unit home system 258 is shown in both FIG. 6*b* and FIG. 8. The embodiment shown includes the following optional parts: the video connector 212, phone connector 270, RF transceiver 604, and battery pack 624 in addition to a removal portable memory 600', microprocessor 628, instruction memory unit 632, digital logic 636, and power unit 640.

The library unit 262 contains a digital logic section 609 (not shown in FIG. 8) which includes the microprocessor 628, the digital logic 636 and the instruction memory unit 632. The microprocessor 628 is preferably a secure microprocessor such as the Mot SC21 device sold by Motorola. The digital logic section 609 will receive the serial digital bit stream from the data stripper circuit 617 and process the data. Error correction will also be performed by the digital logic section 609 and the data will be checked for proper address. If the address of the data is correct and the library unit 262 is authorized to receive the data, the data will be transferred to the memory storage unit 600, 600'. Authorization to receive the data is provided by the cable headend or another distribution point. An authorization code may be sent in the serial digital bit stream. The digital logic section 609 will send appropriate text and graphical data to the memory storage unit 600, 600'. It transfers this data in a compressed and encrypted format and the data remains stored in a compressed and encrypted format.

i. Memory Storage Unit

The memory storage unit of the library may be a removable portable memory unit 600' (as shown in FIGS. 6a, 6b and 8). A variety of options are available for memory storage: a hard disk drive, a hard disk with removable platters, and a CD ROM. Referring to FIG. 6b, a hard disk drive unit 600' which contains removable platters may also be used. This would provide virtually unlimited library storage capacity. Data (i.e., electronic book files) may be stored in the memory storage unit in a compressed and encrypted format. As is also shown in FIG. 6b, the data may also contain a key or unique ID number that matches the ID or key of the viewer 266. This matching of a unique key or ID number prevents unauthorized transfer of text data from the memory storage unit to an unauthorized viewer. Small memory devices such as smart cards, electronic memory cards or PCMCIA cards (personal computer memory card industry association) may also be used to store the data.

ii. Power Circuitry

As shown in FIGS. 6b and 8, the library unit 262 may accept power from either AC wall power 610, DC power 640, or optional battery power 624. The power circuitry 610, 640 may provide all the voltage necessary from either the battery 624 or AC unit for the various circuitry in the library. The power circuitry 610, 640 may also provide power to the viewer 266 through a single data cable when connected to the viewer. The power circuitry 610, 640 will recharge the battery using AC power when in operation. With the optional battery unit 624 installed, the library unit 262 becomes a portable unit and can still provide power to the viewer 266. In order to extend battery life, power conservation measures may be utilized, such as shutting down the memory system when not in use. When the viewer 266 is being utilized and the library circuitry is not being utilized, virtually all power may be shut down to the library unit 262.

iii. Connection to the Public Telephone System

The connection to the telephone system may be provided by a modem 611. Various available modems may be used to perform this function. As shown in FIG. 6b, cellular phone or PCN phone connections 611' may also be provided. When the home system 258 is first initialized, the modem may be used to transfer the name and credit card information of the consumer to the billing and collection system 278. The telephone connection 270 may be utilized each time an electronic book is purchased by a consumer to complete and record the transaction. The telephone connection 270 may also be used as a means for receiving the electronic books from the operations center 250 or from an Internet web site, by-passing the video distribution system 208. The phone connection 270 may be a separate unit as shown in FIG. 6b.

iv. Library Processing

Figure 9:
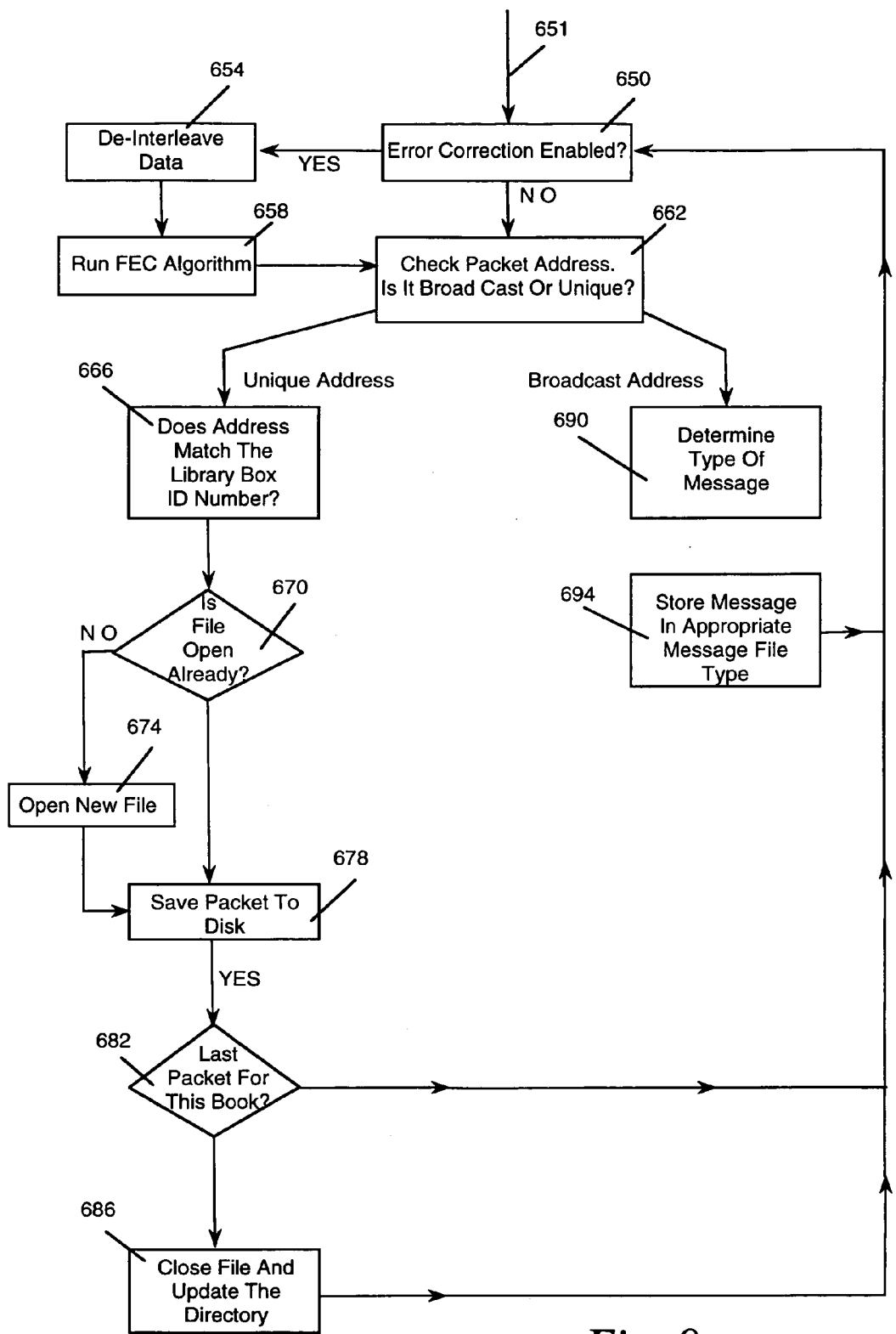
FIG. 9 is a flow diagram of some of the processes performed by the library on the received data stream.

FIG. 9 shows an example of some basic processing performed by the library unit 262 on the data stream 651 received from the video connector 212 or stripper circuit 617. First the data stream 651 is checked for error correction by block 650. If an error is detected, block 654 de-interleaves the data followed by block 658 running a FEC (Forward Error Correcting) algorithm. The combination of block 650, 654 and 658 perform the error correction needed on the data stream. If no error correction is necessary the data proceeds to block 662 where packets are individually checked for packet address.

If the address is a unique address, block 666 checks whether the address of the packet matches the library box ID number. The library box ID number is a unique number associated with that library unit 262 which is used to ensure security of the data. Block 670 determines whether an electronic file has already been opened into which the data packet can be saved. If no data file has been opened then block 674 opens a new data file for that packet. If an electronic file has been opened, then the packet is saved in that electronic file on disk, block 678. Next, the process checks to see if this is the last packet for a particular book for a particular textual data block being received 682. If it is the last packet of information, then the electronic file is closed and the directory of available electronic files is updated 686. Following either block 682 or 686, the process returns to receive another data packet from the data stream received from the data stripper block.

If the packet address is checked and the address is determined to be a broadcast address, the process determines the type of message that is being sent 690. The message may be an index of book titles, menu (and menu graphics) information, announcements, special offerings, discounts, promotions, previews etc. The message is then stored in appropriate electronic message file 694 and the process is returned to block 650 to receive another data packet and perform another error check.

Using the process of FIG. 9, the library unit 262 is able to receive, store and update directories related to the textual data and graphical data (that can be used to depict pictures in a given book or to generate menus). Variations of the processes are possible depending on the format of the data and operating system of the library unit 262.

Figure 10:
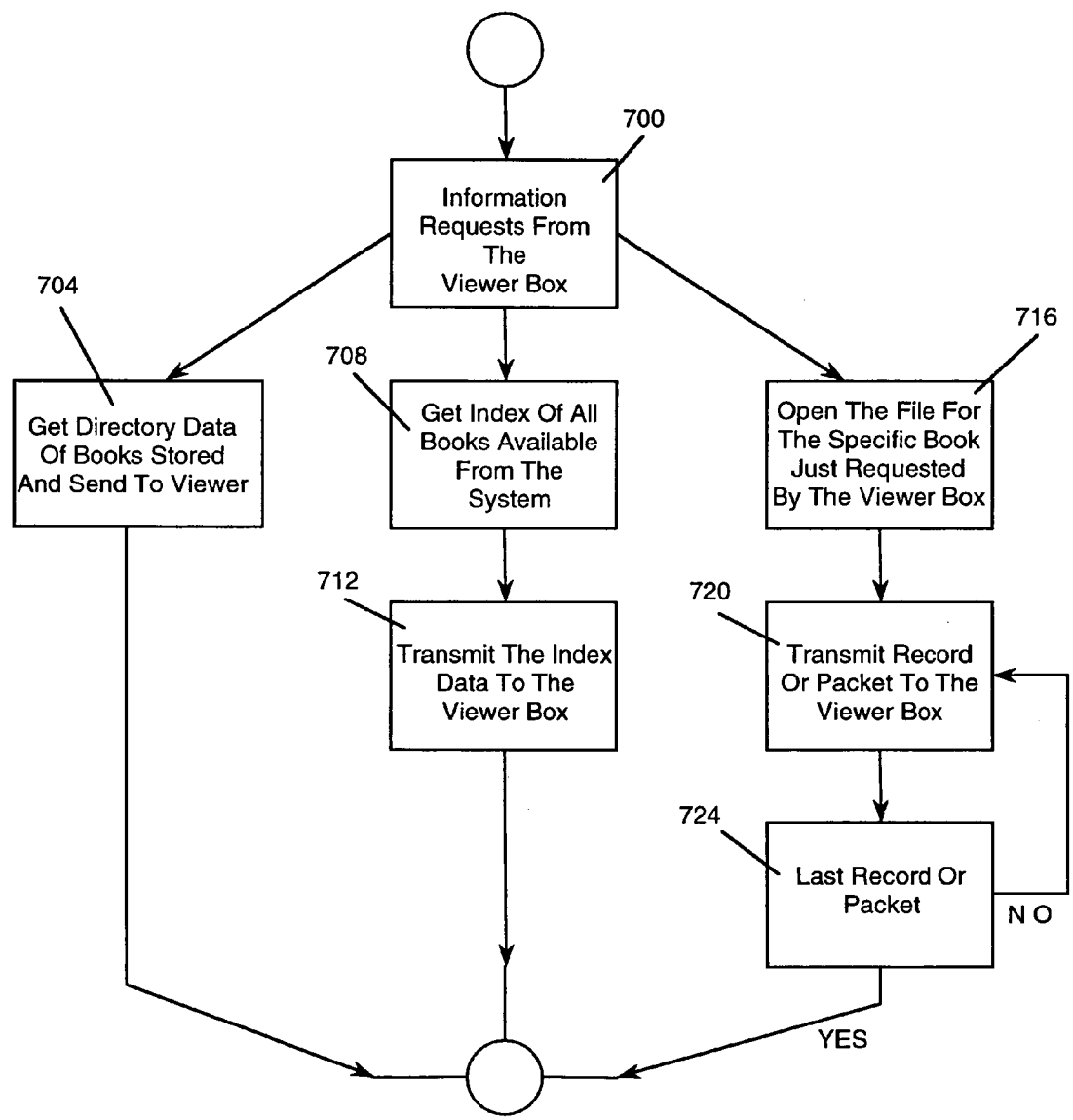
FIG. 10 is a flow diagram of the processes performed by the library unit on information requests from the viewer.

FIG. 10 shows an example of the processing of information requests from the viewer 266 at the library unit 262. Information requests from the viewer 266 are received either through the cable connecting the viewer 266 to the library unit 262 or through wireless transmissions such as RF. It is possible in some embodiments for subscribers' requests to come from a set top converter box 602 (see Section V).

Information requests received from the viewer 266 generally fall into three categories: (1) directory data of electronic books stored in the library unit 262, (2) index of all available electronic books on the system, and (3) requests for a specific electronic book (Block 700). Process block 704 answers a request from the viewer 266 for a directory of data showing the electronic books stored at the viewer 266. The directory of data is sent to the viewer 266 so that it may be displayed to the subscriber. Process block 708 handles requests from the viewer 266 for an index of all available electronic books on the home system 258. The library unit 262 will obtain an index of all the available books on the system and transmit that index, process 712, with menu information to the viewer 266. Process block 716 replies to a request from the viewer 266 for a specific electronic book. The library unit 262 opens an electronic file for the specific electronic book requested by the viewer 266 and transmits the record or transmits the information 720 on a packet-by-packet basis to the viewer 266. This process of transmitting the specific electronic book, record, or packets to the viewer 266 continues until the last record or packet has been sent, 724.

In addition to the processes shown on FIG. 10 in handling a request for a specific electronic book, the library unit 262 also orders and receives specific electronic books from the operations center 250 using the process as described in process block 716. Following a request for a specific electronic book which is not stored at the library unit 262, the library unit 262 will proceed to determine the next available time the electronic book will be on the video distribution system 208 and ensure reception and storage of that electronic book (process not shown). In performing this process the library unit 262 will transmit to the viewer 266 information on when it will obtain the text data for the electronic book so that the subscriber may view the electronic book. In addition to timing information, price and other ordering information may also be passed by the library unit 262 to the subscriber.

c. The Viewer

Figure 11:
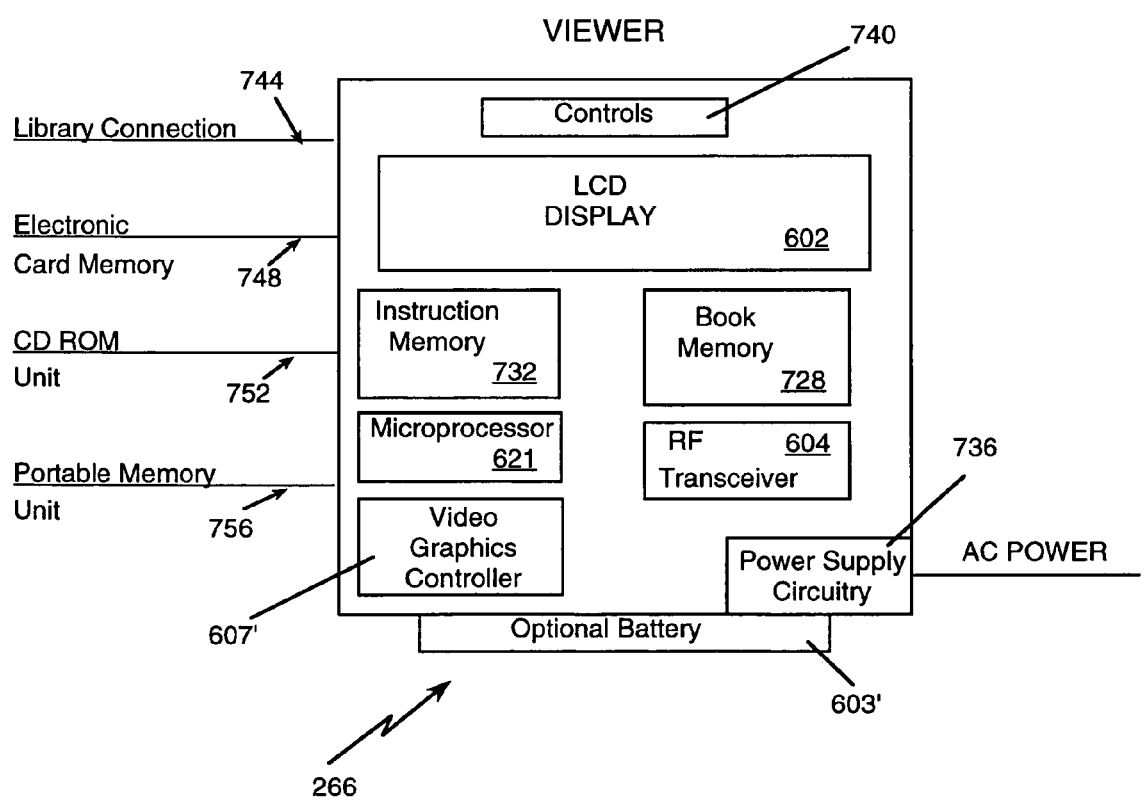
FIG. 11 is a block diagram showing the components for an example of a viewer.

FIG. 11 is a block diagram of the viewer 266 showing its internal components. The viewer 266 of FIG. 11 is similar to the viewer 266 depicted in FIG. 6b. The viewer 266 is designed to physically resemble a bound book. The viewer 266 is made up of five primary components and six optional components: (1) LCD display 602, (2) digital circuitry (not shown), (3) video graphics controller 607', (4) controls 740, (5) book memory 728, (6) optional power supply circuitry 736, (7) optional battery 603', (8) optional RF transceiver 604, (9) optional cellular or mobile communicator (608), (10) optional keyboards 267 and 268, and (11) a speaker/microphone 608'.

(1) A high resolution LCD screen 602, preferably of VGA quality, is used by the viewer 266 to display text and graphic images. The screen is preferably the size of one page of a book. A two page screen or two screens may also be used with the viewer 266.

(2) Digital circuitry that includes a secure microprocessor 621, instruction memory 732, and digital logic. Data is transferred to the viewer 266 in compressed and encrypted format. The secure microprocessor 621 compares the ID number of the viewer 266 with the incoming data stream and only stores the text data if the ID number of the viewer 266 matches that within the incoming data stream. It is preferred that the viewer 266 not output text data or other data and that the data is decompressed and decrypted only at the moment of viewing and only for the current page being viewed. These measures are preferred because they provide additional security against unauthorized access to data.

(3) A video graphics controller 607' that is capable of assisting and displaying VGA quality text and graphic images is included in the viewer 266. The graphics controller 607' is controlled by the digital circuitry described above. Text may be displayed in multiple font sizes.

(4) The viewer 266 of FIG. 11 has touch panel controls 740. These unique and novel controls 740 allow the consumer to select stored electronic books and electronic books from catalogues, move a cursor, and turn pages in a book. Typically, the preferred controls 740 include forward and reverse page buttons 742, 741, a ball (or trackball) 743 for cursor movement, one or more selection buttons 745, a current book button 747 and a bookmark button 749 (see FIG. 14a).

The controls 740 should be easy to use and conveniently located. Referring to FIG. 14a, the controls for the viewer 266 may be located below the screen 602 at the bottom portion of the viewer 266. The next page turn button 742 is the most used button 740 and may be located towards the right edge of the page. The subscriber is likely to use right hand thumb movements to work the controls particularly the page turn buttons 741, 742. Therefore, it is preferred that the buttons be arranged in such a manner that the buttons are easily controlled by a subscriber's right thumb. Generally, this can be accommodated either on the lower portion of the viewer 266 (as shown) or along the right hand margin of the viewer 266 (not shown). The current book button 747 and bookmark button 749 are usually the least used of the controls 740. Therefore, in the example shown those buttons 747, 749 are located on the inside portion towards the binder of the viewer 266.

Locating the ball 743 or other cursor movement device (such as four pointer arrows—not shown) in the bottom center of the viewer 266 is both easier for the subscriber to use and easier in manufacturing the viewer 266. The selection buttons for the cursor 745 are preferably located below the middle diameter of the cursor ball 743 on the right and left sides of the ball as shown. If pointer arrows are used for cursor movement, a selection button 745 may be located in the center of the four arrow buttons (not shown). Again, the most used controls should be located where a subscriber's right hand thumb would normally rest.

(5) Book memory 728 for at least one electronic book or more of text is included in the viewer 266. The memory 728 stores text and any graphics which represent pictures in a book. The memory 728 can also store menu graphics data. Two different memory 728 devices may be used in the viewer 266, one for the instructions for the microprocessor 621 in the digital circuitry and a second type of memory may be used for the book memory 728 (and graphics). Various memory devices available on the market may be used such as, ROM, RAM or a small hard disk. Since an electronic book requires approximately 0.6 megabytes of storage, a small hard disk providing approximately 60 MBytes of storage provides memory to store approximately 100 electronic books. The large hard disk drives currently available allow for storage of thousands of electronic books.

Text for books may be displayed in various font sizes. To accommodate various fonts for display, a variety of fonts are stored in instruction 732 or book memory 728. Thus larger or smaller fonts may be recalled from memory 621, 728 to create displays desired by the subscriber.

(6) Power supply circuitry 736 in the viewer 266 will accept power from either an AC power source or from an optional battery 603', or the library unit 262. The power supply circuitry 736 provides the necessary voltages to accommodate the various systems within the viewer 266.

(7) An optional battery 603' is provided in the preferred embodiment. The battery 603' is automatically recharged when AC power is available.

(8) An optional RF transceiver 604 which provided two-way data link between the viewer 266 and other components of the home system can also be included in the viewer 266.

(9) Also, the viewer 266 may include a cellular transceiver for mobile communications.

(10) The optional wired (attached) keyboard 267 and wireless (e.g., RF) keyboard 268 (see FIG. 6a) may be used with the viewer 266 to provide communications between the subscriber and the viewer 266.

(11) The speaker and microphone 608' allow the viewer 266 to provide audio signals to the subscriber, and allow the subscriber to provide an audio input. The speaker and microphone 608' may be used in conjunction with the cellular transceiver 608 or other telecommunications equipment to provide for reception and transmission of telephony and data.

The viewer 266 of FIG. 11 has parts available for providing connections to: a library 744, electronic card memory 748, CD ROM units 752, and a portable memory unit 756 (such as that shown in FIG. 6b 600'). Various electronic memory cards such as PCMCIA can be used with this viewer 266.

Security, low power consumption and excellent display technology are desired features of the viewer 266 design. The viewer 266 should be lightweight and portable. The viewer 266 contains a software operating system that allows electronic books to be stored, read and erased and includes the capability to order electronic books and retain them in memory 728 for a predefined period of time determined by the system operator. The software can be configured to allow the electronic book to be read during a period of time (i.e., two weeks) and then automatically erased, read once and erased, or held in memory permanently. Each viewer 266 has a unique key 605. All of the data storage is encrypted with the key 605 for an individual viewer 266 to prevent more than one viewer 266 accessing the text file or electronic book file.

Figure 12:
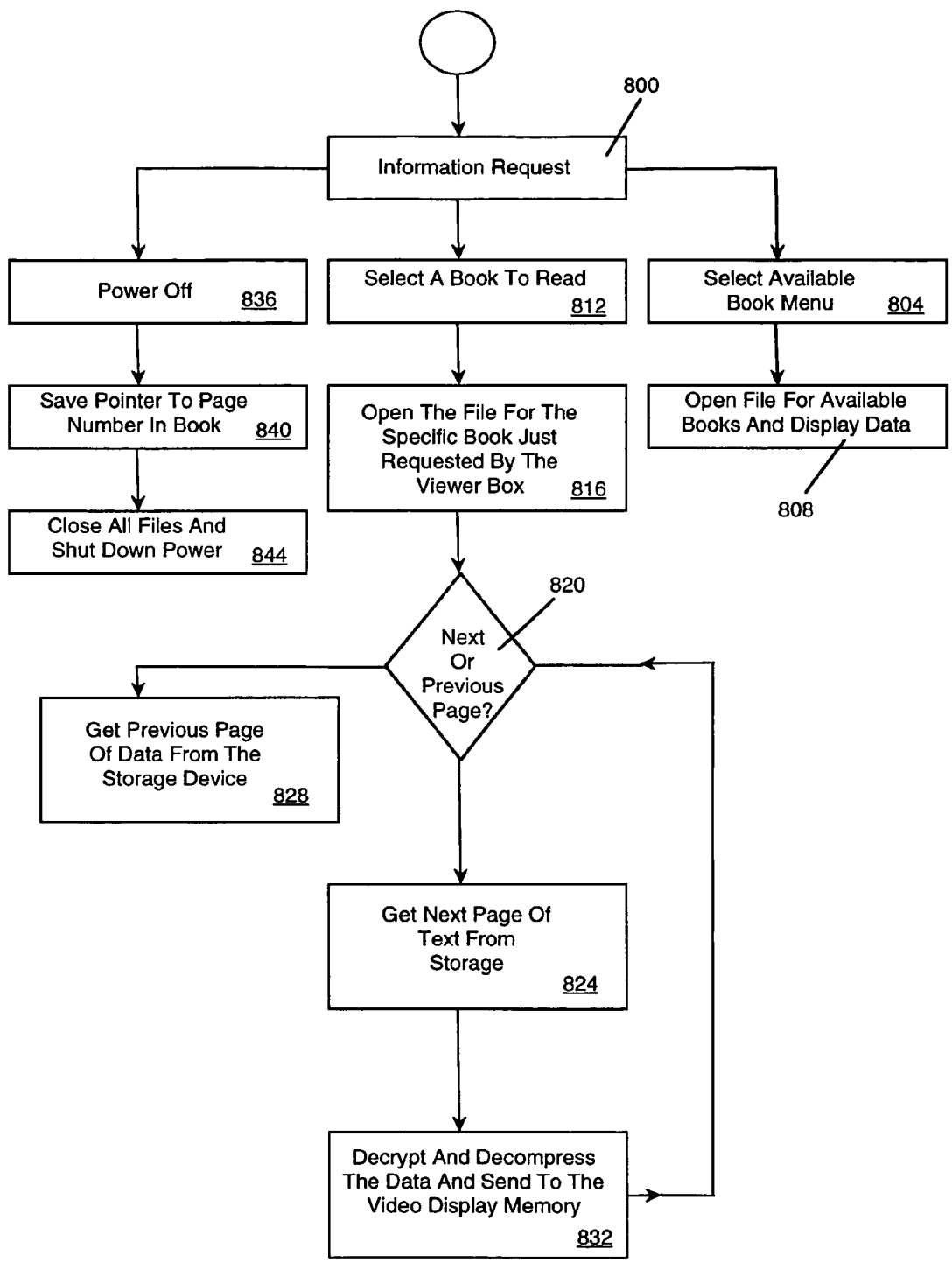
FIG. 12 is a flow diagram of some of the processes performed by the viewer on an information request from a subscriber.

FIG. 12 is a flow diagram of some of the processes executed by the viewer 266. Generally, the viewer 266 receives inputs from the subscriber through touch panel controls 740. Alternately, the viewer 266 receives inputs from a touchscreen display, the attached keyboard 267, or the remote keyboard 268. The subscriber's information requests are then processed 800 by the viewer 266.

If the subscriber requests a menu of available electronic books, process block 804 will select a book menu. Process block 808 will open the electronic files which list the electronic books that are available (related to the category of topic of the menu) and display the menu with the names of the available electronic books.

If the subscriber selects a particular electronic book to read, then process block 812 will process the selection and determine the electronic file that contains the specific electronic book. Process block 816 will open the file for that specific book and normally access the first page. (If a pointer has already been set in that electronic book's file, the process may default to that page.) Process block 820 will then determine which page needs to be displayed. Process block 820 will determine whether a next page, previous page or a book marked page needs to be displayed. If the pointer for the electronic file is not in the correct location then process block 828 will move the pointer and obtain the previous page of data from the stored file. Otherwise, process block 824 will normally obtain the next page of text from the stored electronic file. Process block 832 will decrypt and decompress the text data and send the data to the video display. The video display will generally have a video display memory associated with it and process block 832 will send the data directly to that video display memory. The circuitry for the display then completes the process of displaying the page of text.

If the subscriber, through the controls 740, requests (from process block 800) that the power be turned off, then the process, 836, of turning the power off will be initiated. Process block 840 saves the pointer in memory to the page number in the book that the viewer 266 is currently reading. Process block 844 closes all the electronic files and signals the power circuitry to shut down the power to the various circuits in the viewer 266. The subscriber may also use the controls 740 to access other electronic files using electronic links embedded in a particular electronic file. An electronic link system will be described later in detail.

With these examples of basic processes the viewer 266 is able to display book selections and display text from those books.

d. Menu System

Figure 13:
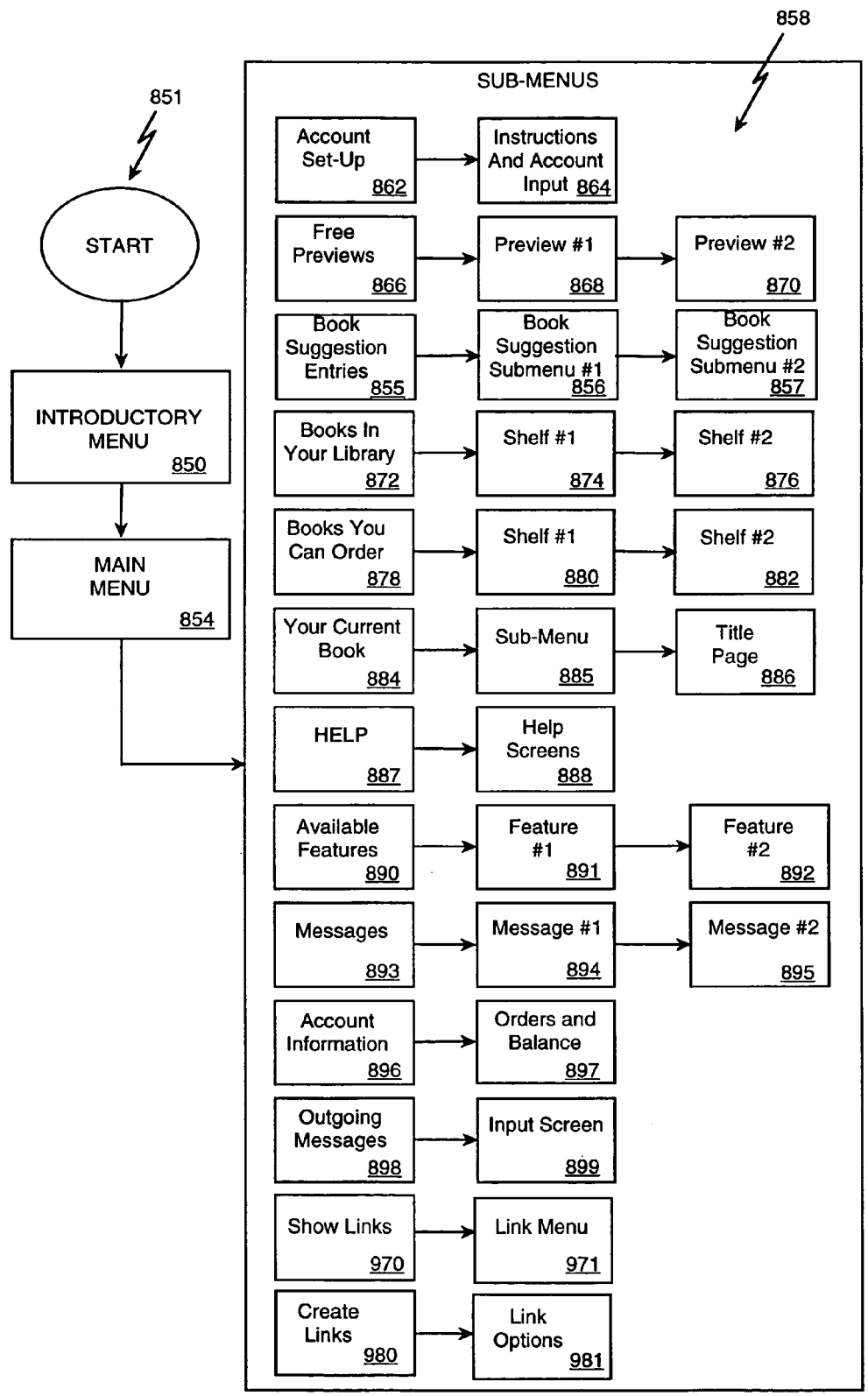
FIG. 13 is a chart depicting the menu structure and sequencing of menus in the menu system.

Referring generally to FIG. 13, the delivery system 200 may have a menu system 851 for selecting features and electronic books from the delivery system 200. The operating software and memory required for the menu system 851 may be located at the viewer 266 (e.g., the instruction memory 732 and/or book memory 728). However, it may also be located at the library unit 262 (e.g., the instruction memory 632) or the library unit 262 and the viewer 266 can share the software and memory needed to operate the menu system 851. Since the menus are usually displayed on the viewer 266 and it is preferred that the viewer 266 be capable of operating in the absence of the library unit 262, the basic software and memory to create the menus is more conveniently located at the viewer 266.

The menu system 851 allows sequencing between menus and provides menu graphics for graphical displays such as on the LCD display 602 of the viewer 266. In a system which uses a set top converter these menus may also be displayed on a television screen. In the simplest embodiment, the menus provide basic text information from which the subscriber makes choices. In more sophisticated embodiments, the menus provide visual displays with graphics and icons to assist the subscriber.

FIG. 13 depicts a menu system 851 with sequencing. The primary menus in the system are an introductory menu 850, a main menu 854 and various submenus 858. In the embodiment shown, there are three levels of submenus 858. In certain instances one or two submenus 858 is sufficient to easily direct the subscriber to the selection or information requested. However, there are features in which three or more submenus 858 make the user interface more friendly for the subscriber. Each level of submenus 858 may consist of multiple possible menus for display. The particular menu displayed depends on the selection by the subscriber on the previous shown menu. An example of this tree sequence of one to many menus are the help submenus 887, 888. Depending upon the specific help requested, a different level two help menu is displayed to the subscriber.

Figure 14B:
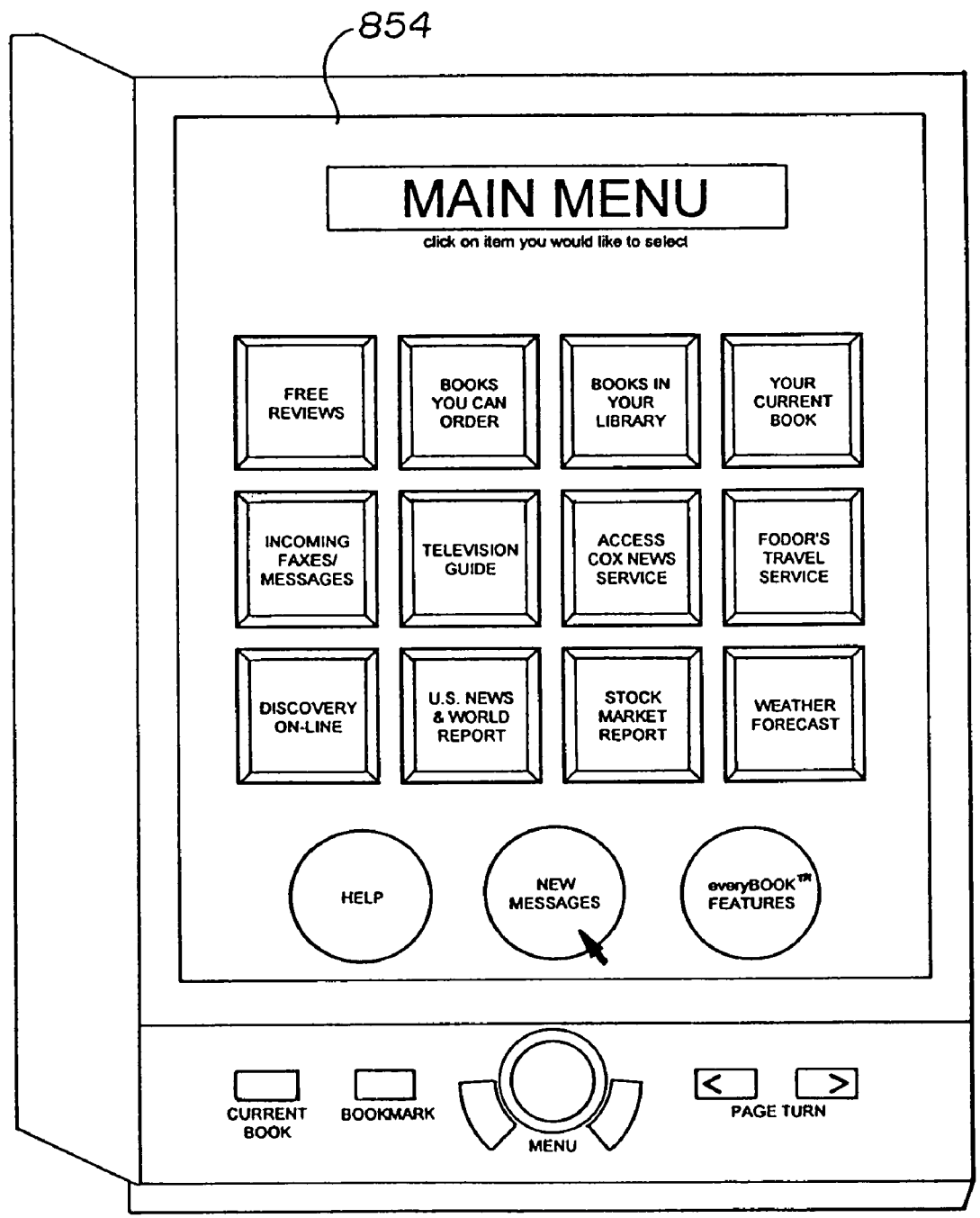
FIG. 14b is a schematic showing an example of a main menu.

An example of an introductory menu 850 is shown on FIG. 14a. Generally the introductory menu 850 introduces the viewer 266 to the system and provides initial guidance, announcements and instruction. The introductory menu 850 is followed by a main menu 854, an example of which is shown in FIG. 14b. The main menu provides the viewer 266 with the basic selection or features available in the system. FIG. 14b is an example of a main menu 854 offering many additional features and submenus 858 to the subscriber. For example, FIG. 14b shows that the viewer 266 is able to choose by a point and click method, many options including: (1) free previews, (2) books you can order, (3) books in your library, (4) your current book, (5) help, (6) on-line services and (6) other system features. Following a selection on the main menu 854, a corresponding submenu 858 is shown.

Figure 14C:
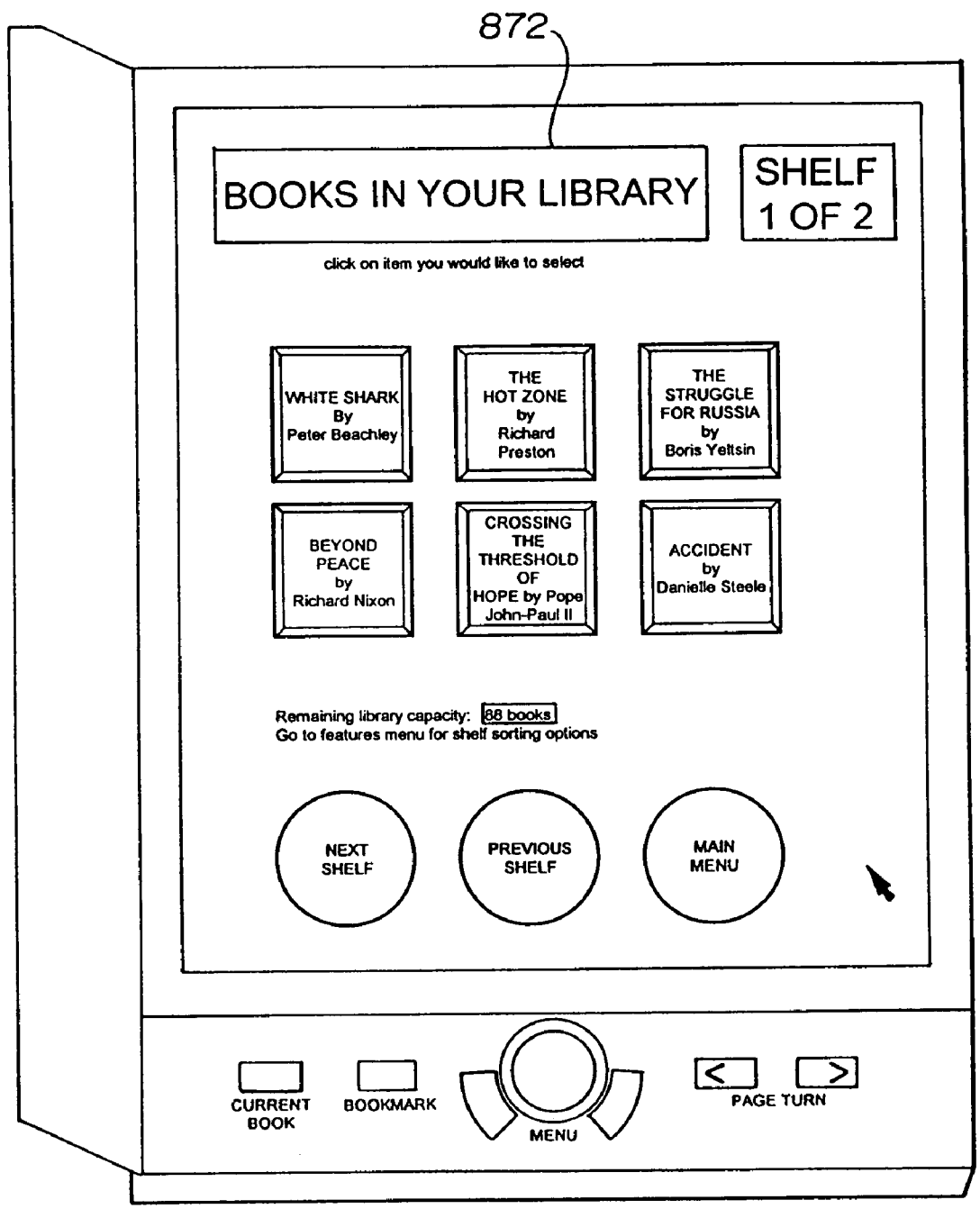
FIGS. 14c, 14d, 14e, 14f, 14g, 14h, 14i and 14j are schematics showing examples of submenus.
Figure 14D:
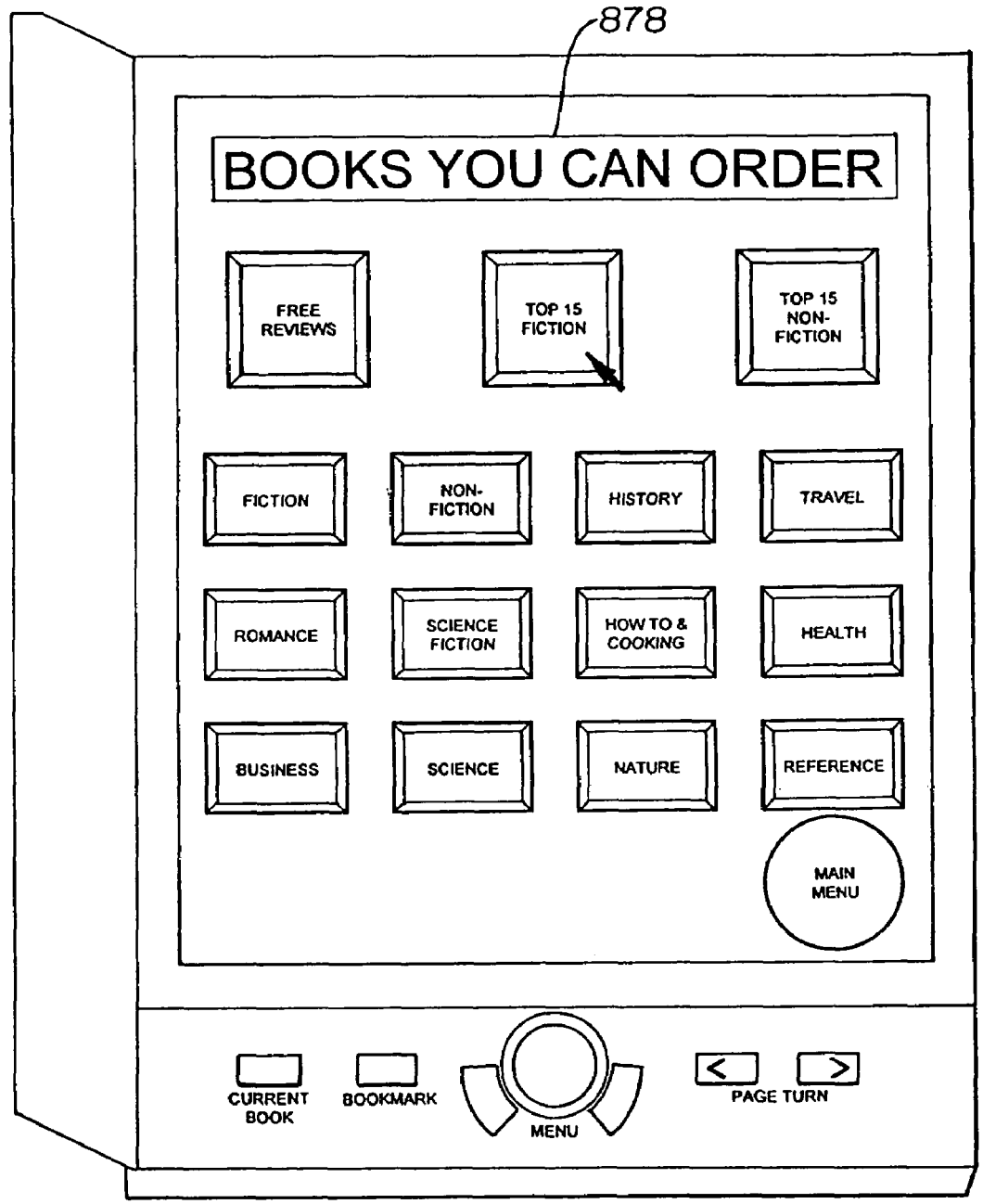
Figure 14E:
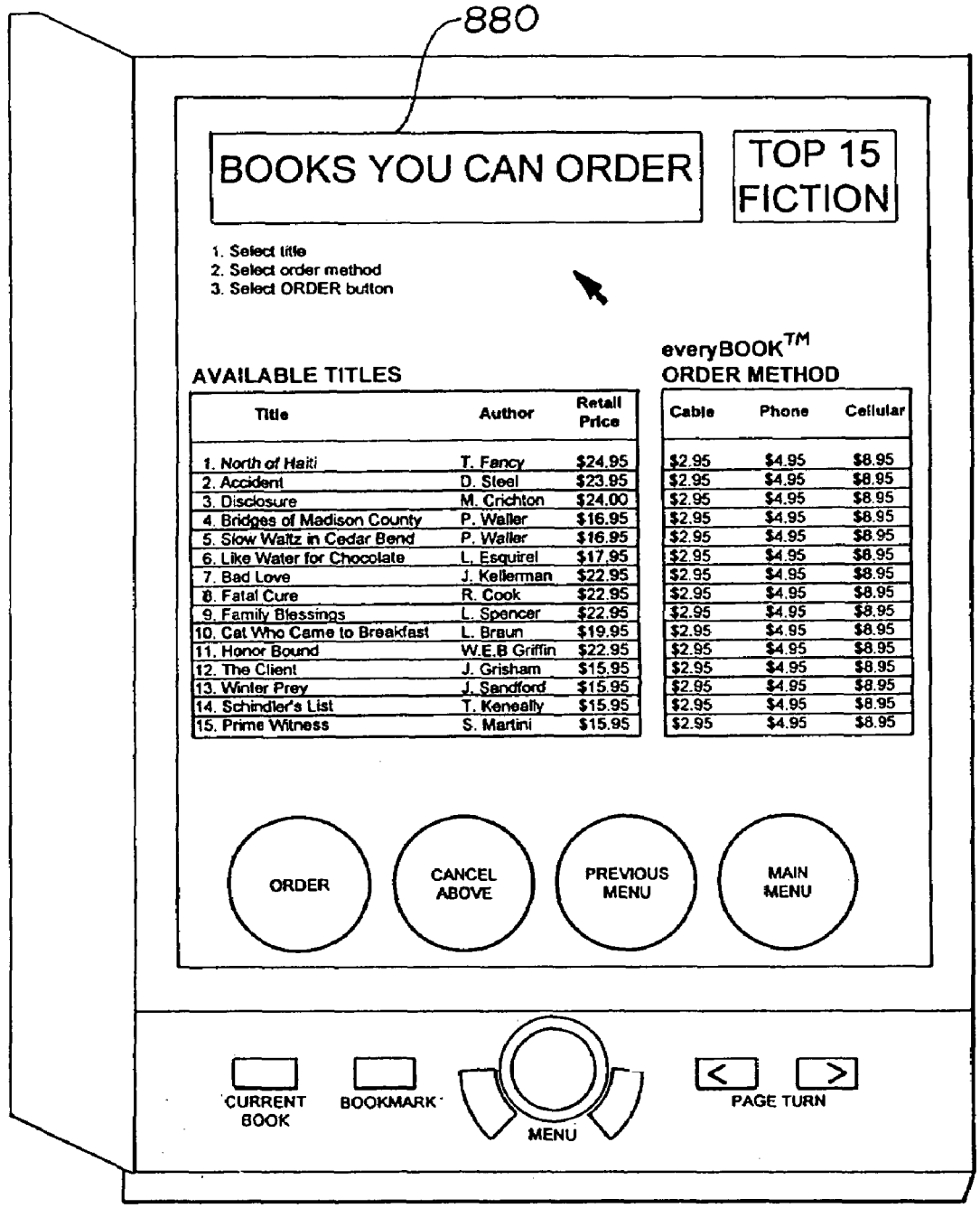

FIG. 13 shows thirteen available primary or first level submenus. They are (1) account set up 862, (2) free previews 866, (3) book suggestion entries 855, (4) books in your library 872, (5) books you can order 878, (6) your current book 884, (7) help 887, (8) available features 890, (9) messages 893, (10) account information 896, (11) outgoing message submenu 898, (12) show links 970, and (13) create links 980. FIG. 14c is an example of a first level submenu for electronic books in your library 872. This "Book In Your Library" example submenu 872 shows six available electronic books by title and author and provides the subscriber with the ability to check a different shelf of books 874 or return to the main menu 854. FIGS. 14d and 14e show example submenus 858 for electronic books that may be ordered using the "Books You Can Order" submenu 878.

Figure 14F:
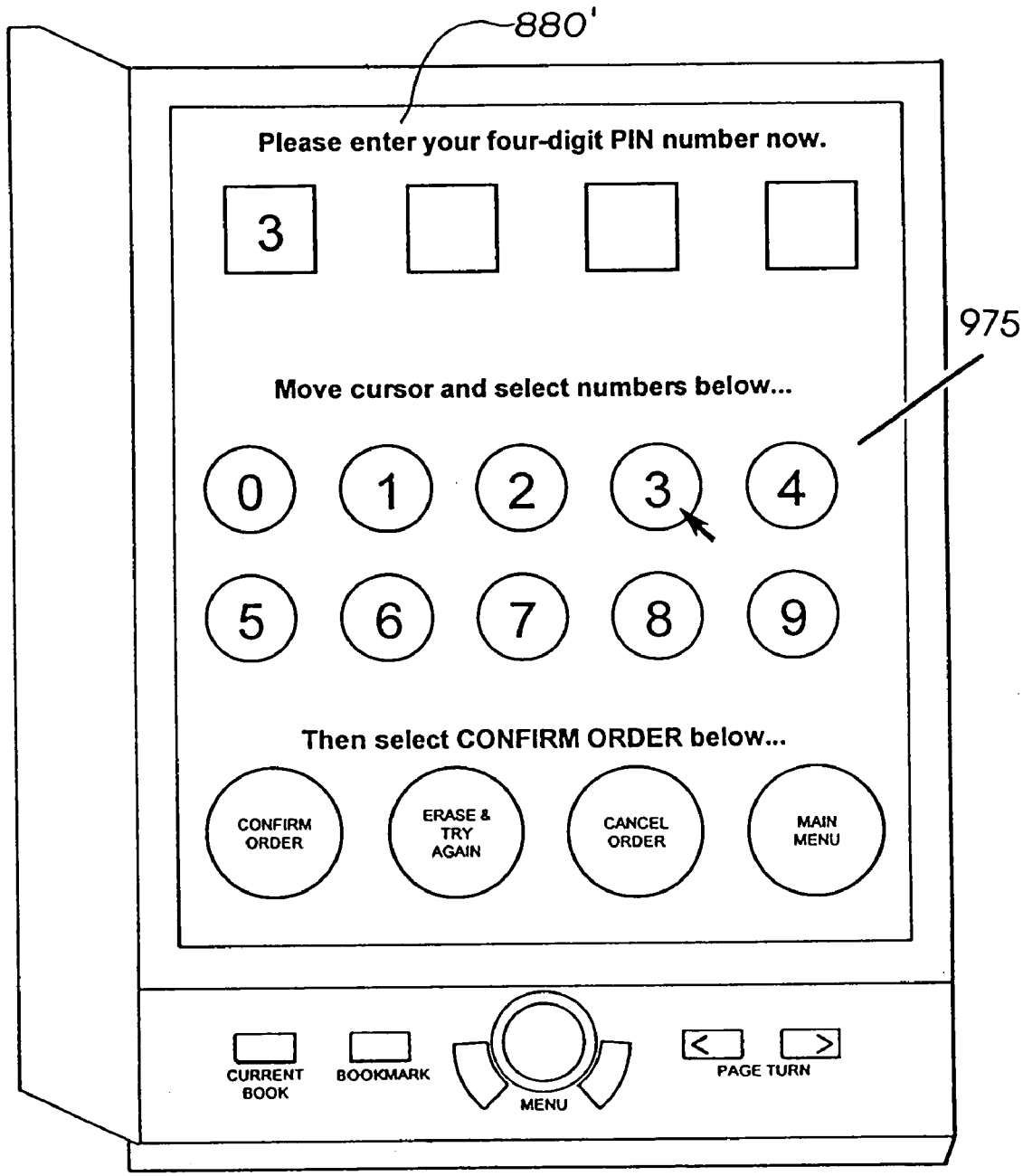

FIG. 14f is an example of an order selection and confirmation menu 880', which provides a "soft keyboard" 975 for the subscriber to use in placing an electronic book order and which confirms the subscriber's order. In this particular example, the subscriber is required to enter a PIN number to complete the subscriber's order. The "soft keyboard" 975 could be configured as a full alpha-numeric keyboard, and may be used by the subscriber to add additional information related to a book order. An alpha-numeric or similar password may be used to ensure the subscriber is an authorized subscriber. In an embodiment, the subscriber confirms an order with a PIN or password and then receives a final confirmation screen. The final confirmation screen is primarily text and may state: Your book order is now being processed via CABLE.

Your book will be delivered overnight and your VISA account will be charged $2.95.

Your book will be available for reading at 6:00 AM EST tomorrow. Make sure that:
1. your Library Unit and Cable Connection Unit are plugged in with aerials up tonight; and
2. you tune your cable converter to THE BOOK Channel. The TV set does not have to remain on.

or similar language.

Figure 14G:
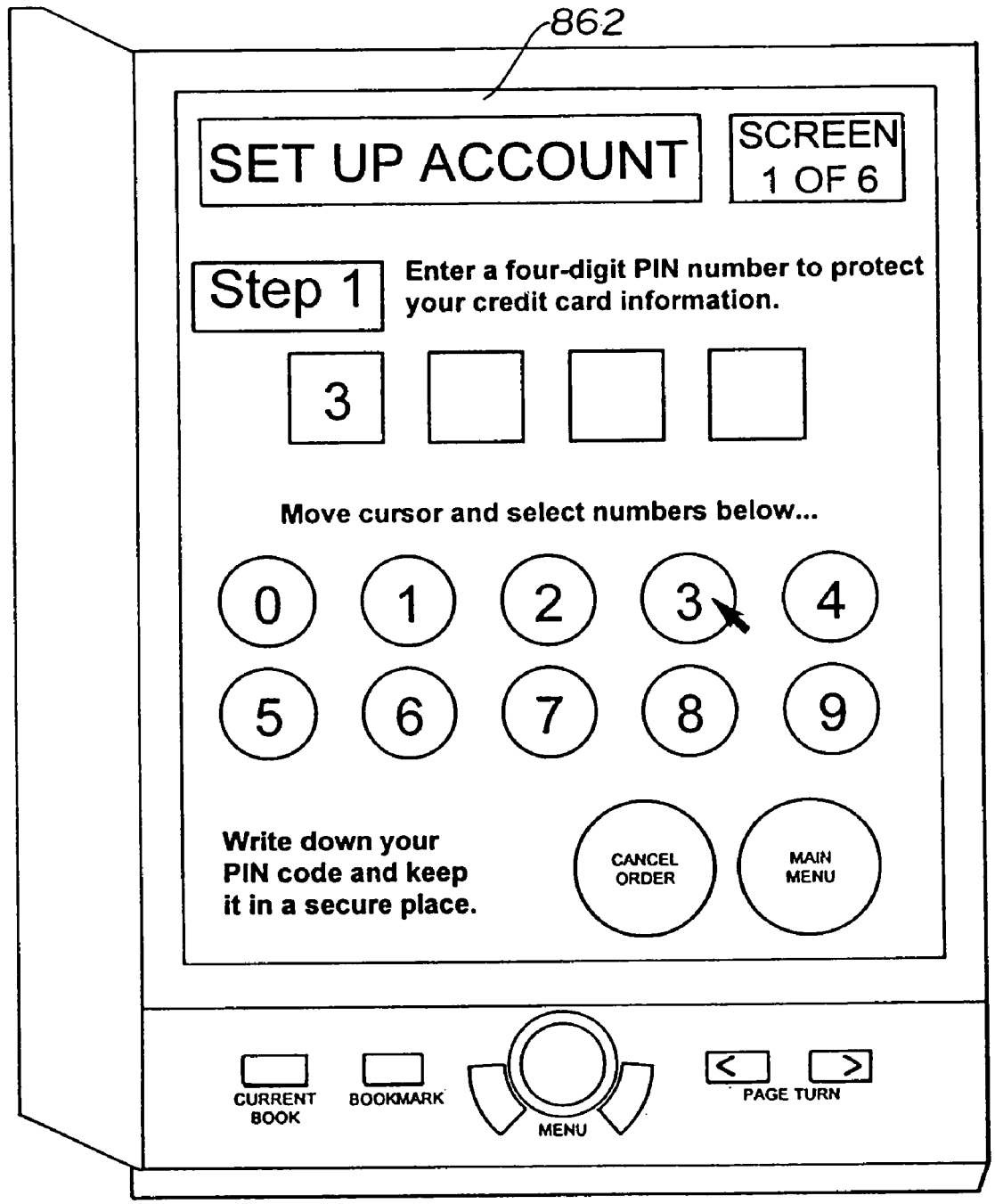
Figure 14H:
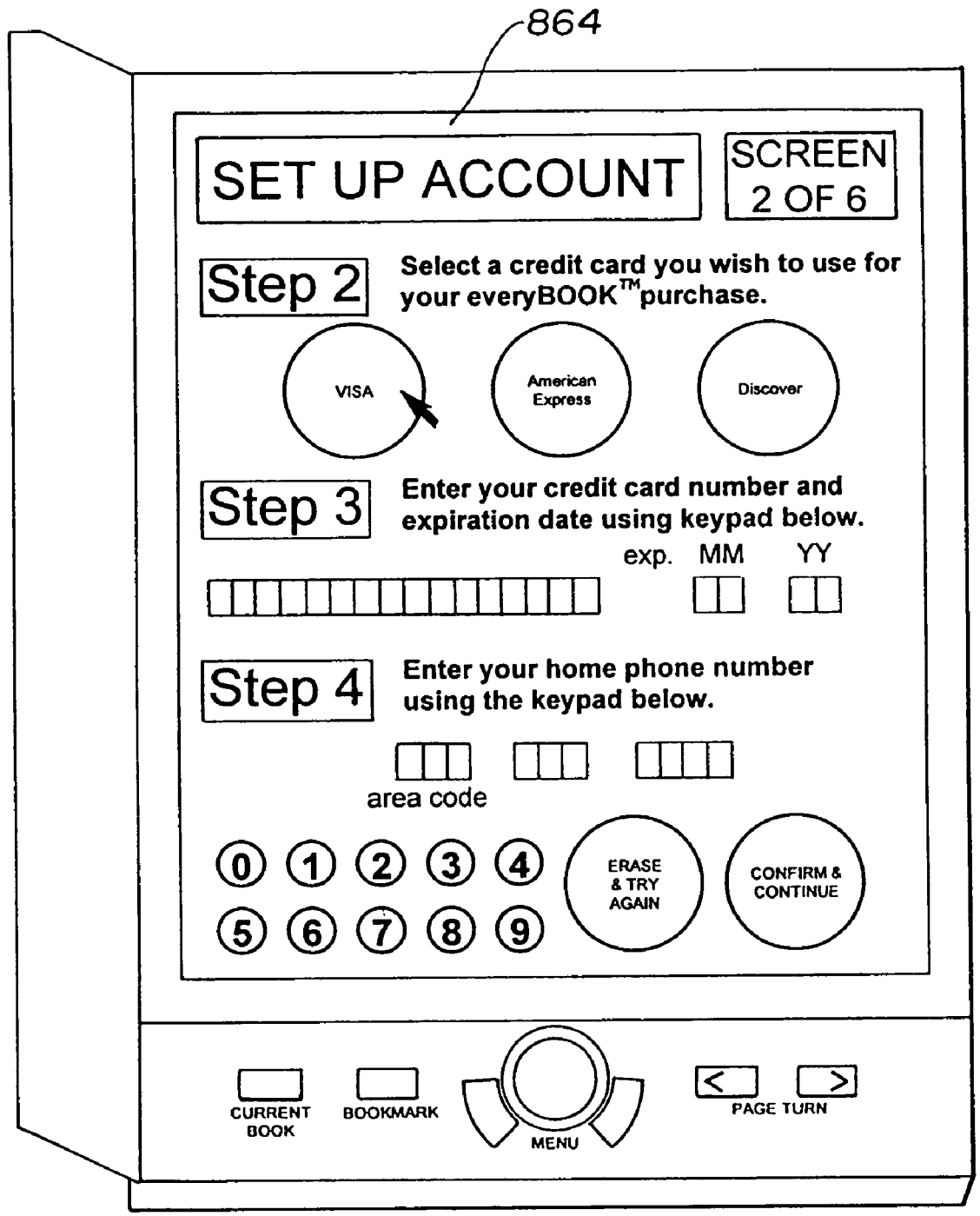

Examples of the "Account Set Up Menu" 862 and further submenus 858 related to account set up (which provide instructions and account input 864) are shown in FIG. 14g and FIG. 14h. These submenus 858 allow initialization of an account at the operations center 250 and orders to be charged to credit cards. The submenus 858 include the ability to enter data related to your desired PIN number or password, credit cards, phone numbers, etc. It is preferred that the account set up be performed using the telephone system. A confirmation menu verifies that the account has been properly set up with the desired PIN or password and credit card.

Figure 14I:
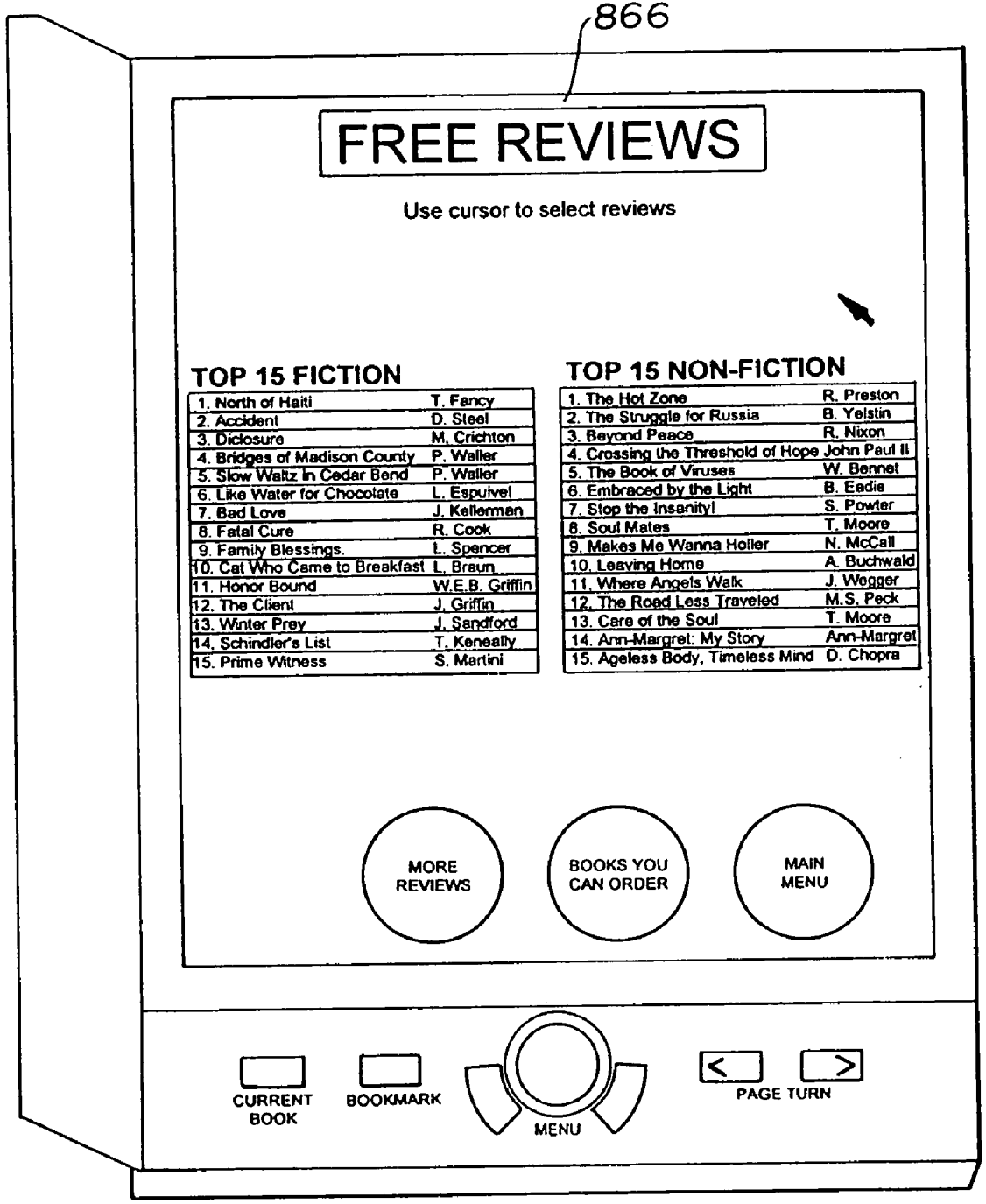
Figure 14J:
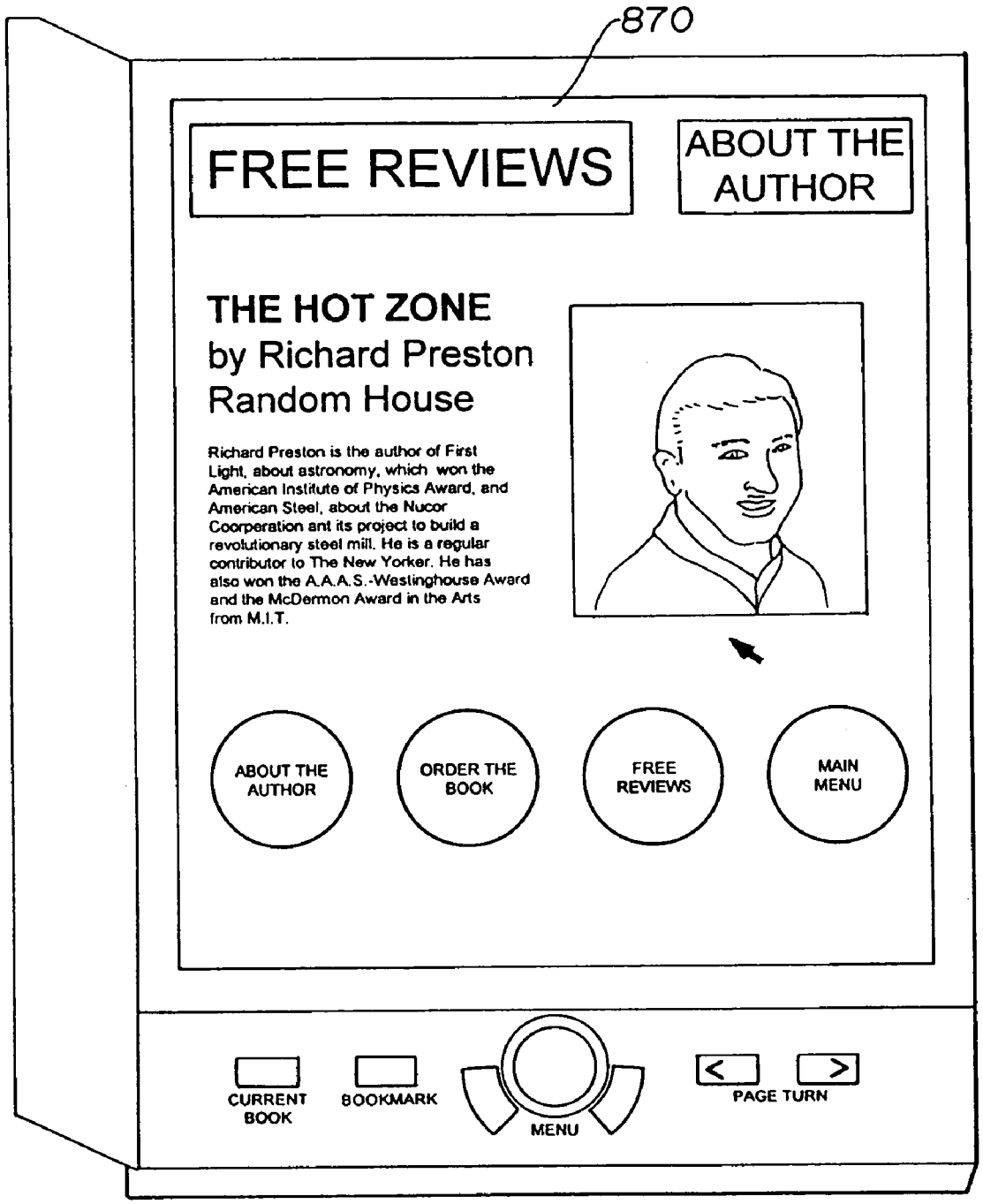

Free previews for books 866 are also provided by submenus (868, 870). Examples of the free preview menus are shown in FIG. 14i and FIG. 14j. FIG. 14i shows a menu depicting various electronic books for which previews are available for viewing. Following an electronic book selection, a screen submenu showing an excerpt of the selected electronic book cover's description is provided along with an excerpt from a critic's review of the selected electronic book. In the preferred embodiment, this preview screen for a particular electronic book also allows the subscriber to select a submenu which provides information about the author. The book preview submenu may also include a still video picture or graphics portraying a book cover or a scene from the electronic book. An example of such a still video picture or graphics is shown in FIG. 14j which depicts a preview screen 870 about the author. The video may also be provided according to MPEG standards as a short moving video clip. Such a clip could be an interview with the author, for example. The author's preview screen 870 shows a picture of the author, provides a short biography, and may allow the subscriber to order the author's books. The price for ordering the authors various electronic books may also be shown on the menu. Alternatively, the previews may be provided through an electronic link system, which will be described in detail later.

In addition to free previews, in more sophisticated embodiments, the delivery system 200 provides the subscriber with an electronic book suggestion feature (see 855). This is accomplished using the menu system 851 and the processor with associated memory located at the viewer 266, library unit 262 or at the distribution point (1020 or 250). When necessary, information for the program suggestion feature is sent in the text data of the composite or video signal to the home system 258. With this feature, books or authors are suggested to a subscriber based upon historical data of the subscriber's previous orders, demographics or mood of the subscriber, other indicators, and/or by text word searches.

In a book suggestion embodiment, text word searches of preview information (such as book cover descriptions, critics reviews and biographies about the author) and/or text of books or other titles are performed by the library unit 262 using databases stored in the library memory 600. Personalized book or author suggestions are made to the subscriber by obtaining information from the subscriber indicative of general subscriber interests. Subscriber entries are solicited from the subscriber preferably using the electronic book suggestion entries submenu 855. The system uses these subscriber entries either directly or indirectly to search for books or authors to suggest to the subscriber.

Generally, the book suggestion methods may be categorized into two categories, either responsive methods (which respond to a series of subscriber menu entries), or intelligent methods (which analyze data to suggest an electronic book). Using a responsive or intelligent method, the delivery system 200 determines a list of suggested titles or authors and creates a second or third level submenu 856, 857 to suggest the titles for subscriber selection.

Responsive methods of suggesting titles include, for example, the use of mood questions, searching for authors, and keyword searching. Using the instruction memory 732 and menu generation hardware (e.g., 607) of the viewer 266, a series of mood questions can be presented on menus to determine a subscribers interest at a particular time. For this methodology, the operations center's 250 processor 404 and instruction memory 416 assign each title mood indicators (and subindicators) from a group such as light, serious, violent, short, long, dull, exciting, complex, easy-read, young theme, old theme, adventure, romance, drama, fiction, science-fiction, etc. These indicators are sent to the home system 258 with the text data and are stored in library memory 600. Based upon the subscriber entries, the processor 404 associates a set of indicators with the subscriber's request and a set of electronic books with matching indicators are located for suggesting to the subscriber.

Responsive searches for authors or keywords (a search word provided by the subscriber) are generally performed by the library processor 628 and instruction memory 632 on data stored in the library memory 600. For example, a keyword given by the subscriber may be searched for a match in library memory 600 storing the book reviews, critics and previews databases. Thus, if a subscriber provided an entry of the word "submarine" on an appropriate submenu, the title "Hunt For Red October" may be located by the library processor 628 using instruction from a routine in the instruction memory 632.

Intelligent methods of suggesting programs include analyzing personal profile data on the subscriber and/or historical data about the subscriber such as past books ordered by the subscriber (or buy data). This method is preferred in a book on demand system and can be performed at the distribution point or operations center 250 by the on-site processor 404 using subscriber databases stored in memory 428. The home system 258 receives the text data including program suggestion information from the distribution point or operations center 250 and generates the program suggestion submenus 855, 856, 857 using the same text data receiving 212 and viewer menu generation hardware (e.g., 607, 621) described above. Software routines and algorithms stored in instruction memories (e.g. 632, 732) are used to analyze historical data and book ordered data to determine a line of books to suggest to the subscriber.

The algorithms for this powerful feature of suggesting books or authors to subscribers are disclosed in great detail in U.S. Pat. No. 5,559,549, entitled REPROGRAMMABLE TERMINAL FOR SUGGESTING PROGRAMS OFFERED ON A TELEVISION PROGRAM DELIVERY SYSTEM, issued Sep. 24, 1996, and are incorporated herein by reference.

Referring to FIG. 13, submenus 858 are shown on the "Books In Your Library" submenu 872 and are preferably broken into shelf numbers with submenus for each shelf 874, 876. The submenus 858 for the "Books You Can Order" submenu 878 is similarly broken out into submenus by shelves 880, 882. These shelves may each be a category or genre of books. Electronic books may be grouped into categories such as best sellers, novels, fiction, romance, etc. See FIG. 14d.

Referring to FIG. 13, the submenu 858 for "Your Current Book" 884 allows a subscriber to select a current book 884 and then determine what page to view. This selection is confirmed with a level two submenu 885. The help submenu 887 provides the subscriber with additional help screens 888. The submenus 858 for available features 890 are preferably broken out into a sequence of separate submenus for each feature 891, 892.

Referring to FIG. 13, messages can also be sent with the delivery system 200. A level one message screen provides the subscriber with the ability to select from various messages the subscriber has pending 893. Each message is then shown on a separate submenu screen 894, 895. The message may contain text and graphics.

Referring to FIG. 13, account information is shown on a level one submenu 896 and then follow-on submenus 858 show the recent orders and your account balance 897. There is also a level one submenu for outgoing messages 898 which has a follow-on submenu used as an input screen 899.

In addition to the specific features and submenus described in FIG. 13 and FIG. 14a through FIG. 14j, many other variations and features are possible. When a book is finally selected for viewing the title page 886 will appear on the screen followed by a page of text.

III. The Billing And Collection System

The billing and collection system 278 (shown in FIGS. 2 and 3) utilizes the latest technology in electronic transaction and telephone switching to track orders, authorize deliveries, bill consumers, and credit publishers automatically. The telephone calls initiated by the phone connector 270 are received by the billing and collection system 278 which responds immediately without human intervention by placing the order and charging the consumers credit card account. Data is compiled periodically and publishers 282 are credited for sales of their books or other text. The billing and collection system 278 may also connect with subscribers through two-way cable connections, cellular, or other communication means.

It is preferred that the billing and collection system 278 communicate with the operations center 250 to track changes in available books and to provide statistical data to the operations center 250.

IV. Public Library School, and Bookstore System

Figure 15:
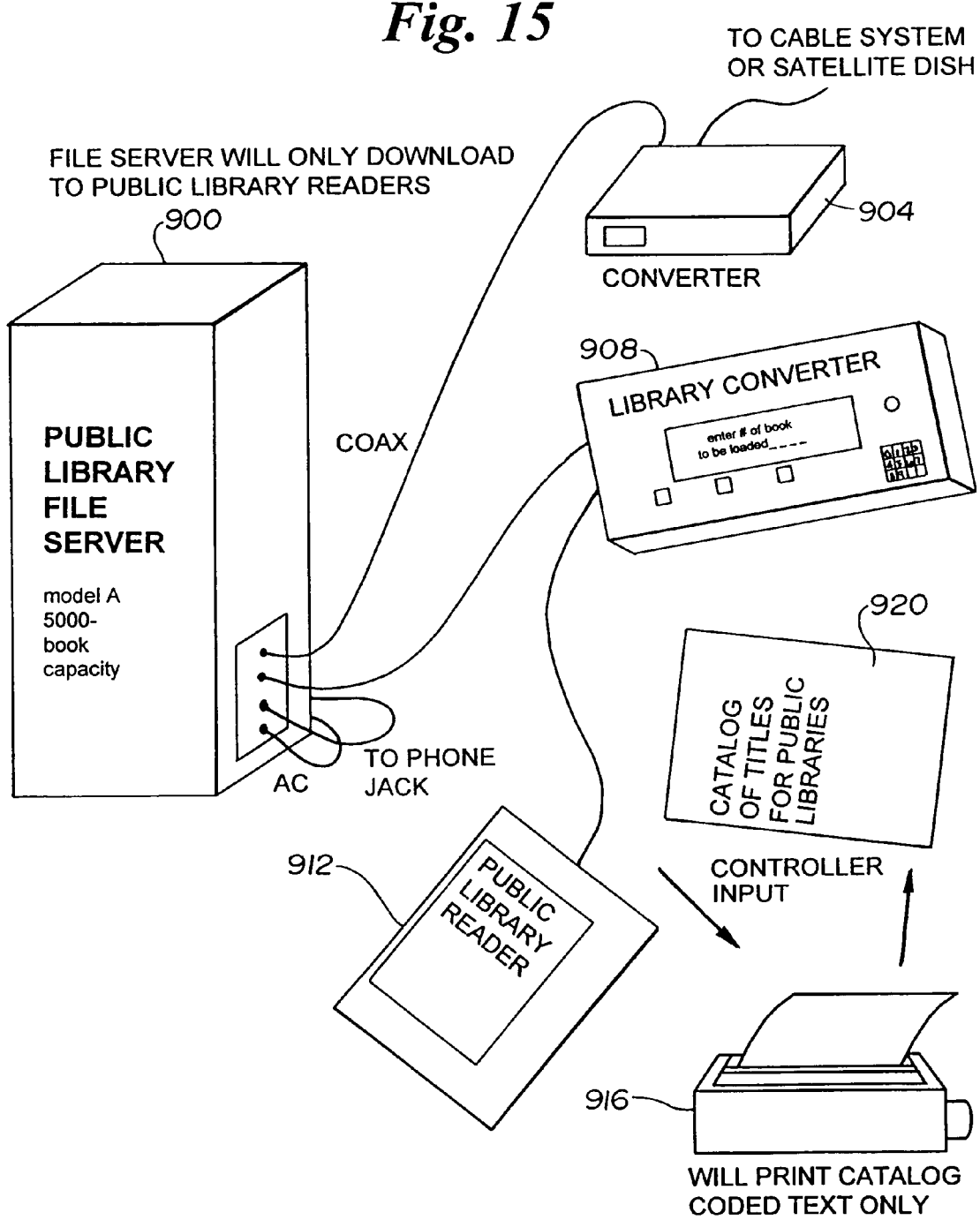
FIG. 15 is a schematic diagram of an electronic book system for a bookstore or public library.

The electronic book system can be modified to be used at public libraries, schools and bookstores. FIG. 15 shows one possible arrangement of components for a public library, school or bookstore location. The main unit at a public library, school or bookstore is the file server 900. The file server 900 is a large electronic memory unit that can store thousands of electronic books. Various electronic storage means may be used in the file servers, such as hard disks, read-write CD ROMs and read-only CD ROMs.

The system comprises five components; the file server 900, a converter or video connector 904, a controller 908, a viewer 912, and a catalog printer 916. The software for controlling the system is primarily located in the controller 908. The converter or video connector 904 is similar to those described above. In this configuration the controller unit 908 monitors the data being transferred to the file server 900 by the converter 904. The controller 908 is preferably provided with a viewing screen and several control buttons. When it is necessary to have a larger screen to perform more sophisticated controlling of the system a viewer 266 may be connected to the controller 908 and the viewer screen and controls 740 may be used.

The controller 908 is only able to download books to public viewers 912 which are authorized to receive books from the particular file server 900. For security reasons it is not desirable that the public viewer 912 have access to more than one file server 900. In this way, security can be maintained over the text data for books. It is preferred that the public viewer 912 be limited to receiving one or two electronic books at a time from the controller 908. When the subscriber of the public viewer 912 needs a new or additional electronic book, the subscriber returns the viewer 912 to the school or public library where the subscriber receives a new electronic book from the controller 908.

In order to track the electronic books that are available on the file server 900, the titles of the available books may be printed on a catalog printer 916. The catalog printer is connected to the library controller 908 and the titles of the electronic books are downloaded to the catalog printer 916. None of the coded text for any of the electronic books can be printed using the controller 908 and catalog printer 916 of this system. In order to maintain security over the data, none of the electronic book data is allowed to be downloaded to the printer 916. Once a complete printout of available electronic book titles, magazines, or other textual material is complete, a hard copy of the catalog 920 can be maintained at the file server 900.

The system shown may also be used at bookstores. The bookstores can rent the public viewer 912 to customers with the text for one or two electronic books loaded onto the public viewer 912. The public viewer 912 may be provided with an automatic timeout sequence. The timeout sequence would erase the textual data for the books after a certain period of time, for example, two weeks. It is expected that after a period of time (perhaps within two weeks) the renter would return the public viewer 912 to the bookstore and receive additional electronic books for viewing. Using this arrangement, it is also possible for the bookstore to (permanently) sell a viewer 912 to a regular customer. The customer then returns to the bookstore from time to time to receive textual data for an electronic book which the customer can then store permanently on the customer's own viewer 912. Various other configurations are possible for bookstores, schools and public libraries using the file server 900 and public viewer 912 described.

V. Use of a Set Top Converter

Existing set top converters such as those made by Scientific Atlanta or General Instruments are presently unequipped to handle the delivery system 200 of the present invention. Although set top converters may be built which include the library functions, hardware modifications are necessary in order to use the delivery system 200 with existing set top converter technology.

Figure 16A:
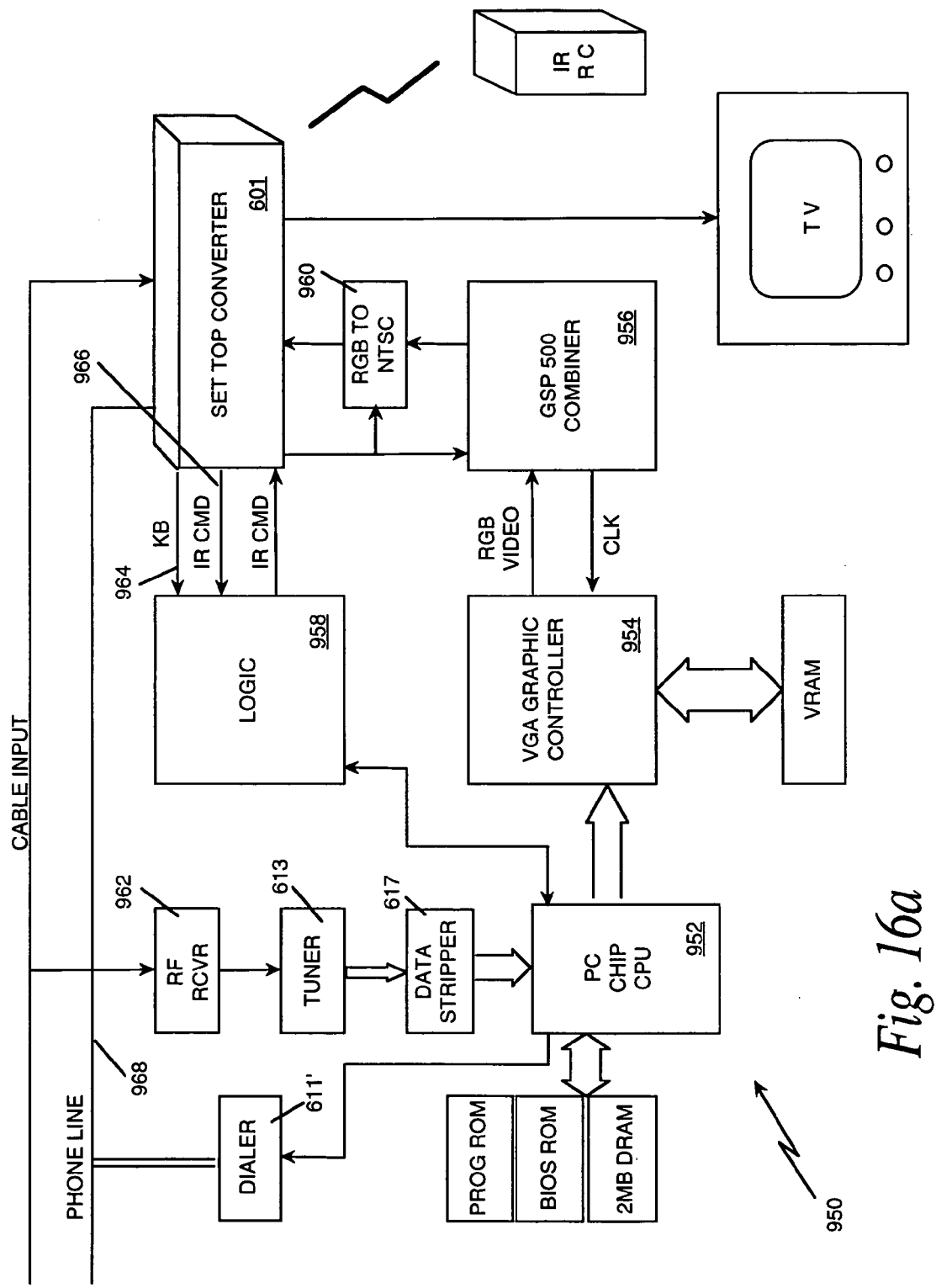
FIG. 16a and FIG. 16b are schematics of hardware modifications or upgrades to a set top converter.
Figure 16B:
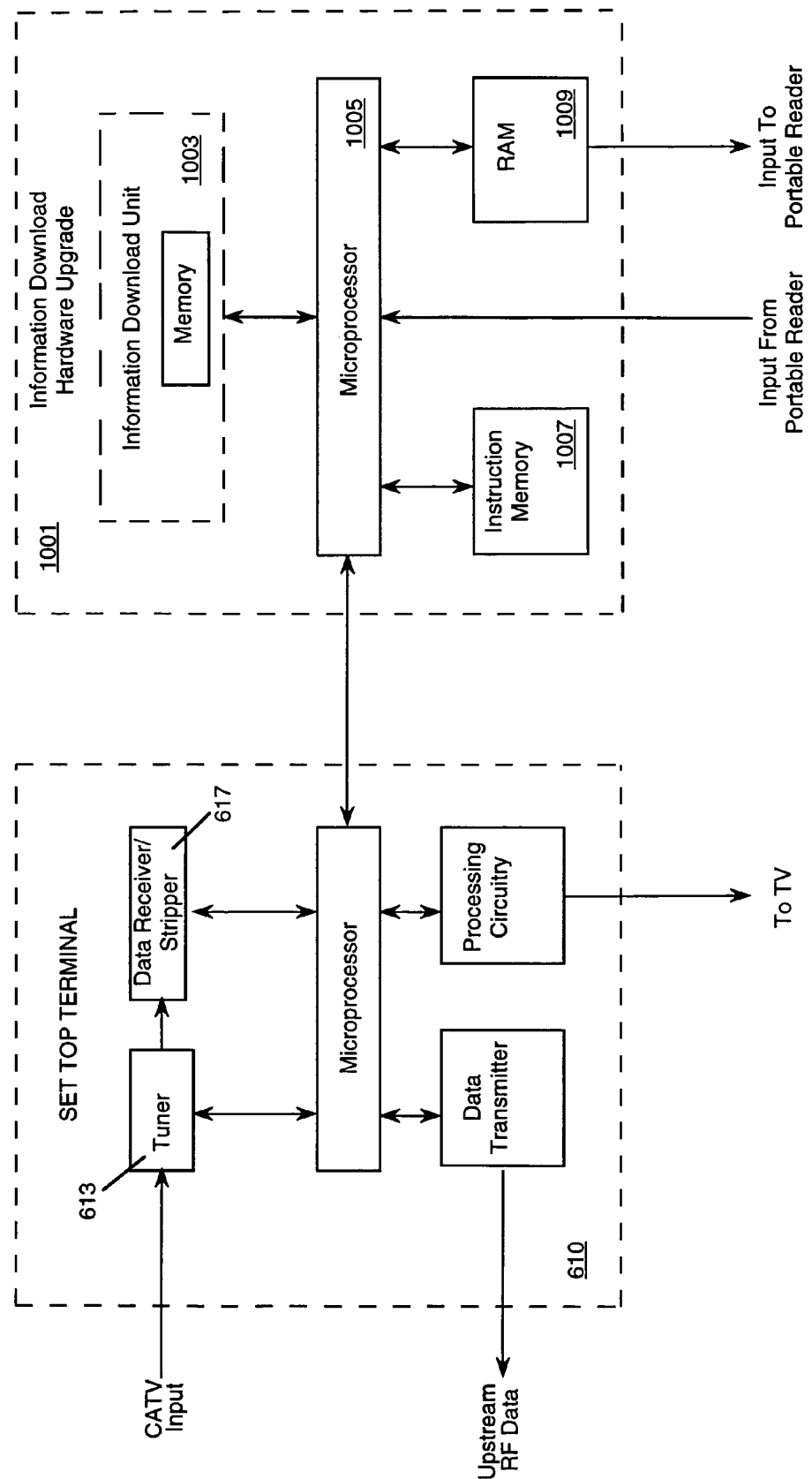

FIGS. 16a and 16b are examples of hardware modifications or upgrades. A port is used to attach hardware upgrades described below to a set top terminal. Two upgrades are possible to set top converters 601 to assist in receiving and selecting electronic books. A menu generation card upgrade (FIG. 16a) and an information download unit (FIG. 16b). Each of these upgrades may be connected to the set top terminal unit through an upgrade port. A four wire cable, ribbon cable or the like may be used to connect the upgrade to the set top converter 601.

A card addition 950 to a set top converter 601 is depicted in FIG. 16a. The card 950 shown provides the additional functionality needed to utilize the book selection system with existing set top converter 601 technology. The card 950 may be configured to slip inside the frame of a set top terminal and become part of the set top terminal, an advanced set top terminal. The primary functions the card 950 adds to the set top converter 601 are the interpreting of data signals, generating of menus, sequencing of menus, and, ultimately, the ability of the subscriber to select an electronic book using either the television or a viewer 266. The card 950 also provides a method for a remote location, such as the cable headend, to receive information on electronic books ordered. The electronic books ordered information and control commands may be passed from the cable headend to the card 950 using telephone lines.

The primary components of the card 950 are a PC chip CPU 952, a VGA graphic controller 954, a video combiner 956, logic circuitry 958, NTSC encoder 960, a receiver 962, demodulator (not shown), and a dialer 611'. The card 950 operates by receiving the data text signal from the cable headend through the coaxial cable. The logic circuitry 958 of the card 950 receives data 964, infrared commands 966, and synchronization signals (not shown) from the set top converter 601. Menu selections made by the viewer 266 on the remote control are received by the set top converter's 601 IR equipment and passed through to the card 950. The card 950 interprets the IR signal and determines the electronic book (or menu) the subscriber has selected. The card 950 modifies the IR command to send the information to the set top converter 601. The modified IR command contains the channel information needed by the set top converter 601. Using the phone line 968 and dialer 611', the card 950 is able to transmit electronic books ordered information to the cable headend. It is also possible to receive the electronic books over the telephone lines and by-pass the video distribution system. In this embodiment, the telephone system may be used to provide access to an Internet web site to order and receive electronic books.

These commands are passed through the interface linking the set top terminal's microprocessor with the microprocessor of the hardware upgrades. In this way, subscriber inputs, entered through the set top terminal keypad or remote control, can be transferred to any of the hardware upgrades for processing and responses generated therein can then be sent back to the set top terminal for display. In the preferred embodiment the IR commands 966 are transferred from set top terminal 601 to hardware upgrade.

Hardware upgrades may include a microprocessor, interactive software, processing circuitry, bubble memory, and a long-term memory device. In addition to these basic components, the hardware upgrade may make use of an additional telephone modem or CD-ROM device.

The information download hardware upgrade 1001 (shown in FIG. 16b) allows the subscriber to download large volumes of information from the operations center 250 or cable headend using the set top converter 601. The hardware upgrade 1001 will enable subscribers to download data, such as electronic books and magazines, to local storage. Primarily, the hardware upgrade 1001 is an additional local storage unit 1003 (e.g., hard disk, floppy, optical disk or magnetic cartridge and may include a microprocessor 1005, instruction memory 1007, and a random access memory 1009, as shown in FIG. 16b). Preferably, a small portable viewer 266 is also provided with the upgrade 1001 to enable downloaded text to be read without the use of a TV.

The downloadable information may be text or graphics supplied by the operations center 250 or cable headend. With this upgrade, electronic books may be downloaded and read anywhere with the portable viewer 266. Using this upgrade, books may be downloaded and stored in compressed form for later decompression. The electronic books would be decompressed only at the time of viewing. Important text that the public desires immediate access may made available through this system. Text such as the President's speech, a new law, or a recent abortion decision rendered by the Supreme Court may be made immediately available.

In the preferred embodiment, electronic book ordering information is stored at each set top terminal until it is polled by the cable headend using a polling request message format. An example of a polling request message format consists of six fields, namely: (1) a leading flag at the beginning of the message, (2) an address field, (3) a subscriber region designation, (4) a set top terminal identifier that includes a polling command/response (or P/F) bit, (5) an information field, and (6) a trailing flag at the end of the message. A similar response frame format for information communicated by the set top terminal to the cable headend in response to the polling request may be used.

Figure 17:
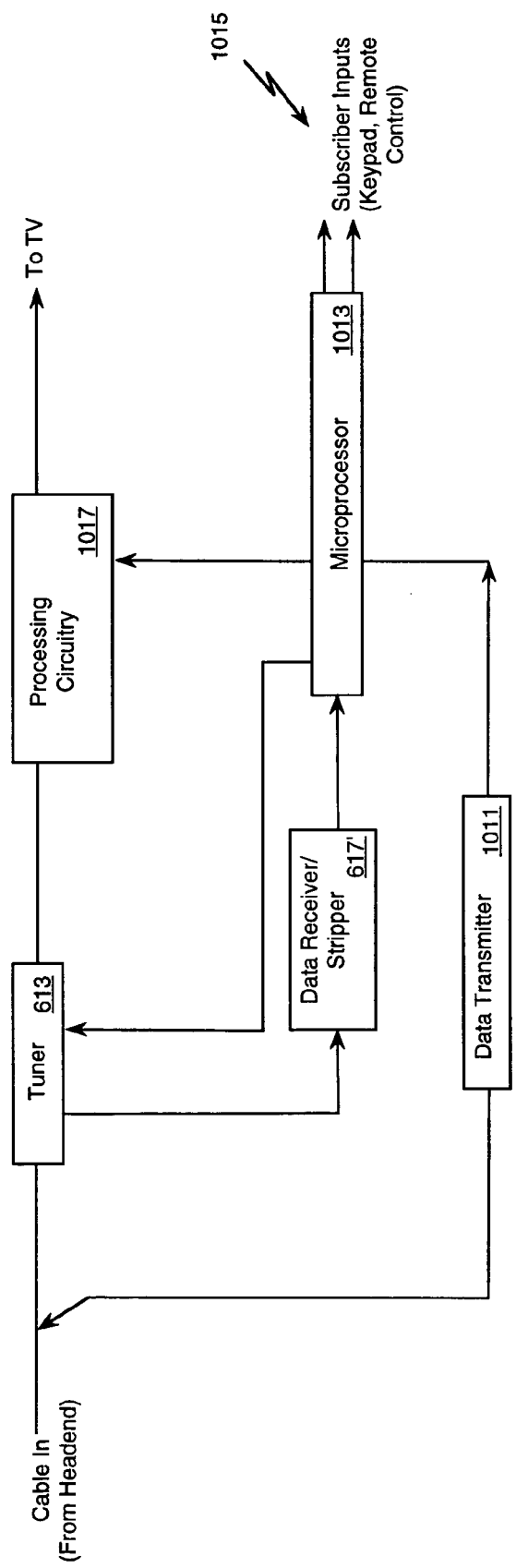
FIG. 17 is a schematic showing a set top terminal that includes a data receiver and data transmitter.

FIG. 17 shows a preferred set top converter that includes a data receiver 617' and a data transmitter 1011. The data transmitter provides upstream data communications capability between the set top converter 601 and the cable headend. Upstream data transmissions are accomplished using the polling system described and, using a data transmitter 1011. Both receiver 617' and transmitter 1011 may be built into the set top converter 601 itself or added through an upgrade module. Regardless of the specific hardware configuration, the set top terminal's data transmission capabilities may be accomplished using the hardware shown in FIG. 17.

FIG. 17 shows RF signals, depicted as being received by a data receiver 617' and tuner 613 working in unison. Both of these devices are interfaced with the microprocessor 1013, which receives inputs 1015, from the subscriber, either through a set top converter's keypad, a remote control unit or the viewer 266. All cable signals intended for reception on the subscriber's TV are accessed by the tuner 613 and subsequently processed by the processing circuitry 1017. This processing circuitry 1017 typically includes additional components (not shown) for descrambling, demodulation, volume control and remodulation on a Channel 3 or 4 TV carrier.

Data targeted to individual set top converters is received by the data receiver 617' according to each set top converter's specific address or ID. In this way, each addressable set top converter only receives its own data. The data receiver 617' may receive set top converter 601 specific data in the information field of the signal frame described or on a separate data carrier located at a convenient frequency in the incoming spectrum.

The received data includes information regarding electronic books and menus available for selection. The subscriber may enter a series of commands 1015 using a keypad or remote control in order to choose an electronic book or menu. Upon receipt of such commands, the microprocessor 1013 instructs the tuner to tune to the proper frequency of the channel carrying data and subsequently instructs the processing circuitry 1017 to begin descrambling of this data.

Upon selection of the electronic book, the microprocessor 1013 stores any selection information in local memory (not shown) for later data transmission back to the cable headend. The microprocessor 1013 coordinates all CATV signal reception and also interacts with various upstream data transmission components. Typically, the data transmitter 1011 operates in the return frequency band between 5 and 30 MHZ. In an alternative embodiment, the frequency band of 10 to 15 MHZ may be used. Regardless, however, of the frequency band used, the data transmitter 1011 sends information to the cable headend in the information field of the response frame described. Those skilled in the art will recognize that a number of variations and combinations of the above-described set top terminal hardware components may be used to accomplish upstream data transmissions.

VI. Books-On-Demand System

Figure 18A:
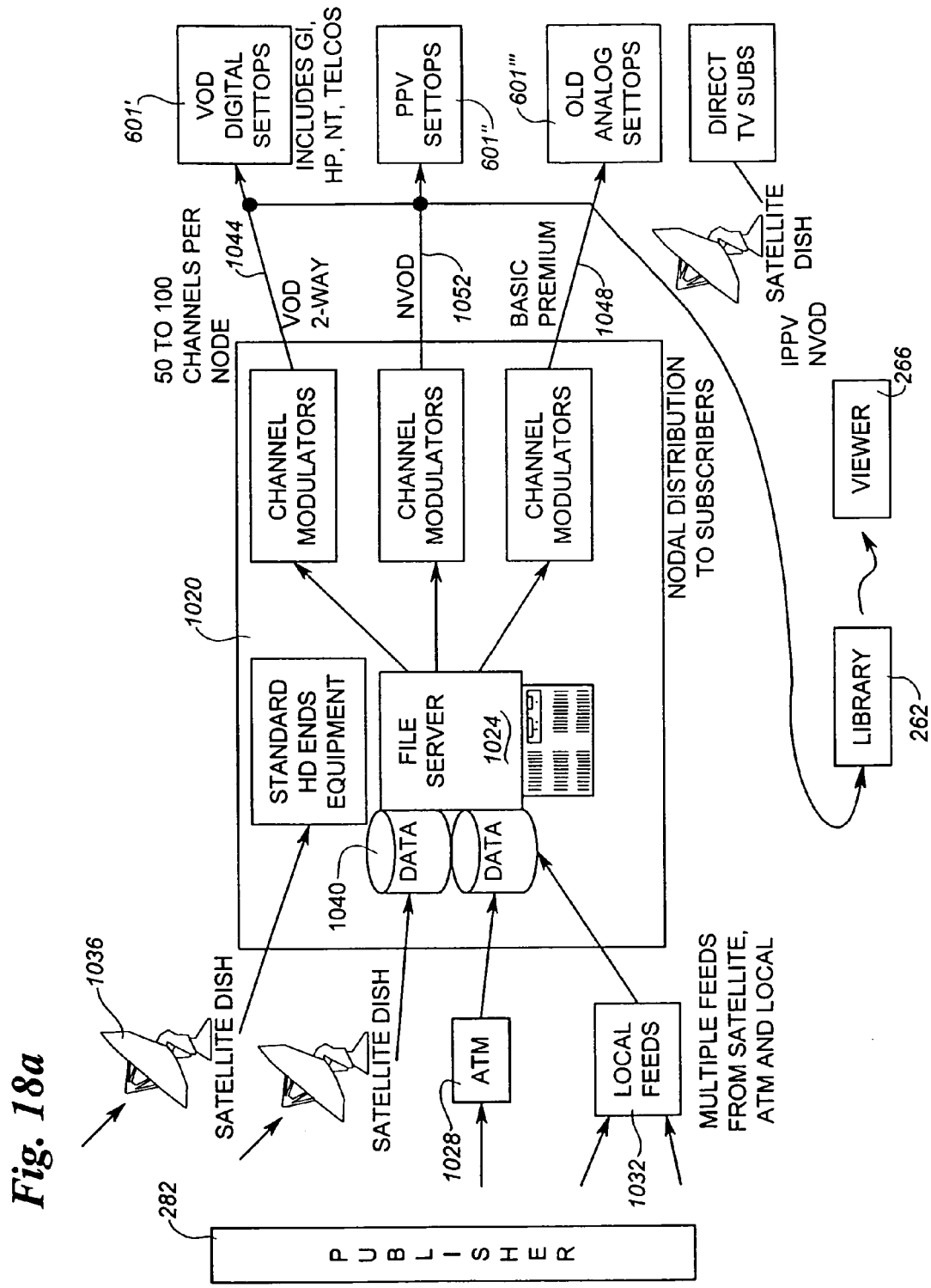
FIG. 18a is a schematic of a book-on-demand system.

The electronic book system 200 described may also be configured in a book-on-demand style. FIG. 18a shows one example of a configuration for a books-on-demand system. A books-on-demand system requires more powerful two-way communications between the consumer's home, bookstore, school or public library and either the operations center 250 or a distribution site 1020 such as the cable headend. This type of two-way communication can be provided by the hardware shown in FIG. 17 and described above.

Referring to FIG. 18a, in a books-on-demand system, the subscriber selects the electronic book to be download from an available menu of electronic books (see for example FIGS. 14d and 14e). The data for menus of available books is usually sent to the subscriber location by the distribution site 1020. After the subscriber's menu selection, information about the subscriber selection (or request) is then communicated to either a distribution point 1020 (such as a cable headend or an Internet web site) or the operations center 250. Upon receipt of this request, the needed textual and graphical information for the book is spooled and sent to the subscriber. In this manner, books are only sent when requested by the subscriber and are sent immediately upon demand for the book (or text).

In order to support such a books-on-demand system, the text delivery and distribution must be conducted on a strong nodal architectured distribution system, such as, a video-on-demand cable or telephone television system, an Internet web site, or through use of individual telephone access on the public telephone system.

The books-on-demand system allows for a greater selection of electronic books to the subscriber and limits the amount of communicated book data that is unnecessary or unneeded. It also provides the electronic book to the subscriber in a much timelier fashion.

In addition to a stronger distribution system, a books-on-demand system requires a distribution point 1020 to have more sophisticated equipment to access and "spool out" the textual information. This can be accomplished using file server technology 1024 for storing the electronic books and ATM 1028 or telephone-type switching (not shown) to distribute the textual information. The file server 1024 and distribution technology that can be used in configuring such a books-on-demand system is described in U.S. Pat. No. 5,262,875 and U.S. Pat. No. 5,218,695, cited above.

FIG. 18a shows an embodiment for a books-on-demand system that utilizes file server technology. In addition to electronic books, the embodiment of FIG. 18a will support distribution of nearly any digital data. Electronic books or textual files are received from publishers 282 and other sources through local feeds 1032, ATM 1028, or by satellite dish 1036. The data is then stored in memory 1040 at the file server 1024. The distribution point 1020 may be a cable headend that receives requests from subscribers and delivers text to subscribers over a two-way communication system (such as a video-on-demand system (VOD) 1044). Alternately, an Internet web site may serve as the distribution point 1020.

The library unit 262 can be connected to either a basic premium-type service cable system 1048, a near video-on-demand type cable system (or pay-per-view (PPV) 1052) or a video-on-demand cable system 1044. In connecting with either of these three systems the library unit 262 may access the cable directly or may access the system through a set top terminal 601', 601", or 601'".

Using the two-way video-on-demand system 1044, a subscriber is able to request a specific electronic book title and receive that text immediately following its request. To accomplish this, the distribution point 1020 transmits a list of available electronic books through the cable delivery system to the library unit 262. The library unit 262 displays the list of available electronic books on a menu or similar format. As described earlier, it is preferred that the library unit 262 use menus which list categories of available electronic books to form its request from the distribution point 1020. After selecting an electronic book, the library unit 262 sends a request signal on the two-way communication system 1044 back to the distribution point 1020. This request signal can be handled in two ways. The library unit 262 either initiates the request or the distribution point 1020 polls the various libraries on to the two-way system 1044. Upon receiving the request for the electronic book title, the text associated with that book title is transmitted to the library unit 262 using the two-way cable system 1044.

Figure 18B:
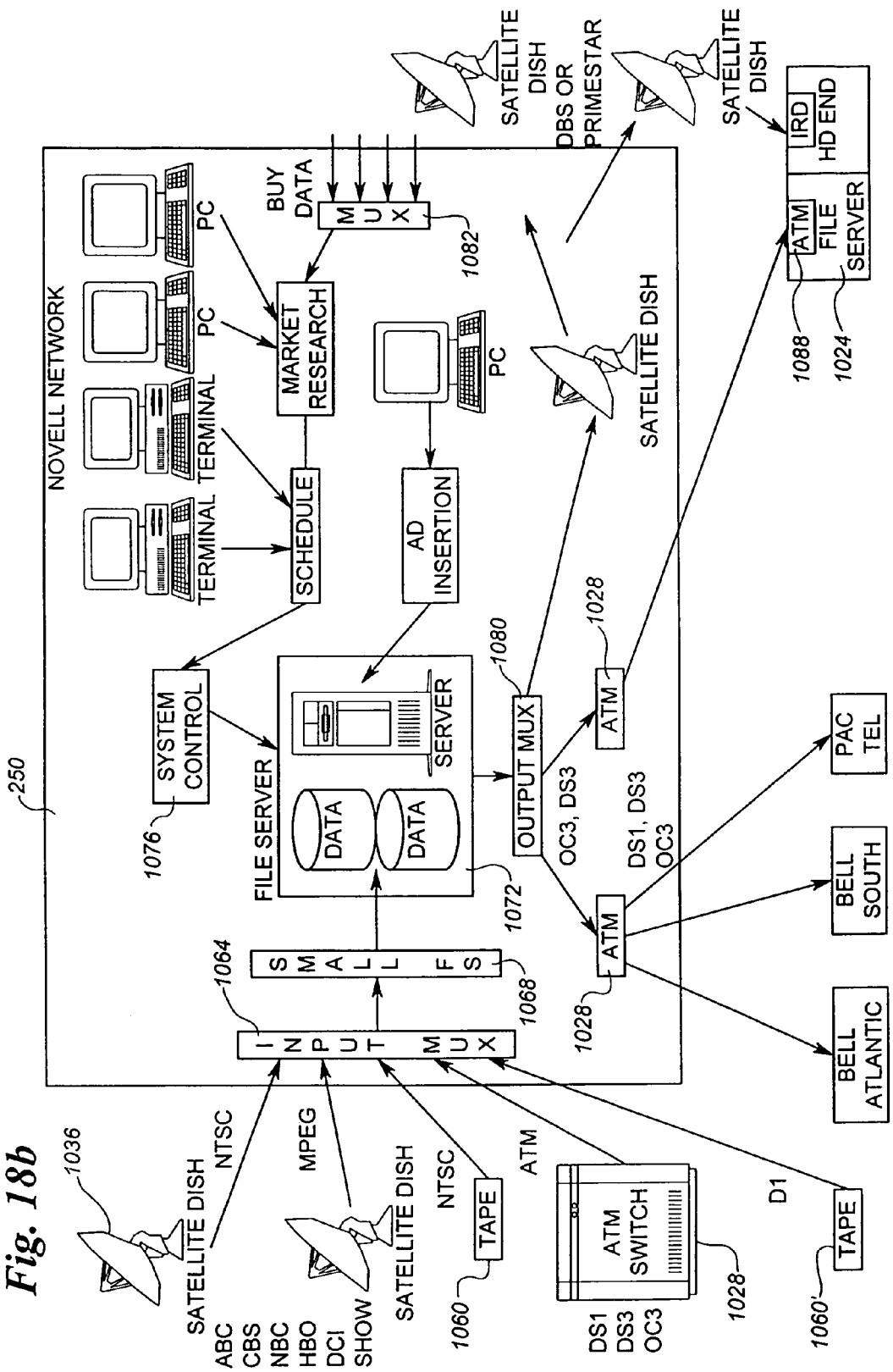
FIG. 18b is a schematic of an operations center supporting a book-on-demand system.

FIG. 18b is an expanded view of a preferred operations center 250 that supports a regional or national books-on-demand system. In fact, the operations center 250 shown supports distribution of nearly any digital data. The operations center 250 supports multiple feeds to receive digital information by tape 1060, 1060', ATM 1028, or satellite 1036. The information is processed through an input MUX 1064 and a small file server 1068 before reaching the master file server 1072. Digital data such as electronic books received from publishers 282 is then stored on the master file server 1072. It is preferred that the digital data is stored compressed in a standard format such as MPEG2.

A system controller 1076 provides control over the regional or national books-on-demand system. Electronic books may be packaged into groups to provide feeds to various cable headends. In addition, scheduling and marketing research are conducted at the operations center 250. In order to handle the scheduling and market research, electronic book buy data is received at the operations center 250 through a multiplexer 1082. Electronic book buy information can be provided by the operation center 250 to the billing and collection system 278.

The operations center 250 is also equipped to insert messages or advertisements into the file server. These messages or advertisements will eventually be received by the subscribers.

The master file server 1072 uses an output multiplexer 1080 and ATM 1028 as well as satellite connections to distribute digital data. In the preferred embodiment, cable headends receive text data on electronic books from the master file server 1080 through the output multiplexer 1028 and an ATM system 1028. After receiving the electronic book data, the cable headends store the books in a local file server 1024. FIG. 18a's distribution point 1020 is an example of a cable headend which may receive data from the operations center 250 of FIG. 18b through an ATM hookup 1088 or satellite hookup.

VII. Electronic Book Link System

Electronic book links allow the subscriber to use the electronic book viewer 266 to traverse pre-defined paths between content in their currently viewed electronic book to related information contained either elsewhere in the electronic book, elsewhere on the viewer 266, or external to the viewer 266, including in the library unit 262 or in a connected Internet web site. These links provide an organized and methodical method for the subscriber to quickly access related topic areas or seek clarification of the currently viewed material.

An electronic book includes first locations, or components, such as words, phrases, sentences, sections of text, paragraphs, pages, chapters, figures, drawings, maps, video clips, and audio clips. Links to second and subsequent locations, or components, contained in the same electronic document or in another related electronic document, file, or database can be associated with each of these first components. First components with underlying links can be highlighted and displayed on the viewer display 602 or on the connected television 259 or a personal computer 261 (see FIG. 2). First components that have underlying links associated with them may be identified by assigning them a unique identifier. The unique identifier can be a word or phrase, an alpha-numeric value, a coordinate point, or other unique identifier. In an embodiment, each such first location may be assigned an identifying index value.

The use of the index value allows the first components to maintain links with other components, even if the electronic book is altered. For example, a subscriber may use a cut and paste edit feature to move a block of text containing a first component. Cutting and pasting will not affect the status of the first component and its links to other components. Similarly, changing font style or font size will not affect the status of the links.

In the creation of an electronic book, or subsequently, the electronic book may undergo a process that maps identifying index values to each of the first components. These index values can then be accessed by software directives that drive the presentation of alternative or linked material (e.g., material at one of the second locations) once a selection is made. For each electronic book, these index values may be contained in a hidden table that maps the identifying index values of all first components with underlying links to the location of the linked material (the second location). Moreover, each such first component may be linked to one or many linked material locations. That is, the first component may be linked to a second component, a third component and so on. An example of a hidden table is presented below.

As shown in the table, a first location "Cezzanne" has an identifying index value 135. "Cezzanne" has three links. A link to a second location is to an art encyclopedia. A link to a third location is to an electronic dictionary that provides a pronunciation guide. A link to a fourth location is to an audio file that plays a short biography of the artist. Each of the second, third and fourth locations have their own index values.

| Identifying Index Value(s) | Component Identifier | Link Number | Linked Material Identifier | Linked Material Description | Linked Material Location (file location/file name/ corresponding index value) |
|---|---|---|---|---|---|
| 135 | "Cezzanne" | 1 | More on Cezzanne | Reference material on Cezzanne | Art-Encyclopedia.com/ FrenchArtists/Index Value = 1 |
| 135 | "Cezzanne" | 2 | Pronunciation | Pronunciation of the word | Websters.com/ Websters E-Dictionary/Index Value = 56221 |
| 135 | "Cezzanne" | 3 | Audio Clip | Audio file providing condensed Cezzanne's biography | Viewer/ Current file/Index Value = 199384 |
| 133-135 | "PorchScene by Cezzanne" | 1 | Graphic File | JPEG file presenting Cezzanne's PorchScene painting | Viewer/ Current file/Index Value = 9382 |
| 5673 | "reactivism" | 1 | Definition | Definition of the word | Websters.com/ Websters E-Dictionary/Index Value = 564 |
| 4948-4950 | "Order Little Women" menu item | 1 | Book Order | Order the book Little Women | Discovery.com/ Little Women Order/Index Value = 672 |
| 4949-4950 | "Little Women" | 1 | Book review | Review of the book "Little Women" | LiteraryWorks.com/ Little Women/Index Value = 1 |
| 90462 | "Dental diseases" | 1 | TOC link to Document Body | Link from Table of Contents to desired chapter | Viewer/ Current file/Index Value = 69980 |
| 1342 | "Dental diseases" | 2 | Related discussion group | Access to Web discussion group on gum diseases | NoMoreCavities.com/ Index Value = 1 |
| 572 | "VegieMaster" | 1 | Product Order | Order the product "VegieMaster" | HomePurchases.com/ KitchenProducts/Index Value = 1 |
| 14 | "Chesapeake" | 1 | Video | Video clip of interview with J. Michener on writing of Chesapeake | Viewer/ Current file/Index Value = 38677 |

-continued

| Identifying Index Value(s) | Component Identifier | Link Number | Linked Material Identifier | Linked Material Description | Linked Material Location (file location/file name/ corresponding index value) |
|---|---|---|---|---|---|
| 14 | "Chesapeake" | 2 | Narration | Audio file - narration of Chesapeake by J. Michener | Viewer/ Current file/Index Value = 38678 |

Linked material location information (i.e., the location of second and subsequent components) can include source location, book name, chapter, page, line, and word as identified by their index value. The source location will provide the delivery system 200 the necessary information to contact the operations center 250, the Internet web site 279 (see FIG. 2) or another electronic database and request the appropriate material for retrieval and download if it currently does not reside on the viewer 266 or the home system 258. In the case that the linked material resides on the Internet web site 279 or on another electronic database, the location information in the hidden table allows the operations center 250 or home system 258 to retrieve the desired material from the Internet web site 279 or from the electronic database.

If the second component, or linked material, is located at the viewer 266, the processor in the viewer 266 can cause the linked material to be displayed without any communications with an outside source. For example, if the first component is the name "Cezzanne" and the linked material, or second location, is in an electronic dictionary stored in the viewer 266, the viewer 266 can display the electronic dictionary entry for "Cezzanne." This linked material may be displayed full screen, in a picture-in-picture window, or as an overlay, for example. The entry can also remain hidden, until a user of the viewer 266 commands the entry to be displayed.

Upon selection of a component with underlying links, the software directive determines the identifying index values associated with the selected component, searches the table for the index values of the selection made, looks up the corresponding linked location, accesses the location, and displays the linked material on the viewer 266. The linked material can be displayed on the viewer 266 in place of the original source material, or simultaneously with the original source material by displaying the linked material in a picture-in-picture window, via a split screen, or via a screen overlay.

Figure 19:
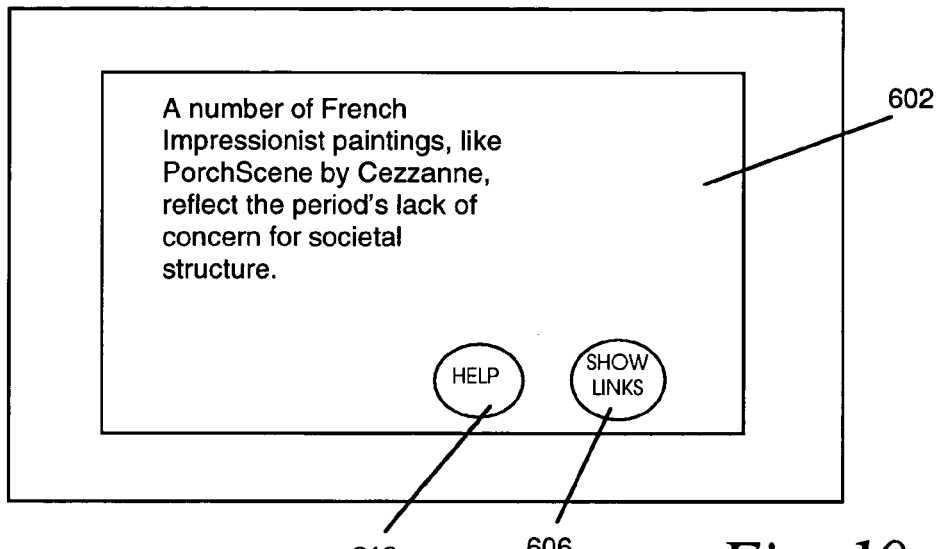
FIG. 19 is a schematic of a page of an electronic book having electronic links.

FIG. 19 shows a portion of a page of electronic text having one or more electronic links. The display 602 may include a show links button 606 and a help button 612. The show links button 606 may be used to display a link menu 971 (see FIG. 13 and FIG. 20). That is, the viewer 266 can be commanded, via the show links button 606, to display all components that have underlying links. The components may be displayed in a highlighted mode, in a different color, in a unique font, bold or italic typeface, underlined, outlined, or in reverse background mode, for example. To make a selection of a component to view the underlying linked material, the cursor 745 is used to identify the desired selected item. The ball 743 is used to guide the cursor 745 across the page to the desired selected item, and the selection button is used to make the selection. Alternatively, cursor movement for screen navigation can be provided via devices such as a fingerpad, mouse, or joystick. Selection can also be made by incorporating a touch-sensitive screen into the viewer 266.

Figure 20:
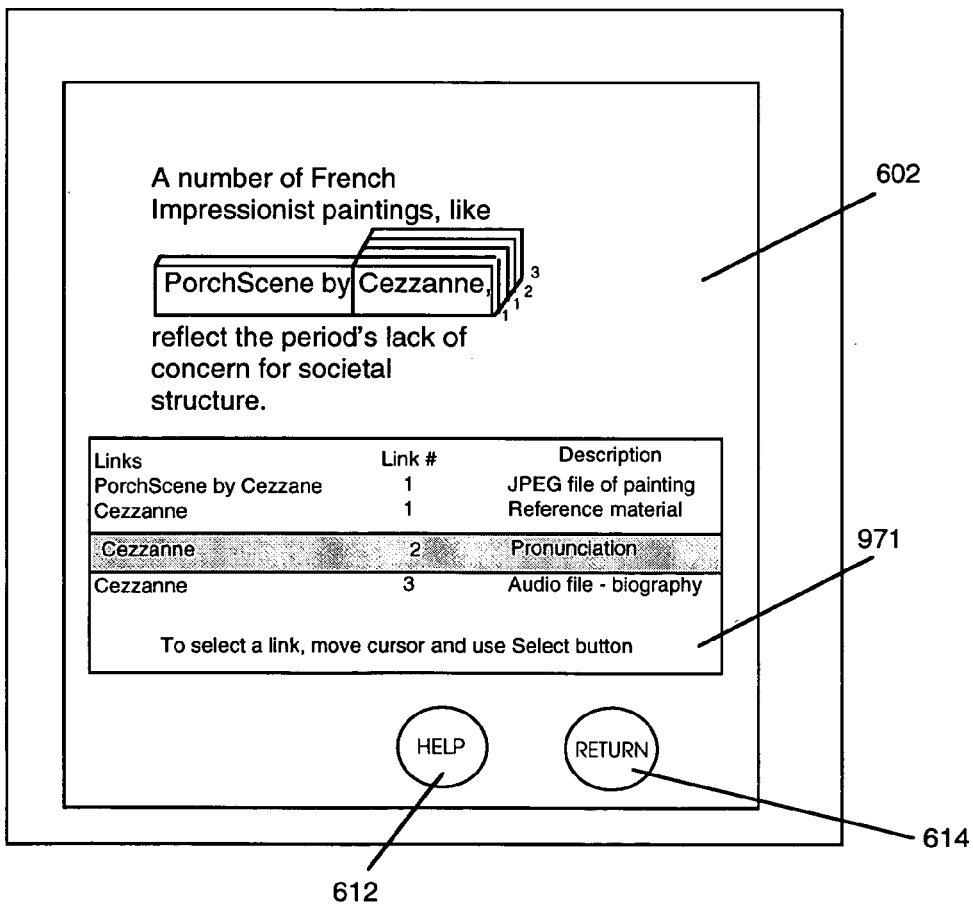
FIG. 20 is a schematic of a page of an electronic book with the electronic links shown.

FIG. 19 depicts the display before commanding the viewer 266 to show links. FIG. 20 shows the display once the request has been made to display all underlying links. FIG. 20 shows the link menu 971, a help button 612, and a multi-function button, or pull-down menu, 614. The multi-function button 614 can be used as a return button, a hide active links button, and a restore active links button, for example. Alternately, several additional buttons may be provided to select these features. The multi-function button 614 may be active when the show links button 606 has been operated. In FIG. 20, the components having underlying links are "PorchScene by Cezzanne" and "Cezzanne." The component "PorchScene by Cezzanne" is shown with one link and the component "Cezzanne" is shown with three links. Also shown in FIG. 20 is the link menu 971 that lists the links, or components, the link number and a description of the linked material. For example, the material linked to the component "PorchScene by Cezzanne" is a JPEG video file showing the painting.

Once a link is selected, an on-screen return button 614 allows the subscriber to return from the linked material back to the originally viewed text. The show links button 606 (see FIG. 19) can be displayed on the viewer 266 either at all times that an electronic book is open, any time an underlying link exists, or only when commanded to do so from the viewer's menu system 851.

When linked material is displayed (for example, in an overlay fashion) the subscriber can command the linked material to be placed in a hidden state by operating the hide active link button 614 or by use of the menu system 851. When an active link is hidden, the restore active link button 614 is displayed. Operation of the restore active link button 614 will display the material linked by the active link.

Alternatively, the on screen "Help" menu 887 (see FIG. 13) provides access to further assistance when selecting links. The Help menu 887 is accessed by operation of the on-screen help button 612. Related link options will be available for display on the viewer 266 by selecting the Help menu 887, using the cursor 745 to do so. The "Help" function allows the subscriber to select which specific links to be displayed on-screen. The links when displayed may be simply highlighted portions of text, or text in different colors. All links for the displayed page can be selected to be displayed. Alternatively, by selecting a range of content in an electronic book that may have multiple underlying links, only links associated with the components within the selected range will be presented on the viewer 266 for the subscriber to select the specific link desired. Alternatively, a fixed number of links may be selected to be displayed on the screen at a time. Alternatively, only a certain type of link may be selected to be displayed. The types of links that are available for display may be listed in a pop-up menu. The subscriber can choose from this pop-up menu which of the links to display. For example, the pop-up menu could list links for a dictionary and links to an Internet web site. The subscriber could choose to display only the dictionary links. FIG. 21 depicts the menu screen 981 used to manage the subscriber's filtering of links to view.

Figure 22:
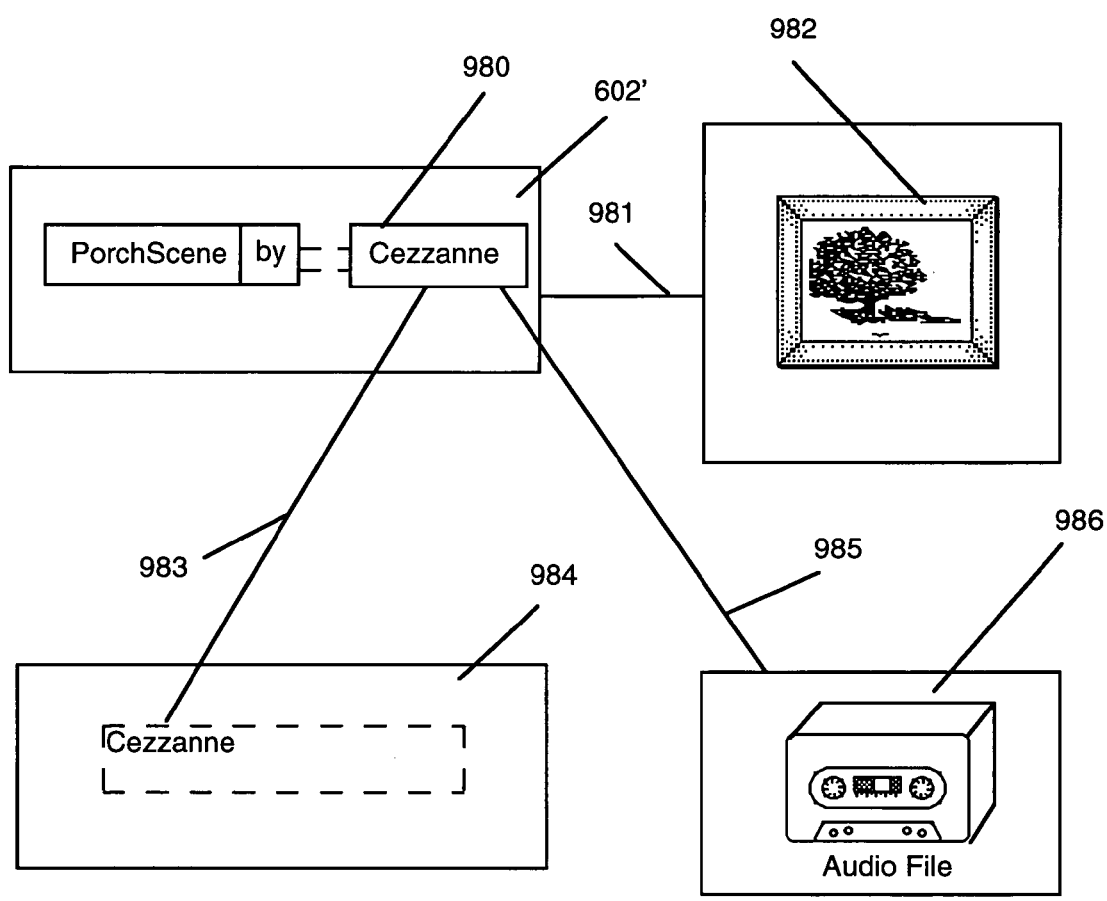
FIG. 22 is an example of links in an electronic book.

FIG. 22 is a logical representation of the components and links for the example first component "Cezzanne" shown in FIG. 19. In FIG. 22, the text block (page) 602' containing the first component Cezzanne 980 is shown linked to components in other electronic files or documents. A first link 981 links Cezzanne 980 to a reference material component 982, which is an encyclopedic entry related to the artist. A second link 983 links Cezzanne 980 to a dictionary entry 984 that includes a pronunciation key for the artist's name. A third link 985 links Cezzanne 980 to an audio clip 986, which provides an audio file describing the artist's life. If the subscriber chooses the audio clip 986, the audio file will immediately begin playing and will be broadcast on a speaker in the viewer 266, or the attached television or the attached personal computer, as applicable. The subscriber can stop the playback by operating the hide active link button 614.

The links described above may also function in two directions. A biography of Cezzanne could include a link to the JPEG file showing PorchScene. The JPEG file PorchScene could be one of several still videos of the artist's work. This JPEG file could be linked to an appropriate section of the Cezzanne biography. Then, if the subscriber were viewing the JPEG file for PorchScene, the subscriber could display the link to the biography and, upon activating the link, have displayed that portion of the biography that discusses Porch-Scene. In this example, the same link is used to display either the JPEG file or text from the biography. The same hidden table can be used with the two electronic files (i.e., the biography and the JPEG file). Alternately, each electronic file may have its own hidden table. In this alternative, the same link may be referenced in each of the hidden tables.

In the discussion above, each first component is linked to one or more other components. However, the other components (i.e., the second and third components, for example) may also be linked together. In addition, other components linked to one first component may be crossed-linked to other components that are linked to a second first component (identifying secondary or tertiary cross-links). For example, the JPEG file of PorchScene referred to in FIG. 20 may be cross-linked to the audio file-biography shown in FIG. 20. Displaying the JPEG file will result in a cross-link being identified that links the JPEG file to the audio file.

The cross-link may be indicated by highlighting, underlining, outlining, using a bold or italics typeface, using a different font, and using different color text. If the cross-linked material is selected, that material will then be displayed. In the example described above, the JPEG video file that shows the painting PorchScene can be cross-linked with Cezzanne and its identity would be displayed on the viewer 266. The video file could be displayed full screen or in a picture-in-picture format. The video file could also be displayed on the attached television 259 or the personal computer 261 (see FIG. 2). Finally, the video file could be printed by sending the video data and a print command to a printer 262 attached to the home unit 258 or to the personal computer 261.

In the table previously shown, all the links for a number of electronic books were provided in one hidden table. In an alternate arrangement, many hidden tables may be provided. For example, each electronic book may be provided with a hidden table. In this alternative, the many hidden tables could form a relational database of linked material. As an example, several different electronic medical text books could each be provided with its own hidden table. An electronic general medical encyclopedia could also be provided with a hidden table. Terms that are listed in one of the several medical electronic text books could then be linked, in a relational fashion to the electronic medical encyclopedia. The several electronic medical text books could also be relationally linked to each other, to on-line databases and to other electronic files. For example, an electronic medical text book could be electronically linked to electronic books, databases and other electronic files maintained at a medical school's library.

The hidden table (either for many electronic books, or individually for each electronic book) may be provided by the central provider or distributor as an additional feature that is paid for separately from purchasing an electronic book. The distributor may offer many different levels of service, such as only linking material (components) stored on a viewer, only linking material within a particular electronic book, or linking one or more electronic books to electronic files outside the home system 258 (e.g., linking an electronic book to a database maintained by the distributor at an Internet web site).

Downloading the most current links table for an electronic book from the operations center 250 or the Internet web site 279 refreshes the hidden links table, that is, any new links that have been generated by the operations center 250, for example, are added to the hidden links table. The current links table may be downloaded in conjunction with downloading a new electronic book. Alternately, the current links table may be provided periodically by the operations center 250.

Subscribers can create their own links by adding new entries to the hidden links table, using Hypertext Markup Language (HTML) or other standard programming language or by using a simple graphical user interface, for example. In an embodiment, an on-screen, software-based, menu-driven facility is provided, accessible through the menu system 851 (see FIG. 13), that allows the subscriber to select the desired source components to define an underlying link, to select the desired linked components and define their location, and to create the remaining table entries. Creation of table entries can be supported via either an on-screen, simulated keyboard, the attached keyboard 267, or the remote keyboard 268 (see FIG. 6a). To ease creation of links, default table entry items may be offered to the subscriber by the menu system 851 where ever possible. The desired linked components can be accessed and displayed simultaneously with the desired source components via the use of a picture-in-picture window, via a split screen, or via a screen overlay. Alternatively, if the material to be linked is to be created by the subscriber, the subscriber can create a new content file on the viewer 266 and link directly to components in that newly created file. This allows the subscriber to create customized annotations and notes that are directly associated with the specific components of an electronic book. Text entry into the newly created file is handled via either the on-screen, simulated keyboard, the attached keyboard 267, or the remote keyboard 268.

As noted above, links within electronic books may be self-contained in nature, where all the material to be linked to is resident within the same electronic book file. Additionally, links may also be provided between material residing on the viewer 266. Also, links may be provided to material that currently resides on the home system 258, if separate from the viewer 266. Finally, links may be provided to material that must be accessed through a communications network. For example, material that is ordered or downloaded from the operations center 250 or the Internet web site 279 may be linked to the electronic book. On screen menus can also be supported on the viewer 266 in the form of electronic book files, serving as a book or product catalog or service catalog that allows the subscriber to link to the operations center 250 or the Internet web site 279 to order additional electronic books or products and services at any time by selecting the desired component from the text.

If the content that is to be linked to is currently not available on the electronic book viewer 266, the viewer 266 may prompt the subscriber to decide whether to: 1) retrieve the corresponding material immediately from the home system 258, the operations center 250, or the Internet web site 279; 2) wait until the next communication opportunity with the home system 258 or operations center 250 to retrieve the material; 3) commence direct outside communications with another communications system (e.g., a telephone in a PSTN); or 4) stop.

In one embodiment, the first components on the viewer 266 are a Table of Contents and List of Figures for a book. Making a selection from the Table of Contents and List of Figures automatically links to and displays the selected page within the electronic book file. In another embodiment, the first components on the viewer 266 may be an Index of an electronic book. Selecting the desired topic and associated page will cause that page to be displayed on the viewer 266. In yet another embodiment, the first component is a footnote or endnote. When the footnote is selected, the viewer 266 provides a display of material that further addresses the reference. In another embodiment, the first component is a word or phrase that has a further definition or clarification associated with it. By selecting the first component, the corresponding dictionary definition, foreign translation, or glossary entry will be displayed on the viewer 266. The dictionary definition or foreign translation may also be provided via an audio file. In this embodiment, electronic books can be bundled with other standard reference material or alternatively, stand-alone reference material like dictionaries or encyclopedias may be accessed from within multiple electronic book files.

In another embodiment, the first component is a reference to another electronic book altogether. By selecting the first component, the selected book is displayed on the viewer 266. In another embodiment, on-screen menu buttons will be displayed on the viewer screen 602 that allow for a quick link to the Table of Contents, Index, glossary, and other key electronic book sections by simply selecting the item on the viewer screen 602 with the cursor 745. In yet another embodiment, the selected first component links the subscriber to a book review or series of book reviews, providing additional information to assist in the decision of selecting a new electronic book. In another embodiment, the selected first component is a book title, chapter title, or text in the body of a book that is linked to an audio file that serves as an audio narration of the selection that is played on the viewer 266. In yet another embodiment, the selected first component links to a video file (JPEG or MPEG) that can be displayed on the viewer screen 602. Another embodiment is a first component that links to textual annotations and notes that have been created by the subscriber.

One embodiment includes first or subsequent components that are electronic book titles that, when selected, links the subscriber to the operations center 250 or the Internet web site 279 to allow for the ordering of the selected book. In a similar embodiment, the selected component consists of a product that, when selected, link the subscriber to the operations center 250 site or an Internet web site to allow for the ordering of the selected product. Lastly, in another embodiment, the selected component is a topic on which there is a link to an Internet-based discussion group that addresses the topic in more detail.

When a link is provided to link a word or phrase to a foreign language dictionary, the viewer 266 may display a foreign language selection feature. The subscriber may then indicate which language to use when activating the link. For example, an English word or phrase in the electronic book may be linked to a French, Spanish or German dictionary. The subscriber may specify which of these foreign language dictionaries to link to.

While this invention has been described in conjunction with the specific embodiment outlined above, it is evident that many alterations, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

The invention claimed is:

1. An electronic book system tangibly embodied on a computer-readable medium, comprising:
   an electronic book; and
   a menu system, the menu system including:
   a help menu, wherein the help menu provides instructions for using the menu system; and
   a show links menu, wherein when selected, the show links menu displays a link type menu that includes audio clip links, graphics file links, definition links, language translation links, book order links, book review links, related discussion group links, pronunciation links, data base links, other book links, and book selection links.

2. The system of claim 1, wherein each component of actual text on a page of the electronic book may have one or more links to additional components.

3. The system of claim 2, wherein a desired link type is selected by highlighting the desired link type from the link type menu with a cursor and operating a select button, and wherein when the desired link type is selected, all links of the selected type that exist on a displayed page of the electronic book are highlighted.

4. The system of claim 3, wherein the links of the selected type are highlighted in a color that is different from other colors the displayed page of the electronic book.

5. The system of claim 3, wherein the links of the selected link type are displayed in a font that is different from other fonts on the displayed page of the electronic book.

6. The system of claim 3, wherein the links of the selected link type are highlighted by displaying the links in one of a bold typeface, an italics typeface, and an underlined typeface.

7. The system of claim 3, wherein a desired link is activated by selecting a desired highlighted link from the displayed page of the electronic book using the cursor and operating the select button.

8. The electronic book system of claim 1, wherein the components in the links menu are electronically stored at a location where electronic books are orderable and purchasable.

9. A method for linking electronic files to electronic books, comprising:
   identifying a selectable text element that is a section of actual text in a first electronic book;
   associating an electronic file with the selectable text element, wherein the associating step creates an electronic link;
   repeating the identifying and associating steps, thereby creating multiple electronic links, each electronic link having a corresponding selectable text element and a corresponding electronic file; and
   providing a links menu, wherein the links menu is capable of displaying all of the available corresponding electronic links associated with a selected one of the selectable text elements in the first electronic book, wherein the links menu displays all of the available corresponding electronic link types for a displayed page in the first electronic book, and, when a desired electronic link type is selected from the links menu, only the available corresponding electronic links of the selected link type are displayed on the page.

10. The method of claim 9, wherein the electronic books are stored in an electronic book unit.

11. The method of claim 10, wherein the electronic book unit comprises:
 a memory that stores the electronic books and associated electronic files;
 a display that displays the electronic books and the electronic files;
 a control unit adapted to receive commands from a user; and
 a controller that controls operation of the electronic book unit and activation of the electronic links.

12. The method of claim 9, wherein one of the selectable text elements is a location in an index of the first electronic book, wherein activation of the corresponding electronic link displays a page of the first electronic book associated with the location in the index.

13. The method of claim 9, wherein one of the selectable text elements is a location in a table of contents of the first electronic book, and wherein activation of the corresponding electronic link displays a page of the first electronic book associated with the location in the table of contents.

14. The method of claim 9, wherein one of the selectable text elements is one of a word and a phrase in the first electronic book, and wherein the corresponding electronic file is a location in a dictionary that defines the word or phrase.

15. The method of claim 14, wherein the electronic book unit includes an audio module, wherein when the corresponding electronic link is activated, the audio module provides an audio presentation giving a pronunciation of the word or phrase.

16. The method of claim 14, wherein the dictionary is a foreign language dictionary, and wherein the electronic file is displayed in a foreign language.

17. The method of claim 16, wherein the electronic book unit activates a selected foreign language selection feature, and wherein the electronic book unit activates a selected foreign language dictionary based on an input from the foreign language selection feature.

18. The method of claim 9, wherein the electronic book unit is connected to a telecommunications network, and wherein the corresponding electronic file is stored in a database in the telecommunications network.

19. The method of claim 18, wherein the telecommunications network includes one of a telephone system, a cable television system, a wireless telephone system, a digital satellite television system, a fiber optic system, an Ethernet, and a wireless television system.

20. The method of claim 18, wherein the database is a part of an Internet web site.

21. The method of claim 18, wherein activating the corresponding electronic link provides access to the Internet web site.

22. The method of claim 9, wherein the corresponding electronic file is a location in a second electronic book.

23. The method of claim 22, wherein the first and the second electronic books are stored in an electronic book unit.

24. The method of claim 9, wherein, upon selection of one of the selectable text elements, the corresponding electronic file is displayed overlaying a page of the first electronic book having the selected selectable text element.

25. The method of claim 9, wherein, upon selection of one of the selectable text elements, the corresponding electronic file is displayed side by side with a page of the first electronic book having the selected selectable text element.

26. The method of claim 9, wherein the activating step comprises operating a pointing device and a cursor to highlight one of the selectable text element and operating a select button to select one of the selectable text element.

27. The method of claim 9, wherein the corresponding electronic file is an audio presentation.

28. The method of claim 9, wherein the corresponding electronic file is a video presentation.

29. The method of claim 9, wherein the corresponding electronic file is a location where products can be ordered and purchased.

30. The method of claim 9, wherein the corresponding electronic file is a location where books can be ordered and purchased.

31. The method of claim 30, wherein the books are electronic books.

32. A method for providing an electronic book, comprising:
 displaying a portion of the electronic book including a plurality of selection options;
 in response to a selection of one of the selection options from a user, displaying a menu system including one or more links,
the menu system including:
 a help menu, wherein the help menu provides instructions for using the menu system; and
 a show links menu, wherein when selected, the show links menu displays a link type menu that includes audio clip links, graphics file links, definition links, language translation links, book order links, book review links, related discussion group links, pronunciation links, data base links, other book links, and book selection links, wherein the one or more links provide access to additional content; and
 in response to a selection of a link from the links menu from the user, retrieving additional content associated with the selected link and providing the additional content to the user.

33. The method of claim 32, further comprising:
 providing additional content that is internal to the electronic book.

34. The method of claim 32, further comprising:
 providing additional content that is external to the electronic book.

35. The method of claim 32, wherein the additional content is audio content.

36. The method of claim 32, wherein the additional content is audio-video content.

37. The method of claim 32, wherein the additional content is text content.

38. A method for creating links, comprising:
 receiving a selection of content associated with an electronic book from a user, wherein the content is a piece of the actual text of the electronic book;
 receiving a selection of additional content from the user;
 in response to a request from the user, creating a link between the selected content associated with the electronic book and the selected additional content;
 repeating the creating a link step, thereby creating multiple electronic links; and providing a links menu, wherein the links menu is capable of displaying all of the available corresponding electronic links associated with the selected content of the electronic book, wherein the links menu displays all of the corresponding electronic link types for a displayed page in the electronic book, and, when a desired electronic link type is selected from the links menu, only the available corresponding electronic links of the selected type are displayed on the page.

39. The method of claim 38, further comprising: creating a links menu; inserting the created link in the links menu.

40. The method of claim 38, wherein the created link provides access from the selected content associated with the electronic book to the selected additional content.

41. The method of claim 38, wherein the created link provides access from the selected additional content to the selected content associated with the electronic book.

42. The method of claim 38, wherein the created link is a two-way link.

* * * * *